United States Patent
Yamazaki et al.

(10) Patent No.: US 8,135,484 B2
(45) Date of Patent: Mar. 13, 2012

(54) WORK INSTRUCTION SHEET PREPARING DEVICE, METHOD AND PROGRAM

(75) Inventors: Toshiya Yamazaki, Kawasaki (JP); Toshiro Okada, Kawasaki (JP); Takeo Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 269 days.

(21) Appl. No.: 12/222,453

(22) Filed: Aug. 8, 2008

(65) Prior Publication Data
US 2008/0297847 A1    Dec. 4, 2008

Related U.S. Application Data

(63) Continuation of application No. PCT/JP2006/302231, filed on Feb. 9, 2006.

(51) Int. Cl.
*G06F 19/00*    (2011.01)
(52) U.S. Cl. ............ 700/97; 700/98; 700/103; 700/107; 715/964; 715/968; 715/969; 715/970; 716/107; 716/119; 716/139; 358/1.15
(58) Field of Classification Search .............. 700/97, 700/87, 107, 182, 103, 104, 106, 105; 705/10; 719/318, 311; 358/1.15; 715/964, 968, 969, 715/970; 716/139, 107, 119, 137
See application file for complete search history.

(56) References Cited

U.S. PATENT DOCUMENTS

| | | | | |
|---|---|---|---|---|
| 5,109,337 A | * | 4/1992 | Ferriter et al. | 705/29 |
| 5,517,421 A | * | 5/1996 | Jimbo et al. | 716/103 |
| 6,072,481 A | * | 6/2000 | Matsushita et al. | 1/1 |
| 6,543,047 B1 | * | 4/2003 | Vrhel et al. | 717/121 |
| 6,557,002 B1 | * | 4/2003 | Fujieda et al. | 1/1 |
| 6,629,065 B1 | * | 9/2003 | Gadh et al. | 703/1 |
| 6,807,453 B1 | * | 10/2004 | Suzuki | 700/110 |

(Continued)

FOREIGN PATENT DOCUMENTS

JP    2003-284212    10/2003

(Continued)

OTHER PUBLICATIONS

International Preliminary Report on Patentability, mailed Aug. 21, 2008 and issued in corresponding International Patent Application No. PCT/JP2006/302231.

*Primary Examiner* — Twyler Haskins
*Assistant Examiner* — Dennis Dicker
(74) *Attorney, Agent, or Firm* — Staas & Halsey LLP

(57) ABSTRACT

A property of connection relationship information for identifying an internal/external connection of each point is registered in a part DB 1. When the part is one basic part representing a standard configuration article, an anchor ID is registered in the part DB 1 or a product DB 2. Part group extracting unit 4 extracts parts constituting a system from a design drawing generated by drawing generating unit 3 and a group of parts connected at the connection point for each basic part assigned with the anchor ID. For each extracted part group, work instruction document generating unit 5 detects a standard configuration article having a basic part assigned with the same anchor ID as that of the basic part included in the part group, from the product DB 2, extracts a difference in part configuration between the part group in the system design drawing and the detected standard configuration article, generates information indicating the extracted difference as the work instruction document for each part group, and outputs the work instruction document.

12 Claims, 46 Drawing Sheets

U.S. PATENT DOCUMENTS

| | | | |
|---|---|---|---|
| 6,819,965 B2* | 11/2004 | Beatty et al. | 700/97 |
| 6,898,580 B1* | 5/2005 | Curran et al. | 705/400 |
| 6,944,515 B2* | 9/2005 | Nakajima et al. | 700/105 |
| 7,302,443 B2* | 11/2007 | Nakajima et al. | 1/1 |
| 7,526,441 B2* | 4/2009 | Nakajima et al. | 705/29 |
| 7,584,211 B2* | 9/2009 | Tamaru et al. | 1/1 |
| 7,620,638 B2* | 11/2009 | Nonclercq et al. | 1/1 |
| 7,882,477 B2* | 2/2011 | Konno et al. | 716/102 |
| 7,890,868 B2* | 2/2011 | Shah et al. | 715/733 |
| 2002/0107673 A1* | 8/2002 | Haller et al. | 703/1 |
| 2003/0187870 A1* | 10/2003 | Nakajima et al. | 707/102 |
| 2004/0049307 A1* | 3/2004 | Beatty et al. | 700/97 |
| 2005/0096934 A1* | 5/2005 | Wakui et al. | 705/1 |

FOREIGN PATENT DOCUMENTS

JP     2004-126824     4/2004

* cited by examiner

Figure 5

PART DATA 60

| PART TYPE NAME | PART KIND | PART NAME | BTO FLAG | OTHERS | CONNECTION POINT INFORMATION | | |
|---|---|---|---|---|---|---|---|
| | | | | | CONNECTION POINT NAME | CONNECTION PROPERTY | |
| | | | | | | SPATIAL CONNECTION PROPERTY | ELECTRICAL CONNECTION PROPERTY | OTHERS |
| RX-200M | Mother Board | RX-200 Mother | NOT APPLICABLE | ... | C1 | INTERNAL | INTERNAL | ... |
| | | | | | C2 | INTERNAL | INTERNAL | ... |
| | | | | | M1 | INTERNAL | INTERNAL | ... |
| | | | | | M2 | INTERNAL | INTERNAL | ... |
| | | | | | P1 | INTERNAL | INTERNAL | ... |
| | | | | | L1 | EXTERNAL | EXTERNAL | ... |
| CPU-1234 | CPU | P IV(2GHz) | NOT APPLICABLE | ... | C | INTERNAL | INTERNAL | ... |
| CPU-3456 | CPU | P IV(3GHz) | POSSIBLE | ... | C | INTERNAL | INTERNAL | ... |
| CPU-3457 | CPU | P IV(3GHz) | IMPOSSIBLE | ... | C | INTERNAL | INTERNAL | ... |
| MEM-9876 | Memory | DIMM(1GB) | NOT APPLICABLE | ... | M | INTERNAL | INTERNAL | ... |
| MEM-2222 | Memory | DIMM(2GB) | IMPOSSIBLE | ... | M | INTERNAL | INTERNAL | ... |
| PL-22345 | PCI NIC | 10/100 LAN CARD | IMPOSSIBLE | ... | P | INTERNAL | INTERNAL | ... |
| | | | | | L | EXTERNAL | EXTERNAL | ... |
| SAC-3333 | SCSI ARY | SCSI ARRAY CARD | POSSIBLE | ... | P | INTERNAL | INTERNAL | ... |
| SC-6654 | PCI SCSI | SCSI CONTROLLER | IMPOSSIBLE | ... | P | INTERNAL | INTERNAL | ... |
| | | | | | S | EXTERNAL | INTERNAL | ... |
| SDC-4444 | SCSI CASE | SCSI DISK ENCLOSURE | NOT APPLICABLE | ... | S1 | INTERNAL | INTERNAL | ... |
| | | | | | S2 | INTERNAL | INTERNAL | ... |
| | | | | | S3 | INTERNAL | INTERNAL | ... |
| | | | | | S4 | INTERNAL | INTERNAL | ... |
| | | | | | S5 | EXTERNAL | INTERNAL | ... |
| HDH-3210 | SCSI HDD | SCSI HDD(10GB) | POSSIBLE | ... | S | INTERNAL | INTERNAL | ... |
| HUB-2518 | HUB | 8Port SWITCHING HUB | NOT APPLICABLE | ... | L1 | EXTERNAL | EXTERNAL | ... |
| | | | | | L2 | EXTERNAL | EXTERNAL | ... |
| | | | | | L3 | EXTERNAL | EXTERNAL | ... |
| | | | | | L4 | EXTERNAL | EXTERNAL | ... |
| | | | | | L5 | EXTERNAL | EXTERNAL | ... |
| | | | | | L6 | EXTERNAL | EXTERNAL | ... |
| | | | | | L7 | EXTERNAL | EXTERNAL | ... |
| | | | | | L8 | EXTERNAL | EXTERNAL | ... |

Figure 9    PART ARRAY OF PRODUCTS    61

| PRODUCT TYPE NAME | PART ID | PART TYPE NAME | ANCHOR ID | ANCHOR SPATIAL PROPERTY | ANCHOR ELECTRICAL PROPERTY | OTHERS | CONNECTION POINT NAME | CONNECTION POINT INFORMATION ||| 
||||||||| CONNECTION PROPERTY || OTHERS |
||||||||| SPATIAL CONNECTION PROPERTY | ELECTRICAL CONNECTION PROPERTY ||
|---|---|---|---|---|---|---|---|---|---|---|
| RX200S2 | MT1 | RX-200M | A_RX200S2 | TRUE | TRUE | ... | C1 | INTERNAL | INTERNAL | ... |
|  |  |  |  |  |  |  | C2 | INTERNAL | INTERNAL | ... |
|  |  |  |  |  |  |  | M1 | INTERNAL | INTERNAL | ... |
|  |  |  |  |  |  |  | M2 | INTERNAL | INTERNAL | ... |
|  |  |  |  |  |  |  | P1 | EXTERNAL | EXTERNAL | ... |
|  |  |  |  |  |  |  | L1 | EXTERNAL | INTERNAL | ... |
|  | CPU1 | CPU-1234 |  |  |  | ... | C | INTERNAL | INTERNAL | ... |
|  | MEM1 | MEM-9876 |  |  |  | ... | M | INTERNAL | INTERNAL | ... |
| RX200S2A | MT2 | RX-200M | A_RX200S2A | TRUE | TRUE | ... | C1 | INTERNAL | INTERNAL | ... |
|  |  |  |  |  |  |  | C2 | INTERNAL | INTERNAL | ... |
|  |  |  |  |  |  |  | M1 | INTERNAL | INTERNAL | ... |
|  |  |  |  |  |  |  | M2 | INTERNAL | INTERNAL | ... |
|  |  |  |  |  |  |  | P1 | EXTERNAL | EXTERNAL | ... |
|  |  |  |  |  |  |  | L1 | EXTERNAL | INTERNAL | ... |
|  | CPU2 | CPU-1234 |  |  |  | ... | C | INTERNAL | INTERNAL | ... |
|  | MEM2 | MEM-9876 |  |  |  | ... | M | INTERNAL | INTERNAL | ... |
|  | PCI1 | SAC-3333 |  |  |  | ... | P | INTERNAL | EXTERNAL | ... |
| HUB2518 | HUB1 | HUB-2518 | A_HUB2518 | TRUE | TRUE | ... | L1 | EXTERNAL | EXTERNAL | ... |
|  |  |  |  |  |  |  | L2 | EXTERNAL | EXTERNAL | ... |
|  |  |  |  |  |  |  | L3 | EXTERNAL | EXTERNAL | ... |
|  |  |  |  |  |  |  | L4 | EXTERNAL | EXTERNAL | ... |
|  |  |  |  |  |  |  | L5 | EXTERNAL | EXTERNAL | ... |
|  |  |  |  |  |  |  | L6 | EXTERNAL | EXTERNAL | ... |
|  |  |  |  |  |  |  | L7 | EXTERNAL | EXTERNAL | ... |
|  |  |  |  |  |  |  | L8 | EXTERNAL | EXTERNAL | ... |
| SX10 | SDSK1 | SDC-4444 | A_SX10 | TRUE | FALSE | ... | S1 | INTERNAL | INTERNAL | ... |
|  |  |  |  |  |  |  | S2 | INTERNAL | INTERNAL | ... |
|  |  |  |  |  |  |  | S3 | INTERNAL | INTERNAL | ... |
|  |  |  |  |  |  |  | S4 | INTERNAL | INTERNAL | ... |
|  |  |  |  |  |  |  | S5 | EXTERNAL | INTERNAL | ... |

Figure 10

CONNECTION RELATIONSHIP ARRAY OF PRODUCTS 62

| START POINT PART ID | START POINT-CONNECTION POINT NAME | END POINT PART ID | END POINT-CONNECTION POINT NAME | OTHERS |
|---|---|---|---|---|
| MT1 | C1 | CPU1 | C | ... |
| MT1 | M1 | MEM1 | M | ... |
| MT2 | C1 | CPU2 | C | ... |
| MT2 | M1 | MEM2 | M | ... |
| MT2 | P1 | PCI1 | P | ... |

Figure 11

BASIC PART LIST OF PRODUCTS 63

| BASIC PART INFORMATION | | | | ASSOCIATED PART INFORMATION | | | | | |
|---|---|---|---|---|---|---|---|---|---|
| | | CONNECTION POINT INFORMATION | | DIRECTLY CONNECTED PART INFORMATION | | | | | DIRECT CONNECTION POINT NAME |
| PART TYPE NAME | ANCHOR ID | OTHERS | CONNECTION POINT NAME | OTHERS | PART TYPE NAME | PART NAME | OTHERS | CONNECTION POINT INFORMATION | |
| | | | | | | | | CONNECTION POINT NAME | OTHERS |
| RX-200M | A_RX200S2 | ... | C1 | | CPU-1234 | P IV(2GHz) | ... | C | ... | C1 |
| | | | C2 | | MEM-9876 | DIMM(1GB) | ... | M | ... | M1 |
| | | | M1 | | | | | | | |
| | | | M2 | | | | | | | |
| | | | P1 | | | | | | | |
| RX-200M | A_RX200S2A | ... | C1 | | CPU-1234 | P IV(2GHz) | ... | C | ... | C1 |
| | | | C2 | | MEM-9876 | DIMM(1GB) | ... | M | ... | M1 |
| | | | M1 | | SAC-3333 | SCSI ARRAY CARD | ... | P | ... | P1 |
| | | | M2 | | | | | | | |
| | | | P1 | | | | | | | |
| HUB-2518 | A_HUB2518 | ... | | | | | | | | |
| SDC-4444 | A_SX10 | ... | | | | | | | | |

Figure 14
PART ARRAY OF DESIGN DRAWING 64

| PART ID | PART TYPE NAME | PART NAME | ANCHOR ID | OTHERS | CONNECTION POINT INFORMATION | | |
|---|---|---|---|---|---|---|---|
| | | | | | CONNECTION POINT NAME | CONNECTION PROPERTY / SPATIAL CONNECTION PROPERTY | OTHERS |
| QMT1 | RX-200M | RX-200 Mother | A_RX200S2 | ... | C1 | INTERNAL | ... |
| | | | | | C2 | INTERNAL | ... |
| | | | | | M1 | INTERNAL | ... |
| | | | | | M2 | INTERNAL | ... |
| | | | | | P1 | INTERNAL | ... |
| | | | | | L1 | EXTERNAL | ... |
| QCPU1 | CPU-1234 | P IV(2GHz) | | ... | C | INTERNAL | ... |
| QMEM1 | MEM-9876 | DIMM(1GB) | | ... | M | INTERNAL | ... |
| QPCI1 | PL-22345 | 10/100 LAN CARD | | ... | P | INTERNAL | ... |
| | | | | | L | EXTERNAL | ... |
| QMT2 | RX-200M | RX-200 Mother | A_RX200S2A | ... | C1 | INTERNAL | ... |
| | | | | | C2 | INTERNAL | ... |
| | | | | | M1 | INTERNAL | ... |
| | | | | | M2 | INTERNAL | ... |
| | | | | | P1 | INTERNAL | ... |
| | | | | | L1 | EXTERNAL | ... |
| QCPU2 | CPU-3456 | P IV(3GHz) | | ... | C | INTERNAL | ... |
| QCPU3 | CPU-3456 | P IV(3GHz) | | ... | C | INTERNAL | ... |
| QMEM2 | MEM-9876 | DIMM(1GB) | | ... | M | INTERNAL | ... |
| QMEM3 | MEM-2222 | DIMM(2GB) | | ... | M | INTERNAL | ... |
| QARY1 | SAC-3333 | SCSI ARRAY CARD | | ... | P | INTERNAL | ... |
| QHUB1 | HUB-2518 | 8Port SWITCHING HUB | A_HUB2518 | ... | L1 | EXTERNAL | ... |
| | | | | | L2 | EXTERNAL | ... |
| | | | | | L3 | EXTERNAL | ... |
| | | | | | L4 | EXTERNAL | ... |
| | | | | | L5 | EXTERNAL | ... |
| | | | | | L6 | EXTERNAL | ... |
| | | | | | L7 | EXTERNAL | ... |
| | | | | | L8 | EXTERNAL | ... |

Figure 15

CONNECTION RELATIONSHIP ARRAY OF DESIGN DRAWING ~65

| START POINT PART ID | START POINT-CONNECTION POINT NAME | END POINT PART ID | END POINT-CONNECTION POINT NAME | OTHERS |
|---|---|---|---|---|
| QMT1 | C1 | QCPU1 | C | ... |
| QMT1 | M1 | QMEM1 | M | ... |
| QMT1 | P1 | QPCI1 | P | ... |
| QPCI1 | L | QHUB1 | L4 | ... |
| QMT2 | C1 | QCPU2 | C | ... |
| QMT2 | C2 | QCPU3 | C | ... |
| QMT2 | M1 | QMEM2 | M | ... |
| QMT2 | M2 | QMEM3 | M | ... |
| QMT2 | L1 | QHUB1 | L8 | ... |
| QMT2 | P1 | QARY1 | P | ... |

Figure 16

BASIC PART LIST OF DESIGN DRAWING 66

| BASIC PART INFORMATION | | | | ASSOCIATED PART INFORMATION | | | | |
|---|---|---|---|---|---|---|---|---|
| | | CONNECTION POINT INFORMATION | | DIRECTLY CONNECTED PART INFORMATION | | | | DIRECT CONNECTION POINT NAME |
| PART TYPE NAME | ANCHOR ID | CONNECTION POINT NAME | OTHERS | PART TYPE NAME | PART NAME | OTHERS | CONNECTION POINT INFORMATION | |
| | | | | | | | CONNECTION POINT NAME | OTHERS |
| RX-200M | A_RX200S2 | C1 | ... | CPU-1234 | P IV(2GHz) | ... | C | ... | C1 |
| | | C2 | ... | MEM-9876 | DIMM(1GB) | ... | M | ... | M1 |
| | | M1 | ... | PL-22345 | 10/100 LAN CARD | ... | P | ... | P1 |
| | | M2 | ... | | | | | | |
| | | P1 | ... | | | | | | |
| RX-200M | A_RX200S2A | C1 | ... | CPU-3456 | P IV(3GHz) | ... | C | ... | C1 |
| | | C2 | ... | CPU-3456 | P IV(3GHz) | ... | C | ... | C2 |
| | | M1 | ... | MEM-9876 | DIMM(1GB) | ... | M | ... | M1 |
| | | M2 | ... | MEM-2222 | DIMM(2GB) | ... | M | ... | M2 |
| | | P1 | ... | SAC-3333 | SCSI ARRAY CARD | ... | P | ... | P1 |
| HUB-2518 | A_HUB2518 | ... | | | | | | | |

Figure 17

WORK INSTRUCTION DOCUMENT

RX200S2    67

| CONNECTION POINT NAME | PRODUCT | | ACTUAL CONFIGURATION-ARTICLE | | WORK INSTRUCTION |
|---|---|---|---|---|---|
| | PART NAME | PART TYPE NAME | PART NAME | PART TYPE NAME | |
| C1 | P IV(2GHz) | CPU-1234 | P IV(2GHz) | CPU-1234 | |
| C2 | | | | | |
| M1 | DIMM(1GB) | MEM-9876 | DIMM(1GB) | MEM-9876 | |
| M2 | | | | | |
| P1 | | | 10/100 LAN CARD | PL-22345 | ADD |

RX200S2A    68

| CONNECTION POINT NAME | PRODUCT | | ACTUAL CONFIGURATION-ARTICLE | | WORK INSTRUCTION |
|---|---|---|---|---|---|
| | PART NAME | PART TYPE NAME | PART NAME | PART TYPE NAME | |
| C1 | P IV(2GHz) | CPU-1234 | P IV(2GHz) | CPU-3456 | REPLACE |
| C2 | | | P IV(3GHz) | CPU-3456 | ADD |
| M1 | DIMM(1GB) | MEM-9876 | DIMM(1GB) | MEM-9876 | |
| M2 | | | DIMM(2GB) | MEM-2222 | ADD |
| P1 | SCSI ARRAY CARD | SAC-3333 | SCSI ARRAY CARD | SAC-3333 | |

Figure 18
PART ARRAY OF DESIGN DRAWING 69

| PART ID | PART TYPE NAME | PART NAME | ANCHOR ID | BTO FLAG | OTHERS | CONNECTION POINT INFORMATION | | |
|---|---|---|---|---|---|---|---|---|
| | | | | | | CONNECTION POINT NAME | CONNECTION PROPERTY / SPATIAL CONNECTION PROPERTY | OTHERS |
| QMT1 | RX-200M | RX-200 Mother | A_RX200S2 | NOT APPLICABLE | ... | C1 | INTERNAL | ... |
| | | | | | | C2 | INTERNAL | ... |
| | | | | | | M1 | INTERNAL | ... |
| | | | | | | M2 | INTERNAL | ... |
| | | | | | | P1 | INTERNAL | ... |
| | | | | | | L1 | EXTERNAL | ... |
| QCPU1 | CPU-1234 | P IV(2GHz) | | NOT APPLICABLE | ... | C | INTERNAL | ... |
| QMEM1 | MEM-9876 | DIMM(1GB) | | NOT APPLICABLE | ... | M | INTERNAL | ... |
| QPCI1 | PL-22345 | 10/100 LAN CARD | | IMPOSSIBLE | ... | P | INTERNAL | ... |
| | | | | | | L | EXTERNAL | ... |
| QMT2 | RX-200M | RX-200 Mother | A_RX200S2A | NOT APPLICABLE | ... | C1 | INTERNAL | ... |
| | | | | | | C2 | INTERNAL | ... |
| | | | | | | M1 | INTERNAL | ... |
| | | | | | | M2 | INTERNAL | ... |
| | | | | | | P1 | INTERNAL | ... |
| | | | | | | L1 | EXTERNAL | ... |
| QCPU2 | CPU-3456 | P IV(3GHz) | | POSSIBLE | ... | C | INTERNAL | ... |
| QCPU3 | CPU-3456 | P IV(3GHz) | | POSSIBLE | ... | C | INTERNAL | ... |
| QMEM2 | MEM-9876 | DIMM(1GB) | | NOT APPLICABLE | ... | M | INTERNAL | ... |
| QMEM3 | MEM-2222 | DIMM(2GB) | | IMPOSSIBLE | ... | M | INTERNAL | ... |
| QARY1 | SAC-3333 | SCSI ARRAY CARD | | POSSIBLE | ... | P | INTERNAL | ... |
| QHUB1 | HUB-2518 | 8Port SWITCHING HUB | A_HUB2518 | NOT APPLICABLE | ... | L1 | EXTERNAL | ... |
| | | | | | | L2 | EXTERNAL | ... |
| | | | | | | L3 | EXTERNAL | ... |
| | | | | | | L4 | EXTERNAL | ... |
| | | | | | | L5 | EXTERNAL | ... |
| | | | | | | L6 | EXTERNAL | ... |
| | | | | | | L7 | EXTERNAL | ... |
| | | | | | | L8 | EXTERNAL | ... |

Figure 19

BASIC PART LIST OF DESIGN DRAWING 70

| BASIC PART INFORMATION | | | | ASSOCIATED PART INFORMATION | | | | | | |
|---|---|---|---|---|---|---|---|---|---|---|
| | | CONNECTION POINT INFORMATION | | DIRECTLY CONNECTED PART INFORMATION | | | | | | |
| PART TYPE NAME | ANCHOR ID | OTHERS | CONNECTION POINT NAME | PART TYPE NAME | PART NAME | BTO FLAG | OTHERS | CONNECTION POINT INFORMATION | | DIRECT CONNECTION POINT NAME |
| | | | | | | | | CONNECTION POINT NAME | OTHERS | |
| RX-200M | A_RX200S2 | ... | C1 | CPU-1234 | P IV(2GHz) | NOT APPLICABLE | ... | C | ... | C1 |
| | | | C2 | MEM-9876 | DIMM(1GB) | NOT APPLICABLE | ... | M | ... | M1 |
| | | | M1 | PL-22345 | 10/100 LAN CARD | IMPOSSIBLE | ... | P | ... | P1 |
| | | | M2 | | | | | | | |
| | | | P1 | | | | | | | |
| RX-200M | A_RX200S2A | ... | C1 | CPU-3456 | P IV(3GHz) | POSSIBLE | ... | C | ... | C1 |
| | | | C2 | CPU-3456 | P IV(3GHz) | POSSIBLE | ... | C | ... | C2 |
| | | | M1 | MEM-9876 | DIMM(1GB) | NOT APPLICABLE | ... | M | ... | M1 |
| | | | M2 | MEM-2222 | DIMM(2GB) | IMPOSSIBLE | ... | M | ... | M2 |
| | | | P1 | SAC-3333 | SCSI ARRAY CARD | POSSIBLE | ... | P | ... | P1 |
| HUB-2518 | A_HUB2518 | ... | | | | | | | | |

Figure 20

WORK INSTRUCTION DOCUMENT

| RX200S2A | | | 71 | | |
|---|---|---|---|---|---|
| CONNECTION POINT NAME | PRODUCT | | ACTUAL CONFIGURATION-ARTICLE | | WORK INSTRUCTION |
| | PART NAME | PART TYPE NAME | PART NAME | PART TYPE NAME | |
| C1 | P IV(2GHz) | CPU-3456 | P IV(2GHz) | CPU-3456 | |
| C2 | P IV(3GHz) | CPU-3456 | P IV(3GHz) | CPU-3456 | |
| M1 | DIMM(1GB) | MEM-9876 | DIMM(1GB) | MEM-9876 | |
| M2 | | | DIMM(2GB) | MEM-2222 | ADD |
| P1 | SCSI ARRAY CARD | SAC-3333 | SCSI ARRAY CARD | SAC-3333 | |

Figure 22

PART ARRAY OF DESIGN DRAWING 72

| PART ID | PART TYPE NAME | PART NAME | ANCHOR ID | ANCHOR SPATIAL PROPERTY | ANCHOR ELECTRICAL PROPERTY | OTHERS | CONNECTION POINT INFORMATION ||||
|---|---|---|---|---|---|---|---|---|---|---|
| | | | | | | | CONNECTION POINT NAME | CONNECTION PROPERTY || OTHERS |
| | | | | | | | | SPATIAL CONNECTION PROPERTY | ELECTRICAL CONNECTION PROPERTY | |
| RMT1 | RX-200M | RX-200 Mother | A_RX200S2 | TRUE | TRUE | ... | C1 | INTERNAL | INTERNAL | ... |
| | | | | | | | C2 | INTERNAL | INTERNAL | ... |
| | | | | | | | M1 | INTERNAL | INTERNAL | ... |
| | | | | | | | M2 | INTERNAL | INTERNAL | ... |
| | | | | | | | P1 | INTERNAL | EXTERNAL | ... |
| | | | | | | | L1 | EXTERNAL | INTERNAL | ... |
| RCPU1 | CPU-1234 | P IV(2GHz) | | | | ... | C | INTERNAL | INTERNAL | ... |
| RMEM1 | MEM-9876 | DIMM(1GB) | | | | ... | M | INTERNAL | INTERNAL | ... |
| RPCI1 | SC-6654 | SCSI CONTROLLER | | | | ... | P | INTERNAL | INTERNAL | ... |
| | | | | | | | S | EXTERNAL | EXTERNAL | ... |
| RSDSK1 | SDC-4444 | SCSI DISK ENCLOSURE | A_SX10 | TRUE | FALSE | ... | S1 | INTERNAL | INTERNAL | ... |
| | | | | | | | S2 | INTERNAL | INTERNAL | ... |
| | | | | | | | S3 | INTERNAL | INTERNAL | ... |
| | | | | | | | S4 | INTERNAL | INTERNAL | ... |
| | | | | | | | S5 | EXTERNAL | INTERNAL | ... |
| RHDD1 | HDH-3210 | SCSI HDD(10GB) | | | | ... | S | INTERNAL | INTERNAL | ... |
| RHDD2 | HDH-3210 | SCSI HDD(10GB) | | | | ... | S | INTERNAL | INTERNAL | ... |
| RHDD3 | HDH-3210 | SCSI HDD(10GB) | | | | ... | S | INTERNAL | INTERNAL | ... |

Figure 23

CONNECTION RELATIONSHIP ARRAY OF DESIGN DRAWING 73

| START POINT PART ID | START POINT-CONNECTION POINT NAME | END POINT PART ID | END POINT-CONNECTION POINT NAME | OTHERS |
|---|---|---|---|---|
| RMT1 | C1 | RCPU1 | C | ... |
| RMT1 | M1 | RMEM1 | M | ... |
| RMT1 | P1 | RPCI1 | P | ... |
| RPCI1 | S | RSDSK1 | S5 | ... |
| RSDSK1 | S1 | RHDD1 | S | ... |
| RSDSK1 | S2 | RHDD2 | S | ... |
| RSDSK1 | S3 | RHDD3 | S | ... |

Figure 24

BASIC PART LIST OF DESIGN DRAWING 74

| BASIC PART INFORMATION | | | | ASSOCIATED PART INFORMATION | | | | | |
|---|---|---|---|---|---|---|---|---|---|
| PART TYPE NAME | ANCHOR ID | OTHERS | CONNECTION POINT INFORMATION | | DIRECTLY CONNECTED PART INFORMATION | | | CONNECTION POINT INFORMATION | DIRECT CONNECTION POINT NAME |
| | | | CONNECTION POINT NAME | OTHERS | PART TYPE NAME | PART NAME | OTHERS | CONNECTION POINT NAME | OTHERS |
| RX-200M | A_RX200S2 | ... | C1 | ... | CPU-1234 | P IV(2GHz) | ... | C | ... | C1 |
| | | | C2 | ... | | | | | | |
| | | | M1 | ... | MEM-9876 | DIMM(1GB) | ... | M | ... | M1 |
| | | | M2 | ... | | | | | | |
| | | | P1 | ... | SC-6654 | SCSI CONTROLLER | ... | P | ... | P1 |
| SDC-4444 | A_SX10 | ... | S1 | ... | HDH-3210 | SCSI HDD(10GB) | ... | S | ... | S1 |
| | | | S2 | ... | HDH-3210 | SCSI HDD(10GB) | ... | S | ... | S2 |
| | | | S3 | ... | HDH-3210 | SCSI HDD(10GB) | ... | S | ... | S3 |
| | | | S4 | ... | | | | | | |

Figure 25

WORK INSTRUCTION DOCUMENT

RX200S2    75

| CONNECTION POINT NAME | PRODUCT | | ACTUAL CONFIGURATION-ARTICLE | | WORK INSTRUCTION |
|---|---|---|---|---|---|
| | PART NAME | PART TYPE NAME | PART NAME | PART TYPE NAME | |
| C1 | P IV(2GHz) | CPU-1234 | P IV(2GHz) | CPU-1234 | |
| C2 | | | | | |
| M1 | DIMM(1GB) | MEM-9876 | DIMM(1GB) | MEM-9876 | |
| M2 | | | | | |
| P1 | | | SCSI CONTROLLER | SC-6654 | ADD |

SX10    76

| CONNECTION POINT NAME | PRODUCT | | ACTUAL CONFIGURATION-ARTICLE | | WORK INSTRUCTION |
|---|---|---|---|---|---|
| | PART NAME | PART TYPE NAME | PART NAME | PART TYPE NAME | |
| S1 | | | SCSI HDD(10GB) | HDH-3210 | ADD |
| S2 | | | SCSI HDD(10GB) | HDH-3210 | ADD |
| S3 | | | SCSI HDD(10GB) | HDH-3210 | ADD |
| S4 | | | | | |

Figure 26

DISK PARTITION DESIGN TEMPLATE 77

RX200S2

| DISK NAME | PARTITION | START CYLINDER | SIZE | MOUNT POSITION |
|---|---|---|---|---|
| RHDD1 | 0 | | | |
| | 1 | | | |
| | 2 | | | |
| | ⋮ | ⋮ | ⋮ | ⋮ |
| | 7 | | | |
| RHDD2 | 0 | | | |
| | 1 | | | |
| | 2 | | | |
| | ⋮ | ⋮ | ⋮ | ⋮ |
| | 7 | | | |
| RHDD3 | 0 | | | |
| | 1 | | | |
| | 2 | | | |
| | ⋮ | ⋮ | ⋮ | ⋮ |
| | 7 | | | |

Figure 27

WORK INSTRUCTION DOCUMENT

| SX10 | | | 78 | | |
|---|---|---|---|---|---|
| CONNECTION POINT NAME | PRODUCT | | ACTUAL CONFIGURATION-ARTICLE | | WORK INSTRUCTION |
| | PART NAME | PART TYPE NAME | PART NAME | PART TYPE NAME | |
| S1 | SCSI HDD(10GB) | HDH-3210 | SCSI HDD(10GB) | HDH-3210 | |
| S2 | SCSI HDD(10GB) | HDH-3210 | SCSI HDD(10GB) | HDH-3210 | |
| S3 | SCSI HDD(10GB) | HDH-3210 | SCSI HDD(10GB) | HDH-3210 | |
| S4 | | | | | |

Figure 44

PART DATA 79

| PART TYPE NAME | PART KIND | PART NAME | BTO FLAG | OTHERS | CONNECTION POINT INFORMATION ||||
|---|---|---|---|---|---|---|---|---|
| | | | | | CONNECTION POINT NAME | CONNECTION PROPERTY ||| |
| | | | | | | SPATIAL CONNECTION PROPERTY | ELECTRICAL CONNECTION PROPERTY | OTHERS |
| RX-200M | Mother Board | RX-200 Mother | NOT APPLICABLE | ... | C1 | INTERNAL/PARENT | INTERNAL/PARENT | ... |
| | | | | | C2 | INTERNAL/PARENT | INTERNAL/PARENT | ... |
| | | | | | M1 | INTERNAL/PARENT | INTERNAL/PARENT | ... |
| | | | | | M2 | INTERNAL/PARENT | INTERNAL/PARENT | ... |
| | | | | | P1 | INTERNAL/PARENT | INTERNAL/PARENT | ... |
| | | | | | L1 | EXTERNAL | EXTERNAL | ... |
| CPU-1234 | CPU | P IV(2GHz) | NOT APPLICABLE | ... | C | INTERNAL/CHILD | INTERNAL/CHILD | ... |
| CPU-3456 | CPU | P IV(3GHz) | POSSIBLE | ... | C | INTERNAL/CHILD | INTERNAL/CHILD | ... |
| CPU-3457 | CPU | P IV(3GHz) | IMPOSSIBLE | ... | C | INTERNAL/CHILD | INTERNAL/CHILD | ... |
| MEM-9876 | Memory | DIMM(1GB) | NOT APPLICABLE | ... | M | INTERNAL/CHILD | INTERNAL/CHILD | ... |
| MEM-2222 | Memory | DIMM(2GB) | IMPOSSIBLE | ... | M | INTERNAL/CHILD | INTERNAL/CHILD | ... |
| PL-22345 | PCI NIC | 10/100 LAN CARD | IMPOSSIBLE | ... | P | INTERNAL/CHILD | INTERNAL/CHILD | ... |
| | | | | | L | EXTERNAL | EXTERNAL | ... |
| SAC-3333 | SCSI ARY | SCSI ARRAY CARD | POSSIBLE | ... | P | INTERNAL/CHILD | INTERNAL/CHILD | ... |
| SC-6654 | PCI SCSI | SCSI CONTROLLER | IMPOSSIBLE | ... | P | INTERNAL/CHILD | INTERNAL/CHILD | ... |
| | | | | | S | EXTERNAL | EXTERNAL | ... |
| SDC-4444 | SCSI CASE | SCSI DISK ENCLOSURE | NOT APPLICABLE | ... | S1 | INTERNAL/PARENT | INTERNAL/PARENT | ... |
| | | | | | S2 | INTERNAL/PARENT | INTERNAL/PARENT | ... |
| | | | | | S3 | INTERNAL/PARENT | INTERNAL/PARENT | ... |
| | | | | | S4 | INTERNAL/PARENT | INTERNAL/PARENT | ... |
| | | | | | S5 | INTERNAL/PARENT | INTERNAL/PARENT | ... |
| HDH-3210 | SCSI HDD | SCSI HDD(10GB) | POSSIBLE | ... | S | INTERNAL/CHILD | INTERNAL/CHILD | ... |
| HUB-2518 | HUB | 8Port SWITCHING HUB | NOT APPLICABLE | ... | L1 | EXTERNAL | EXTERNAL | ... |
| | | | | | L2 | EXTERNAL | EXTERNAL | ... |
| | | | | | L3 | EXTERNAL | EXTERNAL | ... |
| | | | | | L4 | EXTERNAL | EXTERNAL | ... |
| | | | | | L5 | EXTERNAL | EXTERNAL | ... |
| | | | | | L6 | EXTERNAL | EXTERNAL | ... |
| | | | | | L7 | EXTERNAL | EXTERNAL | ... |
| | | | | | L8 | EXTERNAL | EXTERNAL | ... |

Figure 45
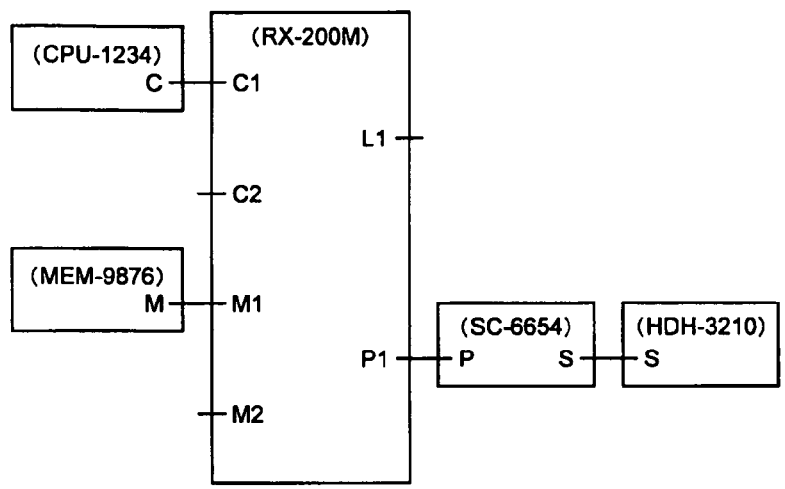
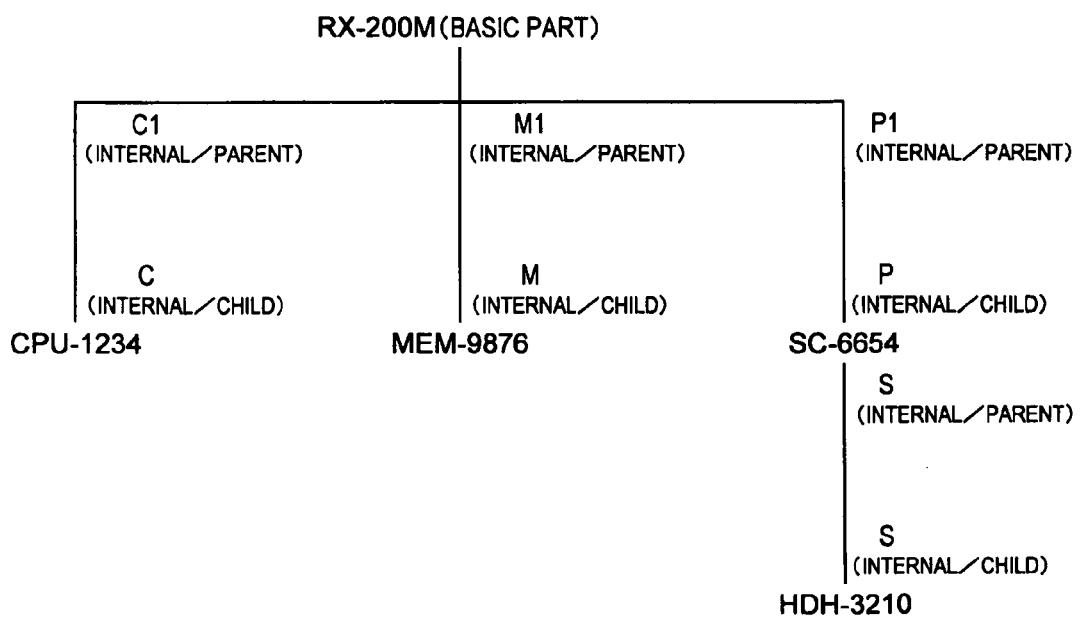

WORK INSTRUCTION SHEET PREPARING DEVICE, METHOD AND PROGRAM

CROSS REFERENCE TO RELATED APPLICATIONS

This application is a continuing application, filed under 35 U.S.C. §111(a), of International Application PCT/JP2006/302231 filed Feb. 9, 2006, the disclosure of which is hereby incorporated by reference.

BACKGROUND OF THE INVENTION

1. Field of the Invention

The present invention relates to a technique for generating a work instruction document required for computer system installation work or the like. More particularly, the present invention relates to a work instruction document generating apparatus, a work instruction document generating method and a work instruction document generating program for automatically generating a work instruction document for helping with computer system construction and field work, by using CAD (Computer Aided Design) data.

2. Description of the Related Art

If a computer system is designed in order to meet demands of a user who are to install the computer system, it is carried out to change an information processing device with a standard configuration, which is an aggregation of multiple parts such as a CPU and a memory (hereinafter referred to as "standard configuration article" or "product"), by adding/exchanging (also referred to as "replacing") or removing an article, which is not an standard configuration ones, namely, an external storage device, a network device, a device adapter or other parts, so as to change components of the computer system. Generally, in this way, a system configuration is designed in accordance with the user's demands.

If the computer system designed in this way is installed at the user's installation location, a system provider arranges the standard configuration article of the system or other parts to constitute the computer system, checks delivery thereof and assembles them at the installation site. The check of the delivery and the assembly at the installation location are performed by an installation operator called a CE (Customer Engineer) at the site. At this time, the installation operator works by referring to a system design drawing or a list of configuration articles, and in some instances, a note of work procedures written by a system designer or the like.

Among information for supporting this operation, the most useful information particularly for the installation operator is information about difference between the components of the standard configuration article shipped from a factory and the components actually used in the system described on the system design drawing. If the designed system is composed only of a combination of standard configuration article, the system installation is completed only by simply connecting those shipped standard configuration article.

Generally, in the system design, a system configuration is often changed by addition, replacement, removal of various components; for example, adding an input/output device which is not included in a list of the standard configuration article, replacing a low-speed CPU by a high-speed CPU, or removing an unnecessary memory. In this case, the installation operator needs to confirm a components to be added to, replaced/removed from the standard configuration article, one by one, and work for adding, replacing or removing them. Therefore, it is conceivable that when a difference of the components between the system design drawing and the standard configuration article is clearly known there, the installation operator can easily work without errors. In other words, it is conceivable that if there is something recorded in which information indicating the difference between the components set in the system design drawing and the parts configuration of the standard configuration article is described, the installation operator will be able to use it as a work instruction document effectively.

As one example of conventional techniques for comparing configurations before and after change of design of the configuration and outputting instruction information for change operation, there is a technique described in the following Patent Document 1. In this Patent Document 1 describes a technique in which, if a drawing of a control board housing various instruments is revised, that is, the design has been changed, some information on instrument, arrangement, cable assembly or wire connections and the like before changing a design of configuration are compared with those after changing the design, and a work instruction drawings indicating to change wire connections is generated in order to save a designer's task load and generate work instruction drawing that an operator can easily understand the change shown therein.

(Patent Document 1: Japanese Patent Laid-Open No. 2003-284212)

For example, if concepts of the technique shown in the above described Patent Document 1 are used in order to compare the configuration of the system before the design change with the one after the design change as a whole, extract a difference thereof and generate the work instruction document, there may be a problem as follows. Generally, the computer system is often composed of a combination of multiple partially-changed configurations of the standard configuration article such as a server device. However, according to the technique of the above described Patent Document 1, it is not possible to clip a portion of the system design, compare the configuration before the design change with the configuration after the design change for each clipped portion, extract the difference thereof, and thereby automatically generate the work instruction document for each clipped portion. In other words, according to the concepts of the technique described in Patent Document 1, even if the difference between the entire combination of the standard configuration article and the entire components described in the system design drawing can be extracted, information on what kind of change has been applied to which part cannot be extracted for each standard configuration article.

FIGS. 46 and 47 are diagrams illustrating examples of the computer system design. FIG. 46 illustrates an example of a system composed of standard products before the design change and FIG. 47 illustrates an example of the system shown in FIG. 46 of which the design has been changed.

The computer system is generally constructed with multiple information devices. Respective different design changes are also often applied to the respective information devices. Also in the examples of FIGS. 46 and 47, the different design changes are applied to the respective information devices.

In this example, if the concepts of the technique shown in the above described Patent Document 1 are used, it is possible to extract a difference between the entire system configurations shown in FIGS. 46 and 47 to generate the work instruction document. In other words, it is conceivable that the difference between the configurations as the entire drawings can be extracted by using a method of the above described Patent Document 1, as follows.

A memory 2 is added

An external storage device is added

A CPU 1 is replaced with a CPU 2

However, since the technique of the above described Patent Document 1 does not include means for clipping a portion from the whole, it is not possible to generate the work instruction document for one server in the system of FIG. 47, or the like. For example, when attention is focused only on a server B, the memory 2 and the external storage device have been added. However, according to the above described method, such a partial difference cannot be detected.

In the field of the system installation, since the respective information devices are installed one by one, it is convenient to have a work instruction document in which a design change point for each information device can be understood. Particularly, in the case of construction of a complicated computer system, since a significant burden is imposed on the installation operator for the system, more detailed information such as a work instruction document in which the design change point for each portion can be easily understood is required.

SUMMARY OF THE INVENTION

It is an object of the present invention to solve the above described problem and to provide a technique for outputting a work instruction document and product-related information which are more beneficial to the system installation operator and the like.

In order to solve the above described problem, in the present invention, data of a standard configuration article (product) which is an aggregation of multiple parts is registered and retained in a product database (hereinafter, "database" is represented as "DB"), and also data of each part is registered and retained in a part DB. Each part to be registered in the part DB is provided with a property representing a distinction between an internal connection and an external connection at a connection point between the parts, and one group of the parts with the above described property of "internal connection" is regarded as an identical product. In units of this product, the product is compared with a configuration in a state after design work (a state where the part has been changed for the product), and a different point is outputted as a work instruction document.

Thereby, since the different point, that is, a part change point is outputted in a form close to one group which is a physical product, it becomes possible to obtain output contents as a work instruction document which can be easily understood by a person in charge of field work.

Moreover, the present invention further provides a property (referred to as "BTO flag") representing a distinction between a factory-attached article and a field-attached article, for each part, and in generation of the work instruction document, the factory-attached article is handled similarly to a part included in a standard product and the field-attached article is handled as an article targeted for delivery and targeted for the field work. Thereby, it becomes possible to provide a work instruction document which can be more easily understood by the person in charge of the field work.

Moreover, the present invention further provides a property representing whether or not a logical relationship is included (internal/external), for a relationship between the products. For example, like a server device and a disk device, products which are separate as physical products but are logically one (the disk device is a portion of the server device) can be represented as one group of the products in the work instruction document, which enables the work instruction document to be used not only by a customer engineer but also by a system engineer and the like.

Specifically, the present invention is a work instruction document generating apparatus for generating a work instruction document for constructing a system from a system design drawing. This work instruction document generating apparatus includes: standard configuration article data storage unit for storing configuration information on a standard configuration article composed of predetermined multiple parts, and information for identifying a basic part indicating one basic part in parts belonging to the standard configuration article; part data storage unit for storing information on a part attached with a property of connection relationship information for identifying at least whether a connection point with another part has an internal connection or an external connection, for each part; part group extracting unit for extracting parts constituting the system from the system design drawing by using the information on the part stored in the part data storage unit, and in the extracted parts, extracting a group of parts connected at the connection point for which the connection relationship information indicates the internal connection, for each basic part; and work instruction document generating unit for, for each part group extracted by the part group extracting unit, detecting a standard configuration article having the same basic part as the basic part included in the part group from the standard configuration article data storage unit, extracting a difference in part configuration between the part group in the system design drawing and the detected standard configuration article, generating information indicating the extracted difference as the work instruction document for each part group, and outputting the work instruction document.

Moreover, in the present invention, in the above described work instruction document generating apparatus, as the property of the part stored in the part data storage unit, BTO information representing a distinction of whether or not the part is a factory-attached article may be further set, and the work instruction document generating unit can confirm the BTO information on the part in each part group in which the difference from the standard configuration article has been detected. Then, if the BTO information on the part indicates that the part is the factory-attached article, the work instruction document generating unit can record information indicating that or records that there has been no difference between the part group and the standard configuration article for the part, in the work instruction document.

Moreover, in the present invention, in the above described work instruction document generating apparatus, as the connection relationship information of the property set to the part stored in the part data storage unit, there may be a first connection relationship information indicating a physical connection relationship with another part and a second connection relationship information indicating a logical connection relationship with another part, and information whether the connection relationship is the internal connection or the external connection may be set independently for each connection relationship information, and the part group extracting unit includes unit for extracting a part group for generating the work instruction document from the system design drawing, by using the first connection relationship information, and unit for extracting the part group for generating the work instruction document from the system design drawing, by using the second connection relationship information.

Processes performed by the above described work instruction document generating apparatus can be realized by a computer and a software program, and the program can also be recorded in a computer-readable recording medium and provided through a network.

According to the present invention, since the different point in the part configuration can be outputted in the form close to one group which is the physical product, as the work instruction document, it becomes possible to generate a work instruction document with contents which can be more easily understood by an installation operator in the field. Moreover, since a part targeted for BTO is not described as a work instruction in the work instruction document, acceptance inspection of each device delivered in the field becomes easy and it is possible to automatically generate a more precise work instruction document for installation work in the field. Moreover, since a spatial connection and an electrical connection are separately used, the products which are physically separate but logically one, for example, such as a server and an external hard disk, can be represented as one group of the products.

BRIEF DESCRIPTION OF THE DRAWINGS

FIG. 5 is a diagram illustrating an example of part data in the part DB;

FIG. 9 is a diagram illustrating an example of a parts array of products;

FIG. 10 is a diagram illustrating an example of a connection relationship array of the products;

FIG. 11 is a diagram illustrating an example of a basic part list of the products;

FIG. 14 is a diagram illustrating an example of a parts array of the design drawing;

FIG. 15 is a diagram illustrating an example of a connection relationship array of the design drawing;

FIG. 16 is a diagram illustrating an example of a basic part list of the design drawing;

FIG. 17 is a diagram illustrating an example of a work instruction document;

FIG. 18 is a diagram illustrating an example of the parts array of the design drawing;

FIG. 19 is a diagram illustrating an example of the basic part list of the design drawing;

FIG. 20 is a diagram illustrating an example of the work instruction document;

FIG. 22 is a diagram illustrating an example of the parts array of the design drawing;

FIG. 23 is a diagram illustrating an example of the connection relationship array of the design drawing;

FIG. 24 is a diagram illustrating an example of the basic part list of the design drawing;

FIG. 25 is a diagram illustrating an example of the work instruction document;

FIG. 26 is a diagram illustrating an example of a disk partition design template;

FIG. 27 is a diagram illustrating an example of the work instruction document;

FIG. 44 is a diagram illustrating an example of the part data in the part DB;

FIG. 45 is a diagram illustrating an example of tree representation of part connections;

| | Description of Symbols |
|---|---|
| 1 | Part DB |
| 2 | Product DB |
| 3 | Drawing generating unit |
| 4 | Part group extracting unit |
| 5 | Work instruction document generating unit |
| 10 | Work instruction document generating apparatus |
| 11 | Drawing generation processing unit |
| 12 | Part DB |
| 13 | Product DB |
| 14 | Design drawing data storage unit |
| 15 | Parts array generating unit |
| 16 | Connection relationship array generating unit |
| 17 | Basic part list generating unit |
| 18 | Work instruction document generating unit |
| 20 | Input/output device |

DETAILED DESCRIPTION OF THE PREFERRED EMBODIMENTS

Hereinafter, preferable embodiments of the present invention will be described using the drawings.

[Principle of the Present Invention]

Figure 1:
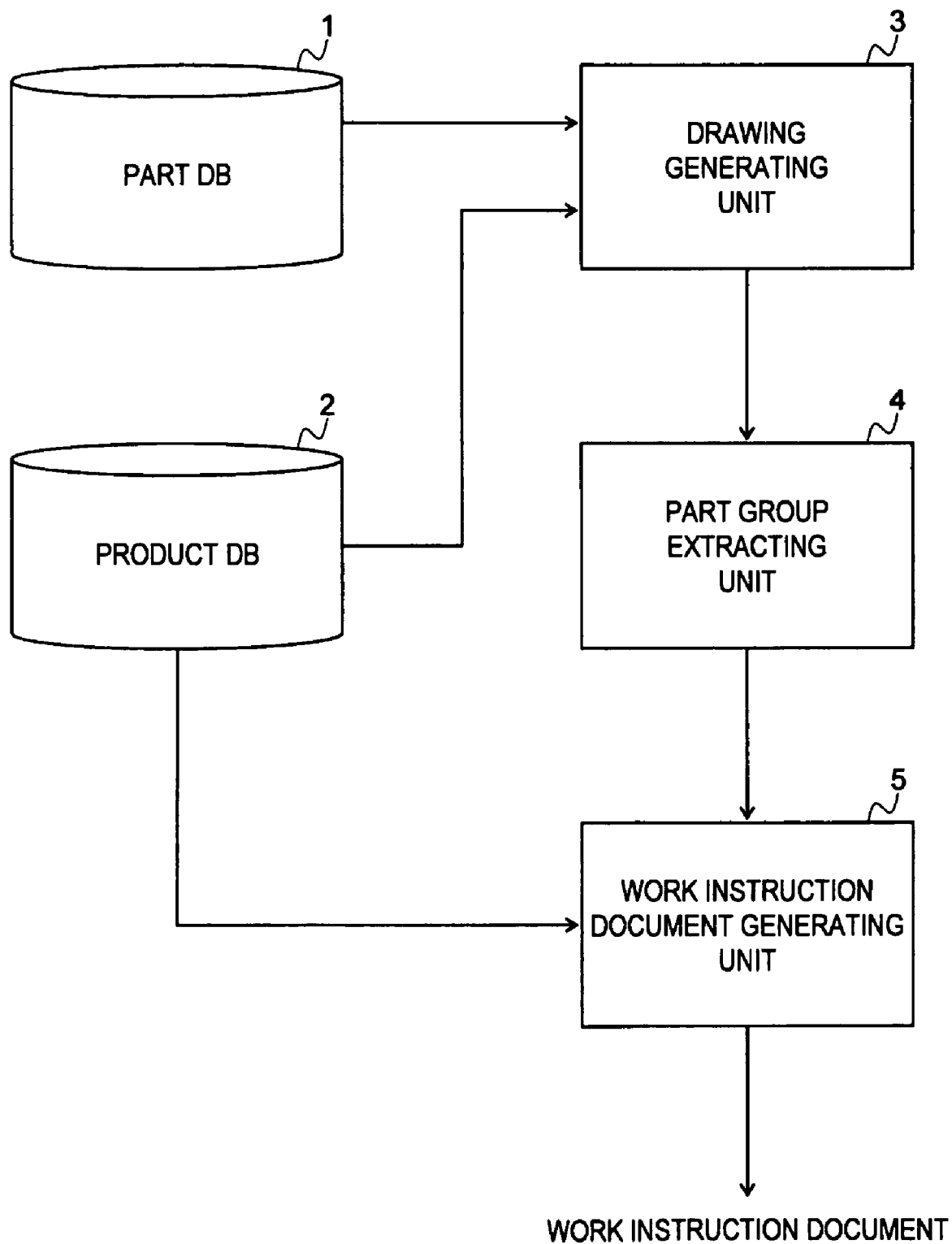
FIG. 1 is a diagram illustrating a principle of the present invention.

FIG. 1 is a diagram illustrating a principle of the present invention. Hereinafter, according to this FIG. 1, the principle of the present invention will be described.

For parts registered in a part DB 1, connection points for connections to other parts are set. In the present invention, the connection between the parts is considered to be divided into two kinds, that is, an internal connection and an external connection. The internal connection denotes that the connection between the parts is tight, and denotes that connected parts belong to the same part group. For example, a server can be regarded as one part group in which a motherboard, a CPU, a memory and the like are internally connected to one another. The external connection denotes that the connection between the parts is sparse, and denotes that the connected parts belong to other part groups, respectively. For example, a LAN card which is internally connected to the server and a HUB which is connected from the LAN card via a LAN cable can be regarded to belong to separate part groups of "server" and "HUB", respectively. In the present invention, for each connection point of each part, connection relationship information indicating whether the connection between the parts at the connection point becomes the internal connection or the external connection is set as a property of the part.

Moreover, in the present invention, a standard configuration article (product) composed of predetermined multiple parts is generated by using the parts in the part DB 1. Information on the generated standard configuration article is stored in a product DB 2. In a part group constituting each standard configuration article, one basic part representing the standard configuration article is defined. If a part to be registered in the part DB 1 is the basic part, an anchor ID which is identification information for uniquely identifying the basic part is set as a property of the part, and that information is registered in the part DB 1 or the product DB 2.

If a system design drawing is generated by a drawing generating unit 3, the part in the part DB 1 and the standard configuration article in the product DB 2 are used. Basically, the design drawing is generated by placing the standard configuration article on a design drawing and changing a design of the placed standard configuration article by addition/replacement/deletion or the like of the part or wire-connecting the parts together. At this time, the anchor ID of the standard configuration article which has been applied with the change such as the addition/replacement/deletion of the part is not changed.

Next, the respective parts on the generated design drawing are divided into multiple part groups by a part group extracting unit 4. At this time, for each basic part to which the anchor ID has been set, with reference to the connection relationship information on the connection point between the connected parts, the part groups are divided so that the parts with the connection which is the internal connection belong to the same part group and the parts with the connection which is the external connection belong to different part groups, which results in a state where one anchor ID has been set for each part group.

Finally, a difference between each part group on the design drawing and a standard configuration article with the same anchor ID in the product DB 2 is extracted, and a work instruction document indicating the extracted difference as a change point is generated, by a work instruction document generating unit 5.

In a common CAD system, attribute information is defined as a property for a graphic element. Similarly, since the properties of the connection relationship information and the anchor ID are defined and set for the part which is a graphic element in the design drawing, it becomes possible to clip the part group which is a portion within the design drawing. Moreover, since a process of extracting the difference from the standard configuration article is performed for each part group, it becomes possible to automatically generate the work instruction document for each part group. It is possible to automatically generate an assembly/disassembly work instruction document required for constructing each information device in the field by setting this part group in units of the information device such as the server.

Figure 46:
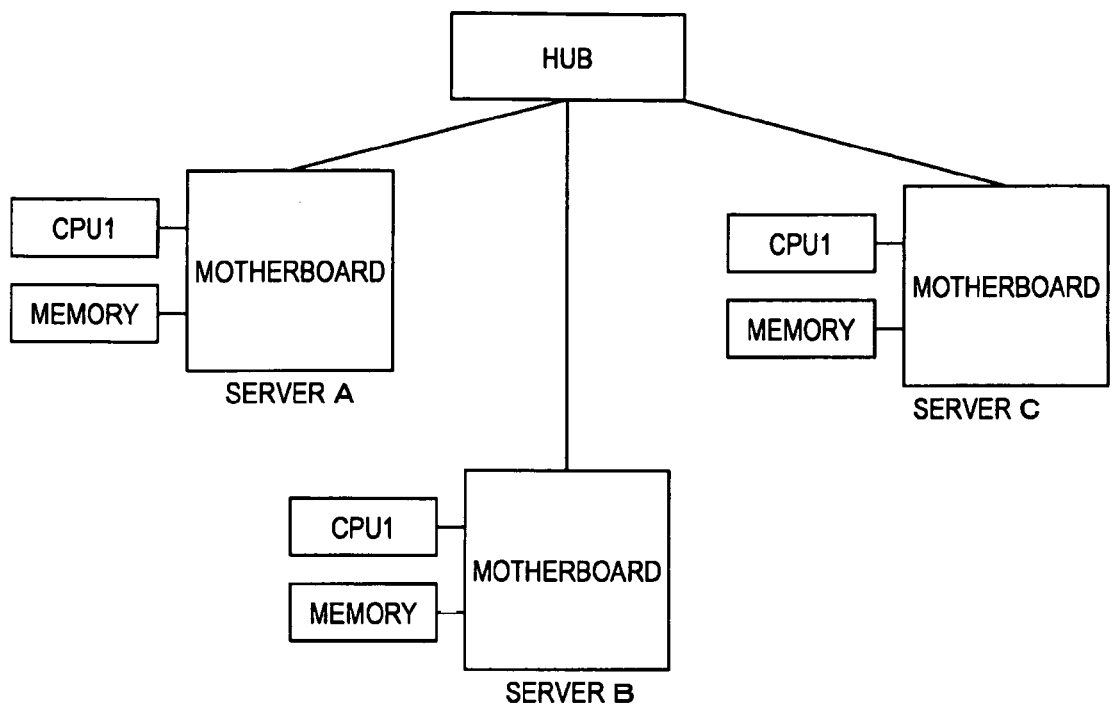
FIG. 46 is a diagram illustrating an example of computer system design.
Figure 47:
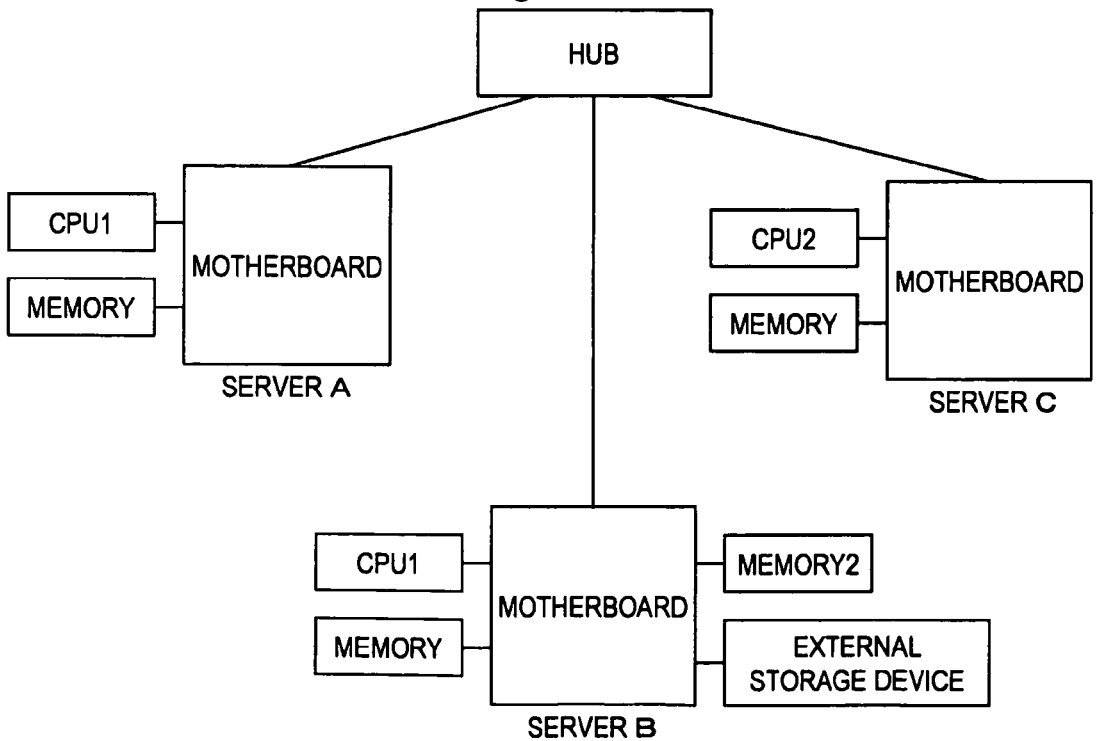
FIG. 47 is a diagram illustrating an example of the computer system design.

In the examples of FIGS. 46 and 47, if it is assumed that a server A, a server B and a server C are the products, for example, a work instruction document with output contents as follows can be obtained for each product, from data of the standard configuration article shown in FIG. 46 and design drawing information shown in FIG. 47.

Server A [motherboard, CPU1, memory] (parts are not changed)

Server B [motherboard, CPU1, memory, memory2 (added), external storage device (added)]

Server C [motherboard, CPU2 (changed from CPU 1), memory]

HUB (parts are not changed)

Moreover, in the present invention, a BTO (Built To Order) flag can be set to the part registered in the part DB 1. The BTO flag is information indicating whether or not the part can be previously built in the standard configuration article at a factory. In the work instruction document generating unit 5, if the BTO flag of a part added to the standard configuration article or a part replaced with the part of the standard configuration article indicates that the part can be previously built in the standard configuration article at the factory, the part is handled as if it were previously a component of the standard configuration article. In other words, among the parts in the part group on the design drawing, for the part which can be previously built in the standard configuration article at the factory by BTO, a work instruction is not described in the work instruction document. Alternatively, a fact that the part is a factory-attached article is indicated in the work instruction document.

Due to introduction of the BTO flag, a description of a work instruction related to a part for which field work is not required can be eliminated. Therefore, it becomes possible to easily perform acceptance inspection of each device delivered in the field, and automatically generate a more precise work instruction document for the field work.

Furthermore, in the present invention, the connection relationship information can be divided into spatial connection relationship information and electrical connection relationship information and set separately. The spatial connection relationship information is connection relationship information related to a physical connection between the parts. The electrical connection relationship information is connection relationship information related to a logical connection between the parts. In the present invention, either the spatial connection relationship information or the electrical connection relationship information is used for each use of the work instruction document to generate the work instruction document.

In this way, since the connection relationship information is divided for a spatial connection and an electrical connection, respectively, it is possible to generate a work instruction document in which correct boundaries have been used from a viewpoint of each worker, including an instruction document for an installation operator such as a system installation work instruction document, and an instruction document for an operation worker such as information for partition setting in a disk device or an IP address setting list.

[Configuration of Work Instruction Document Generating Apparatus]

Figure 2:
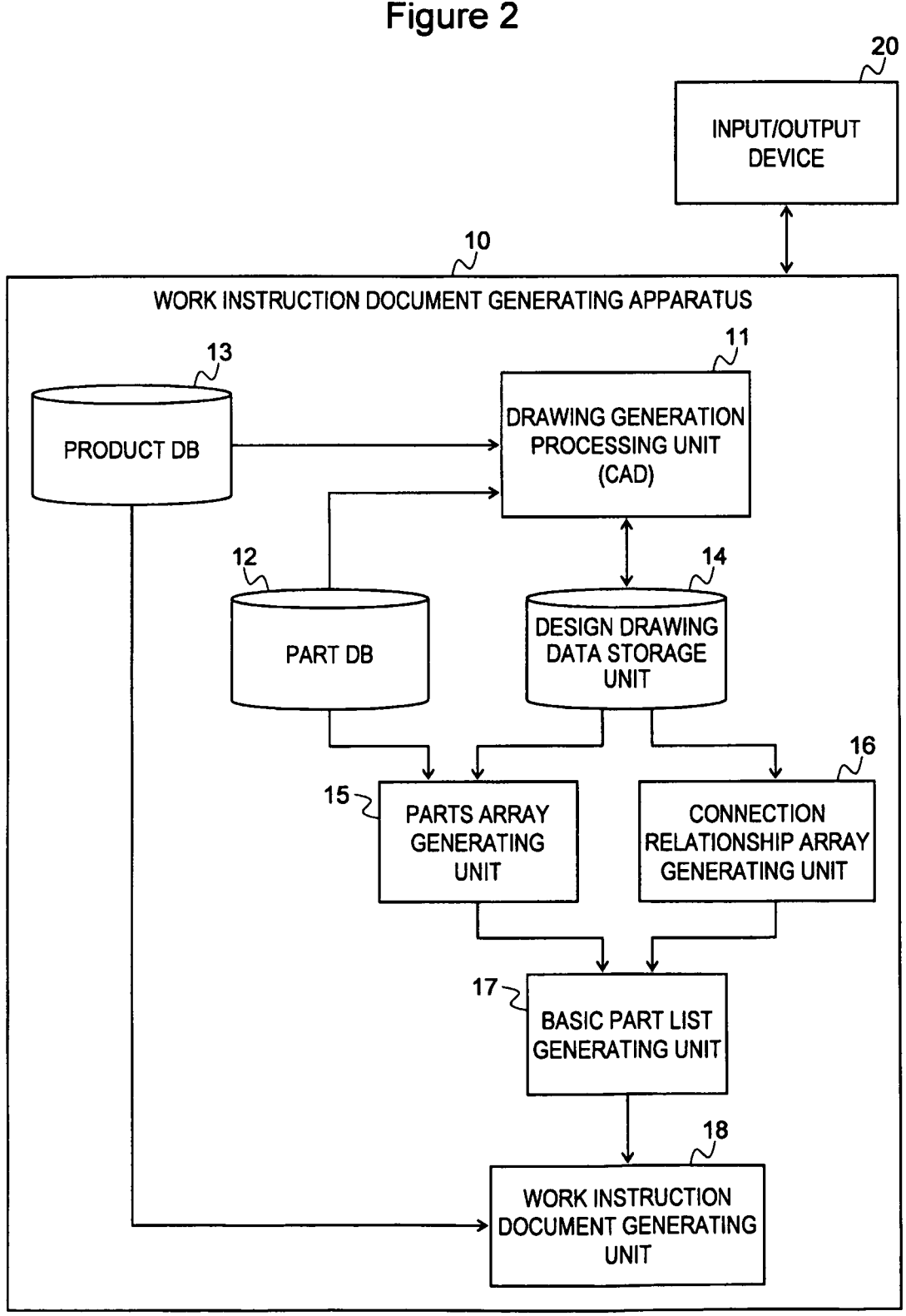
FIG. 2 is a diagram illustrating a configuration example of a work instruction document generating apparatus according to an embodiment of the present invention.

FIG. 2 is a diagram illustrating a configuration example of a work instruction document generating apparatus according to the embodiment of the present invention. A work instruction document generating apparatus 10 is provided with a drawing generation processing unit 11, a part DB 12, a product DB 13, a design drawing data storage unit 14, a parts array generating unit 15, a connection relationship array generating unit 16, a basic part list generating unit 17 and a work instruction document generating unit 18. These are realized by a computer system consisting of hardware consisting of the CPU, the memory and the like, and a software program. The parts array generating unit 15, the connection relationship array generating unit 16, and the basic part list generating unit 17 correspond to the part group extracting unit 4 shown in FIG. 1. An input/output device 20 is connected to the work instruction document generating apparatus 10.

The drawing generation processing unit 11 has, for example, processing functions of graphical processing software such as CAD. A designer uses the part registered in the part DB 12 or the product which is the standard configuration article registered in the product DB 13 to generate a computer system design drawing by operating the drawing generation processing unit 11 with the input/output device 20. Data of the generated computer system design drawing is stored in the design drawing data storage unit 14.

Here, the part is a sub-element constituting the information device. For example, the motherboard, the CPU, the memory and the like constituting the server are the parts. Moreover, the product is a part group in which prescribed parts are connected in a prescribed arrangement. For example, a server in which a prescribed motherboard, a prescribed CPU and a prescribed memory are connected to one another at prescribed positions or the like is the product.

What the work instruction document generating apparatus 10 according to the present invention performs is to use the part DB 12 and the product DB 13 from the design drawing data stored in the design drawing data storage unit 14 to automatically generate a work instruction document in which information for supporting a person in charge of the field work at a computer system installation location in easily working without errors has been recorded. In this work instruction document, part information related to a difference between the product which is the standard configuration article registered in the product DB 13 and a part group of an actual configuration article clipped from the design drawing data is integrated and recorded for each product.

For generating the above described work instruction document, first, the parts array generating unit 15 generates a data array for all parts used in the generated design drawing (hereinafter referred to as "parts array"), from the design drawing data stored in the design drawing data storage unit 14 and data of each part registered in the part DB 12.

The connection relationship array generating unit 16 generates a data array for connection relationships among all parts on the generated design drawing (hereinafter referred to as "connection relationship array"), from the design drawing data stored in the design drawing data storage unit 14.

The basic part list generating unit 17 generates a basic part list of the design drawing from the parts array of the design drawing generated by the part array generating unit 15 and the connection relationship array of the design drawing generated by the connection relationship array generating unit 16. The basic part list is a list of part group data centering on basic parts. In other words, the basic part list is a list in which, for each basic part representing a product, data of each part in a group of parts connected in a chained manner at the connection point for which the property of the connection relationship information is the internal connection with respect to the basic part, has been stored.

The work instruction document generating unit 18 extracts the difference between the part group and the product for each part group centering on the basic parts in the basic part list of the design drawing generated by the basic part list generating unit 17, and generates the work instruction document for work such as the addition/deletion/replacement or the like of the part performed for each product at the time of actual system installation. The difference from the product is extracted by comparison of a part configuration with that of the product which has been previously registered in the product DB 13.

[Part Registration]

As premises for generating the above described work instruction document, part registration in the part DB 12 is required. An example of this part registration in the part DB 12 will be described. A process of this part registration is basically similar to graphic element registration in a conventional common CAD system. However, particularly in this embodiment, the property of the connection relationship information and the property of the anchor ID for identifying the basic part, which will be described below, are registered as the properties of the part which is the graphic element.

Figure 3:
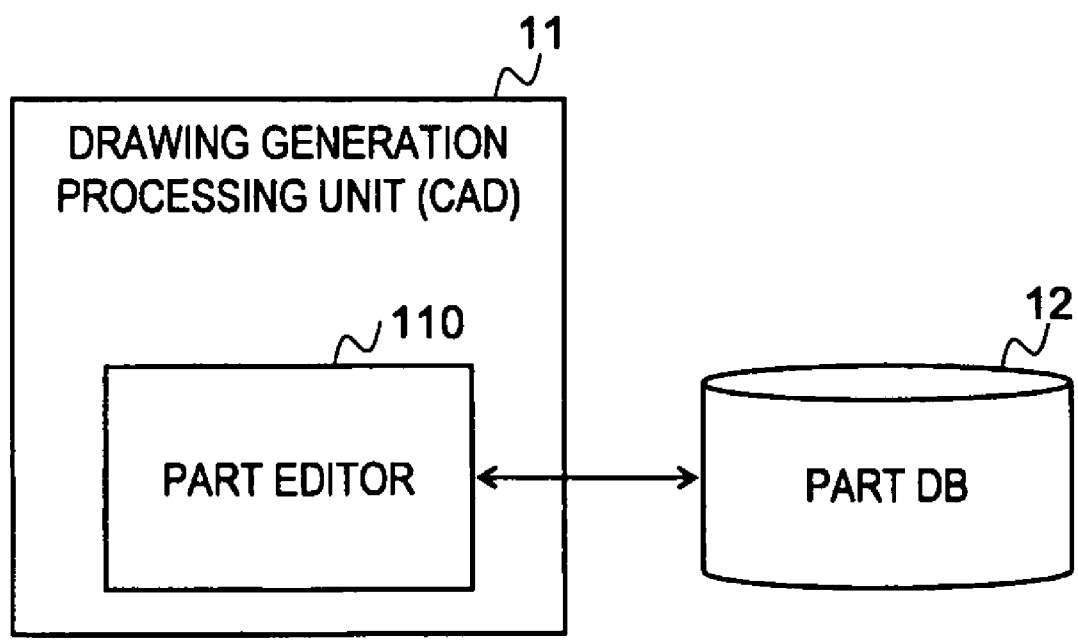
FIG. 3 is a configuration diagram illustrating an example of part registration in a part DB.

FIG. 3 is a configuration diagram showing the example of the part registration in the part DB. If the product or the computer system is designed with the CAD, it is necessary to previously register the parts to be used in the design drawing, in the part DB 12. In this embodiment, a part editor 110 attached to the drawing generation processing unit (CAD) 11 is used to generate the parts to be registered in the part DB 12.

Figure 4:
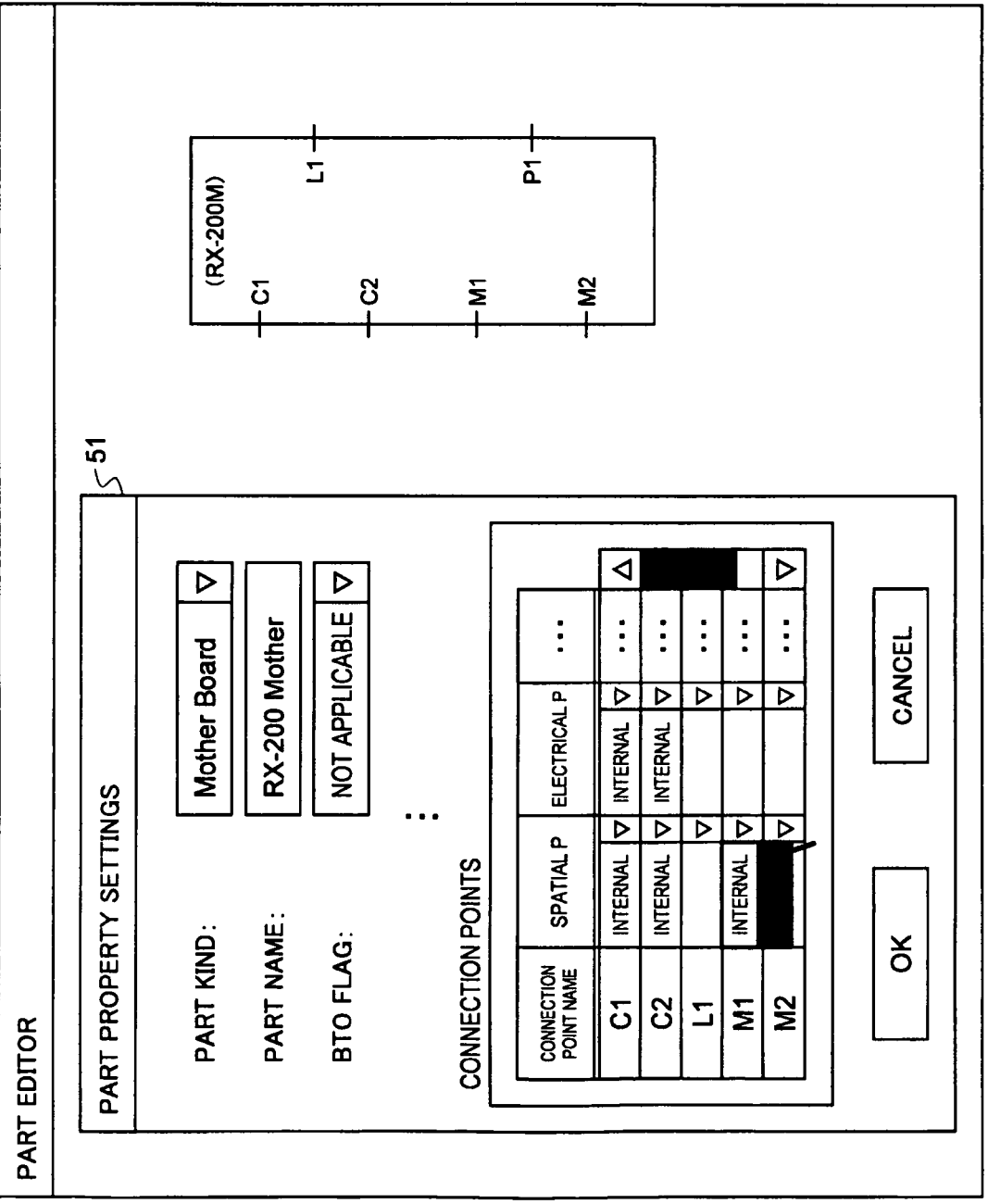
FIG. 4 is a diagram illustrating an example of a part editor screen.

FIG. 4 is a diagram showing an example of a part editor screen. When the part editor 110 is started, a part editor screen 50 as shown in FIG. 4 is displayed on a display of the input/output device 20. On the part editor screen 50, first, a drawing graphic of a part is designed. In FIG. 4, the drawing graphic of a motherboard with a part type name of "RX-200M" is designed.

For the generated part, properties such as, for example, an operating voltage and an operating speed are defined. Moreover, the connection points for the connection to other parts are set to each part. In the example of FIG. 4, connection points "C1", "C2", "M1", "M2", "P1" and "L1" are set to the motherboard. Also for each set connection point, properties such as, for example, a type or a shape of a connection interface and a supply voltage are defined. In this embodiment, in addition to the above described existing properties, properties for generating the work instruction document for each information device constituting the computer system are further required. Hereinafter, descriptions of the above described existing properties will be omitted, and the properties required for generating the work instruction document for each information device constituting the computer system will be mainly described.

In the part editor 110, in addition to generation of the drawing graphic of the part, various properties are set. The properties are inputted, for example, by selecting "Part Property Settings" at a menu on the part editor 110 or the like to open a part property setting window 51. FIG. 4 shows that a spatial connection property (field of "SPACE P" in the figure) of the connection point L1 is being set in a combo box manner, in the part property setting window 51.

The part editor 110 registers data of the drawing graphic, the properties and the like of the generated part, as record data for each part, in the part DB 12. When the data of the drawing graphic, the properties and the like of the part registered in the part DB 12 is used on a CAD drawing, the data is copied onto the drawing and indicates a persistent nature which is unchanged.

FIG. 5 is a diagram showing an example of the part data in the part DB. In FIG. 5, part data 60 for the parts registered in the part DB 12 is represented in a tabular format. It should be noted that, in the part data 60 of FIG. 5, data of the properties required for generating the work instruction document or the like is mainly described, and data which is not required for generating the work instruction document is omitted.

The part data 60 is composed of a part type name, a part kind, a part name, the BTO flag, information on other properties and the like, connection point information and the like. The part type name is a unique name set to the part. The part kind denotes a sort of the part such as the motherboard, the CPU and the memory. The part name is a common name of the part. The BTO flag will be described in detail in Embodiment 2 to be described below. The information on other part properties and the like includes the existing properties such as, for example, the operating voltage and the operating speed.

The connection point information is information on the connection point set to the part. The connection point information is composed of a connection point name, a connection property, information on other properties and the like, and the like. The connection point name is a name set to the connection point. The connection property denotes whether the connection is the internal connection or the external connection if a part is connected to the connection point. In the case of the internal connection, the connected part is handled as a part belonging to one part group corresponding to a product (a portion integrated in an information device), and in the case of the external connection, the connected part is handled as a part belonging to another part group. The connection property includes the spatial connection property and an electrical connection property, which will be described in detail in Embodiment 3 to be described below. The information on other properties and the like includes the existing properties such as, for example, the type or the shape of the connection interface and the supply voltage.

Furthermore, as a property of the part, if the part is one basic part representing a standard product, there is the property of the anchor ID which is the identification information for uniquely identifying the basic part, and this property of the anchor ID can also be registered at the time of the part registration. However, in this embodiment, the registration of the property of the anchor ID is performed at the time of product registration to be described below. The anchor ID may be performed at the time of the part registration or may be performed for the basic part at the time of the product registration, in the case of practicing the present invention. However, since there may often be different products using the same basic part, such as RX200S2 and RX200S2A to be described below, the anchor ID is typically registered at the time of the product registration. At the time of the part registration for the basic part, if the basic part is known to be used by only one product, the anchor ID may be registered at the time of the part registration.

[Product Registration]

An example of the product registration in the product DB 13 will be described.

Figure 6:
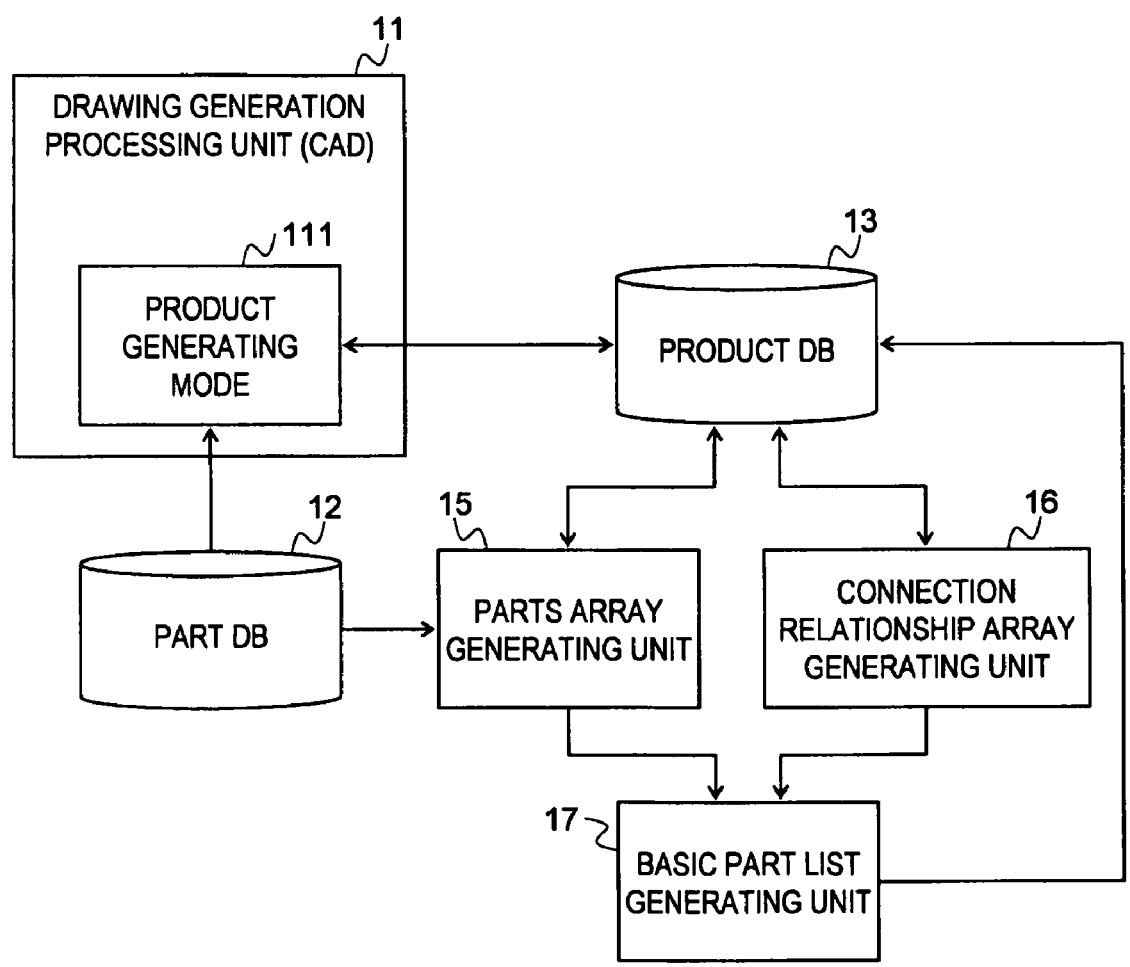
FIG. 6 is a configuration diagram illustrating an example of product registration in a product DB.

FIG. 6 is a configuration diagram showing the example of the product registration in the product DB. Products used for designing the computer system are generated by using the parts registered in the part DB 12, and previously registered in the product DB 13. In this embodiment, the products to be registered in the product DB 13 are designed by starting the drawing generation processing unit (CAD) 11 in a product generating mode 111.

In the product generating mode 111, in addition to the properties of the parts registered in the part DB 12, properties of the part, which are effective within a product drawing, can be added. These properties of the part includes properties of a part ID for maintaining uniqueness of the part within the product drawing, and the anchor ID which is uniquely assigned to one basic part representing the part group, for identifying the part group as the product.

Figure 7:
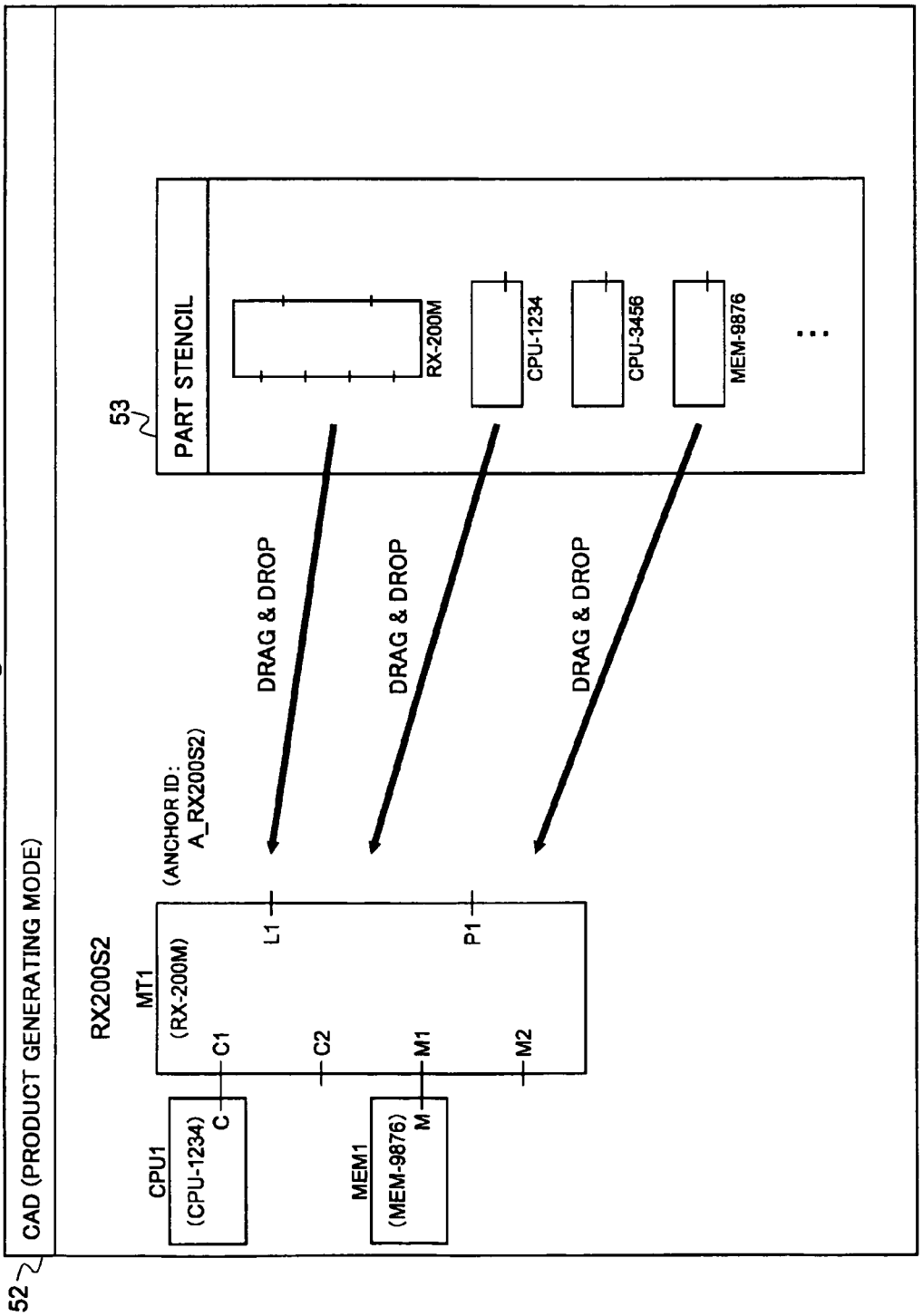
FIG. 7 is a diagram illustrating an example of a CAD screen (product generating mode)
Figure 8:
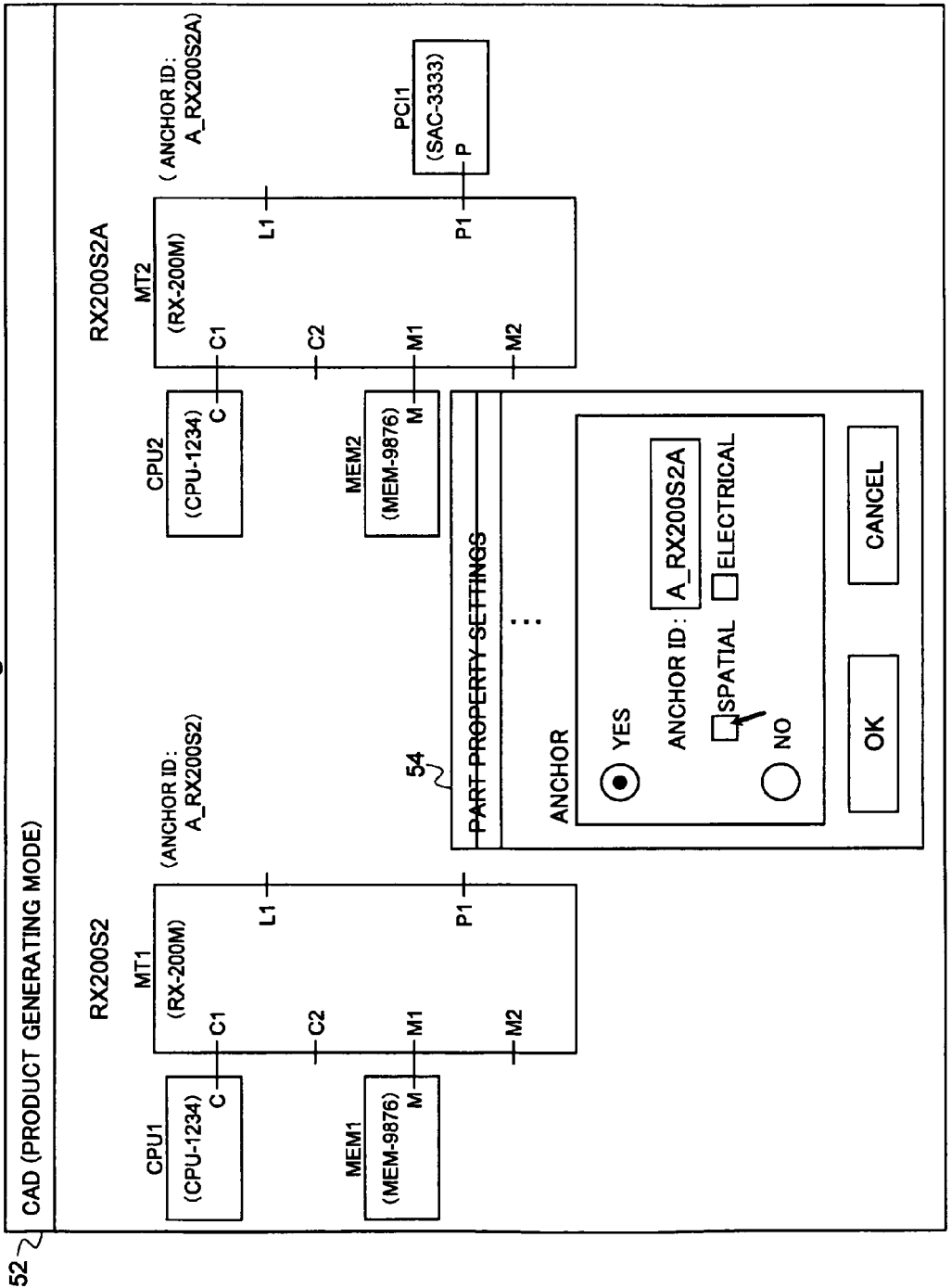
FIG. 8 is a diagram illustrating an example of the CAD screen (product generating mode)

FIGS. 7 and 8 are diagrams showing examples of a CAD screen (product generating mode). When the drawing generation processing unit (CAD) 11 is started in the product generating mode 111, a CAD screen (product generating mode) 52 is displayed on the display of the input/output device 20. Here, an example of designing the product using the motherboard with the part type name of "RX-200M" on the CAD screen (product generating mode) 52 will be described.

The product design is performed by placing the parts registered in the part DB 12 on the CAD screen (product generating mode) 52. The parts may be placed, for example, as shown in FIG. 7, from a part stencil window 53 on the CAD screen (product generating mode) 52. The drawing graphics of the parts registered in the part DB 12 are arranged in the part stencil window 53, from which a drawing graphic of a part required for the product drawing is pasted onto the CAD screen (product generating mode) 52 by drag and drop. Thereby, the parts are placed. At this time, the properties of the parts are also simultaneously copied.

In FIG. 7, a product with a product type name of "RX200S2" is designed with three parts with the part type names of "RX-200M", "CPU-1234" and "MEM-9876". To the respective parts, the part IDs of "MT1", "CPU1" and "MEM1" are set, respectively. To the part with the part ID of "MT1", the anchor ID of "A_RX200S2" is set. This part with the part ID of "MT1" becomes the basic part of this product. The basic part is one representative part in the part group constituting the product, and particularly refers to a main part thereof. It should be noted that, in this embodiment, the anchor ID set to the basic part excluding "A_" is the product type name of the product.

From another viewpoint, it can be said that the example of the product drawing of FIG. 7 indicates a part configuration of the product with the product type name of "RX200S2". Therefore, for example, if a SCSI array card is added to the connection point "P1" of this product with the product type name of "RX200S2", the part configuration of the product is changed, and the product becomes another product. Here, the product type name of the product in which the SCSI array card has been added to the connection point "P1" of the product with the product type name of "RX200S2" is "RX200S2A".

In FIG. 8, the product with the product type name of "RX200S2A" is designed in addition to the product type name of "RX200S2". In this way, multiple products may be designed on one screen. The product with the product type name of "RX200S2A" has a configuration in which a SCSI array card with the part type name of "SAC-3333" has been additionally connected to the connection point P1 of the product with the product type name of "RX200S2". To the respective parts, the part IDs of "MT2", "CPU2", "MEM2" and "PCI1" are set, respectively.

In FIG. 8, a part property setting window 54 of the part with the part ID of "MT2" is opened, and the properties are set. In order to set the part ID of "MT2" as the basic part, an anchor is set to "Yes" and the anchor ID is set to "A_RX200S2A" in the part property setting window 54.

Necessary product drawings are generated by repeating such design work and stored in a storage device. After the product design is completed, a product DB generation command is inputted from the input/output device 20, and thereby the product defined by the product drawing is registered in the product DB 13.

When the product DB generation command is inputted, the parts array generating unit 15 and the connection relationship array generating unit 16 execute a process similar to the case of performing the generation of the parts array and the generation of the connection relationship array from the system design drawing, and perform a process of registering information thereon for each product in the product DB 13. In other words, the parts array generating unit 15 generates the parts array for all parts used in the product drawing, from product drawing data generated by the drawing generation processing unit 11 and the data of each part registered in the part DB 12. Moreover, the connection relationship array generating unit 16 generates the connection relationship array for the connection relationships among all parts on the product drawing, from the product drawing data generated by the drawing generation processing unit 11. The parts array of the product generated by the parts array generating unit 15 and the connection relationship array of the product generated by the connection relationship array generating unit 16 are stored in the product DB 13.

FIG. 9 is a diagram showing an example of the parts array of the products. In FIG. 9, a parts array of the products 61 is represented in a tabular format. The parts array of the products 61 of FIG. 9 is part information on the products with the product type name of "RX200S2" and the product type name of "RX200S2A" which have been designed in FIGS. 7 and 8, and further, products of a switching hub with the product type name of "HUB2518" and a SCSI disk enclosure with the product type name of "SX10". It should be noted that, in the parts array of the products 61 of FIG. 9, the data of the properties required for generating the work instruction document or the like is mainly described, and the data which is not required for generating the work instruction document is omitted. In addition, in the parts array of the products 61 of FIG. 9, the parts are integrated for each product type name so that which product is composed of which part can be easily understood.

The parts array of the products 61 is composed of the part ID, the part type name, the anchor ID, an anchor spatial property, an anchor electrical property, the information on other properties and the like, the connection point information and the like. The part type name and the connection point information are data copied from the part DB 12. The part ID, the anchor ID, the anchor spatial property and the anchor electrical property are data set at the time of the generation of the product drawing. The anchor spatial property and the anchor electrical property will be described in detail in Embodiment 3 to be described below. The information on other properties and the like is data of the information on other part properties and the like copied from the part DB 12 or the like, and data of properties other than the above which have been set at the time of the product design or the like.

FIG. 10 is a diagram showing an example of the connection relationship array of the products. In FIG. 10, a connection relationship array of the products 62 is represented in a tabular format. The connection relationship array of the products 62 of FIG. 10 is connection relationship information on the products with the product type name of "RX200S2" and the product type name of "RX200S2A" which have been designed in FIGS. 7 and 8, and further, the products of the switching hub with the product type name of "HUB2518" and the SCSI disk enclosure with the product type name of "SX10". However, since there is no connection relationship between the parts of the products with the product type name of "HUB2518" and the product type name of "SX10" (see the parts array of the products 61 of FIG. 9), the connection relationship array of the products 62 of FIG. 10 is practically the connection relationship information on the products with the product type name of "RX200S2" and the product type name of "RX200S2A" which have been designed in FIGS. 7 and 8. It should be noted that, in the connection relationship array of the products 62 of FIG. 10, the data of the properties required for generating the work instruction document or the like is mainly described, and the data which is not required for generating the work instruction document is omitted.

The connection relationship array of the products 62 is composed of a start point part ID, a start point-connection point name, an end point part ID, an end point-connection point name, information on other properties and the like, and the like. The start point part ID indicates the part ID of a part which becomes a start point of the connection relationship, and the start point-connection point name indicates the connection point name in the part which becomes the start point of the connection relationship. The end point part ID indicates the part ID of a part which becomes an end point of the connection relationship, and the end point-connection point name indicates the connection point name in the part which becomes the end point of the connection relationship. The information on other properties and the like includes, for example, properties of a connection kind and the like.

The basic part list generating unit 17 generates a basic part list of the products from the parts array of the product drawing generated by the parts array generating unit 15 and the connection relationship array of the product drawing generated by the connection relationship array generating unit 16. A procedure from the generation of the parts array and the connection relationship array of the products to the generation of the basic part list of the products is the same as a procedure of generating the basic part list of the design drawing. The generated basic part list of the products is stored in the product DB 13, and subsequently used at the time of the generation of the work instruction document.

FIG. 11 is a diagram showing an example of the basic part list of the products. In FIG. 11, a basic part list of the products 63 is represented in a tabular format. The basic part list of the products 63 of FIG. 11 is generated from the parts array of the products 61 of FIG. 9 and the connection relationship array of the products 62 of FIG. 10. It should be noted that, in the basic part list of the products 63 of FIG. 11, the data of the properties required for generating the work instruction document or the like is mainly described, and the data which is not required for generating the work instruction document is omitted.

The basic part list of the products 63 is composed of basic part information and associated part information. The basic part information is information on the basic part to which the anchor ID has been set, and is the information on that basic part which has been obtained from the parts array of the products 61. An area of the associated part information is an area in which information on parts belonging to the same part group as that of the basic part is recorded, and is composed of directly connected part information and a direct connection point name. It should be noted that, in FIG. 11, only the connection point information with the connection property of "internal" is described.

The directly connected part information is information on a part which is directly connected to the basic part (herein referred to as "child part"), and is the information on the child part which has been obtained from the parts array of the products 61. Actually, the child part also has the associated part information, and if there is a part which is further directly connected to the child part (herein referred to as "grandchild part"), information on the grandchild part is further recorded. The direct connection point name is the connection point name of the connection point of the basic point to which the child part is directly connected.

[Computer System Design]

An example of the computer system design will be described.

Figure 12:
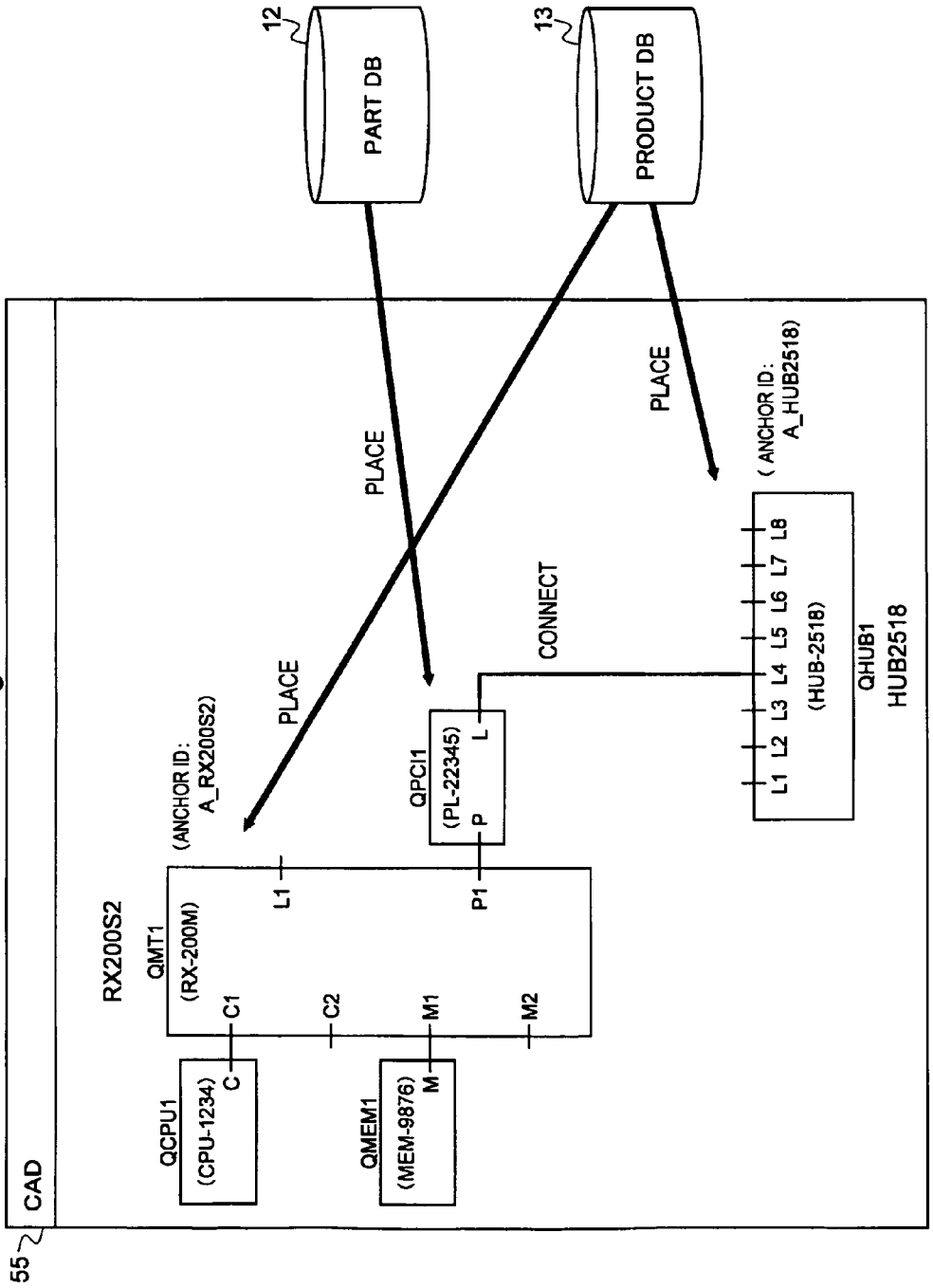
FIG. 12 is a diagram illustrating an example of the CAD screen.

FIG. 12 is a diagram showing an example of the CAD screen. When the drawing generation processing unit (CAD) 11 is normally started, a CAD screen 55 is displayed on the display of the input/output device 20. The computer system design drawing is generated by placing the parts registered in the part DB 12 and the products registered in the product DB 13 on the CAD screen 55. At this time, the properties of the parts and the products are also simultaneously copied from the part DB 12 and the product DB 13 onto the design drawing.

In the example of FIG. 12, the product with the product type name of "RX200S2" is placed from the product DB 13. Moreover, a part with the part type name of "PL-22345" is placed from the part DB 12 so that the connection point P1 of "RX200S2" and a connection point P of "PL-22345" are connected. Furthermore, the product with the product type name of "HUB2518" is placed from the product DB 13, and a connection point L of "PL-22345" and a connection point L4 of "HUB2518" are wire-connected. The computer system design drawing is generated by repeating such work.

It should be noted that, like the part stencil window 53 of FIG. 7, a product stencil window in which drawing graphics of the products registered in the product DB 13 are arranged is prepared, and the drawing graphics of the products may be pasted onto the CAD screen 55 by drag and drop.

Embodiment 1

In this Embodiment 1, an example of generating the work instruction document by extracting the part group from the computer system design drawing and comparing the extracted part group with the product registered in the product DB 13 to extract the difference therebetween will be described.

In this Embodiment 1, it is assumed that the part data 60 shown in FIG. 5 has already been stored in the part DB 12. Moreover, it is assumed that the parts array of the products 61 shown in FIG. 9, the connection relationship array of the products 62 shown in FIG. 10 and the basic part list of the products 63 shown in FIG. 11 have already been stored in the product DB 13. It should be noted that, in this Embodiment 1, the BTO flag, the electrical connection property, the anchor spatial property and the anchor electrical property are not used.

Figure 13:
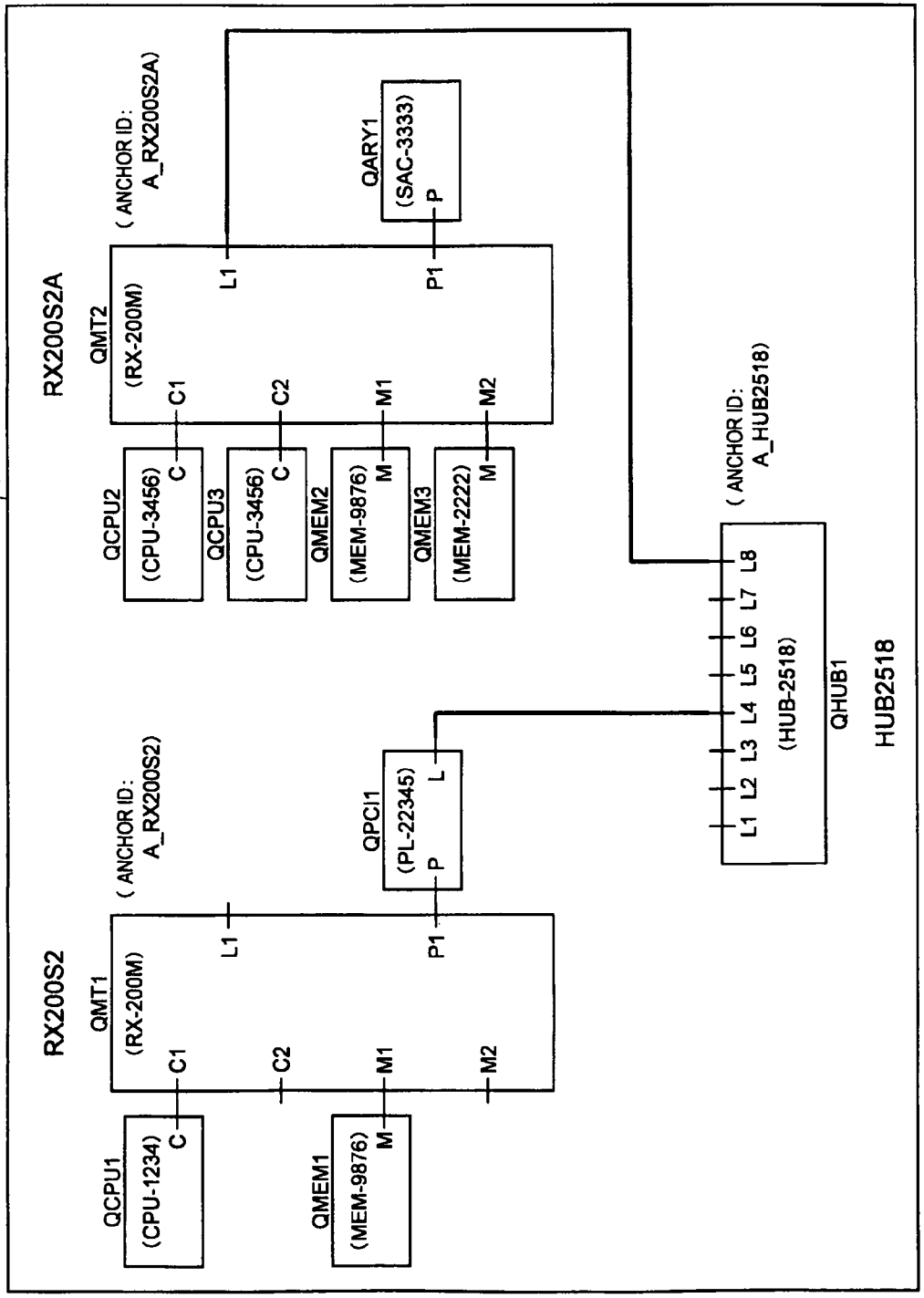
FIG. 13 is a diagram illustrating an example of a computer system design drawing.

FIG. 13 is a diagram showing an example of the computer system design drawing. In a design drawing 90 of FIG. 13, "QMT1","QCPU1", . . . assigned to the respective parts are the part IDs which have been set at the time of the designing, for uniquely identifying the respective parts in the design drawing 90. The design drawing 90 is generated by replacing some parts, adding the parts and wire-connecting the parts, based on the products with the product type names of "RX200S2", "RX200S2A" and "HUB2518". Thus, the parts with the part IDs of "QMT1", "QMT2" and "QHUB1" are assigned with the anchor IDs of "A_RX200S2", "A_RX200S2A" and "A_HUB2518", respectively. It should be noted that a computer system in which two servers are connected to one HUB is assumed in the design drawing 90 of FIG. 13.

FIG. 14 is a diagram showing an example of the parts array of the design drawing. A parts array of the design drawing 64 shown in FIG. 14 has been generated by the parts array generating unit 15, based on the design drawing 90 and the part data 60 in the part DB 12. It should be noted that, in the parts array of the design drawing 64 of FIG. 14, data of properties required for generating the work instruction document according to this Embodiment 1 or the like is mainly described, and data which is not required for generating the work instruction document according to this Embodiment 1 is omitted.

FIG. 15 is a diagram showing an example of the connection relationship array of the design drawing. A connection relationship array of the design drawing 65 shown in FIG. 15 has been generated by the connection relationship array generating unit 16, based on the design drawing 90. It should be noted that, in the connection relationship array of the design drawing 65 of FIG. 15, the data of the properties required for generating the work instruction document according to this Embodiment 1 or the like is mainly described, and the data which is not required for generating the work instruction document according to this Embodiment 1 is omitted.

Here, based on the parts array of the design drawing 64 and the connection relationship array of the design drawing 65 which have been generated, the parts are collected by following only the connection relationship with the connection property of "internal" from the parts assigned with the anchor ID. For example, regarding the part with the part ID of "QMT1" which is assigned with the anchor ID of "A_RX200S2", it can be seen in the parts array of the design drawing 64 of FIG. 14 that all connection points except "L1" have the connection property of "internal". In other words, it can be seen in the design drawing 90 that all of the part with the part ID of "QCPU1" which is connected to the connection point "C1", the part with the part ID of "QMEM1" which is connected to the connection point "M1", and the part with the part ID of "QPCI1" which is connected to the connection point "P1", in the part with the part ID of "QMT1", belong to the same part group. The parts with the part IDs of "QCPU1" and "QMEM1" have no connection with the parts other than the part with the part ID of "QMT1", and in the part with the part ID of "QPCI1", the connection property of the connection point "L" connected to the part other than the part with the part ID of "QMT1" is "external". Therefore, it can be seen that there is no other parts belonging to the same part group. Hence, the part IDs of "QMT1", "QCPU1", "QMEM1" and "QPCI1" become one part group.

If such work is performed for all parts in the design drawing 90, it can be seen that the design drawing 90 is composed of three part groups as follows.

(a) QMT1 (anchor ID: A_RX200S2), QCPU1, QMEM1 and QPCI1
(b) QMT2 (anchor ID: A_RX200S2A), QCPU2, QCPU3, QMEM2, QMEM3 and QARY1
(c) QHUB1 (anchor ID: A_HUB2518)

In this way, due to introduction of a concept of the connection property, it becomes possible to extract the part group connected to the basic part assigned with the anchor ID, with the connection property of the internal connection, from the design drawing 90. In other words, it becomes possible to easily extract the information devices such as the server and the HUB which constitute the computer system, from the design drawing 90 of the computer system.

FIG. 16 is a diagram showing an example of the basic part list of the design drawing. A basic part list of the design drawing 66 shown in FIG. 16 is generated by the basic part list generating unit 17, based on the parts array of the design drawing 64 and the connection relationship array of the design drawing 65. As shown in FIG. 16, the basic part list of the design drawing 66 becomes a list of the part groups centering on the basic parts assigned with the anchor IDs. It should be noted that, in the basic part list of the design drawing 66 of FIG. 16, the data of the properties required for generating the work instruction document according to this Embodiment 1 or the like is mainly described, and the data which is not required for generating the work instruction document according to this Embodiment 1 is omitted.

The work instruction document for each part group is generated by matching between the part group extracted from the design drawing 90 and the product registered in the product DB 13. At this time, the product to be used for the matching with the part group is the product with the anchor ID which is identical with that of the part group. The work instruction document for each part group can be generated by comparing the part configuration of the part group with the part configuration of the product, both of which have the identical anchor ID, to detect the difference between them.

A procedure of generating the work instruction document by the work instruction document generating unit 18 will be described with an example of the part group with the basic part which is the part assigned with the anchor ID of "A_RX200S2" in the design drawing 90. First, search is performed in the product DB 13 with the anchor ID of "A_RX200S2", and data of the product with the basic part which is the part with the anchor ID of "A_RX200S2" is obtained from the basic part list of the products 63. Next, from the obtained data of the product with the anchor ID of "A_RX200S2" and the data of the part group with the anchor ID of "A_RX200S2" in the basic part list of the design drawing 66, the difference in the part configuration between both is extracted. Finally, as the work instruction document for the part group with the anchor ID of "A_RX200S2" in the design drawing 90, a work instruction document in which design change points changed from the design of the product with the anchor ID of "A_RX200S2" are integrated is generated.

The work instruction document for each part group in the design drawing 90 can be generated by performing such work for all part groups in the design drawing 90. In other words, the work instruction document for each information device such as the server or the HUB described in the design drawing 90 is generated, and system installation work becomes easy for a system installation operator in the field.

FIG. 17 is a diagram showing an example of the work instruction document. A work instruction document 67 is the work instruction document for the part group with the anchor ID of "A_RX200S2" in the design drawing 90, and a work instruction document 68 is the work instruction document for the part group with the anchor ID of "A_RX200S2A" in the design drawing 90. It should be noted that since there is no connection point with the connection property of "internal" in the part assigned with the anchor ID of "A_HUB2518" in the design drawing 90, the work instruction document therefor is particularly omitted.

In each work instruction document (67 and 68), the basic part is represented as an outer frame, and for each connection point of the basic part (however, only the connection point with the connection property of "internal"), the part name and the part type name of the part connected to the connection point are described for each of the product and the actual configuration article. Here, the actual configuration article refers to the configuration of the part group in the design drawing 90. The work instruction is generated by taking the difference for each connection point.

It can be seen in the work instruction document 67 that the actual configuration article has a configuration in which a LAN card with the part type name of "PL-22345" has been added to the product with the product type name of "RX200S2". Moreover, it can be seen in the work instruction document 68 that the actual configuration article has a configuration in which a CPU with the part type name of "CPU-3456" and a memory with the part type name of "MEM-2222" have been added to the product with the product type name of "RX200S2A". Moreover, it can be seen that, as the CPU at the connection point C1 of the product with the product type name of "RX200S2A", the CPU with the part type name of "CPU-1234" has been replaced with the CPU with the part type name of "CPU-3456".

The installation operator for installing the computer system in the field performs work such as the addition, the deletion or the replacement of the part for the product for each information device according to the work instruction documents (67 and 68), respectively, and further performs work such as the installation and connection of each information device according to the design drawing 90. Since the change points are clear for each information device, the work becomes easy.

Embodiment 2

In this Embodiment 2, an example in the case where the BTO (Built To Order) is practiced in the above described Embodiment 1 will be described. The BTO is generally a system in which a customer specifies a combination of parts and orders an original product, and a manufacturer produces the product according to the order. In the above described Embodiment 1, the work instruction document is generated on the premise that all work of changing the parts is performed in the field of the installation. However, in this Embodiment 2, the work instruction document is generated on the premise that the product in a state where a part targeted for the BTO has been previously changed at the factory or the like is sent to the installation field.

In this Embodiment 2, similarly to the above described Embodiment 1, it is assumed that the part data 60 shown in FIG. 5 has already been stored in the part DB 12. Moreover, it is assumed that the parts array of the products 61 shown in FIG. 9, the connection relationship array of the products 62 shown in FIG. 10 and the basic part list of the products 63 shown in FIG. 11 have already been stored in the product DB 13. It should be noted that, in this Embodiment 2, the electrical connection property, the anchor spatial property and the anchor electrical property are not used.

As shown in the part data 60 of FIG. 5, the BTO flag has been set to each part. The BTO flag has three values of "possible"/"impossible"/"not applicable". The BTO flag of "possible" indicates that the part is a part which is delivered in a state of having already been mounted to the product at the factory, if the part has been added to or replaced in the product in the design drawing, or the like. The BTO flag of "impossible" indicates that the part is a part which is delivered in a state of a part not yet being mounted to the product and needs to be mounted to the product in the field, if the part has been added to or replaced in the product in the design drawing, or the like. The BTO flag of "not applicable" indicates that the part is a part which has been normally mounted to the product. It should be noted that, if the part with the BTO flag of "not applicable" has been individually added to the design drawing, it means that the system has been constructed by using a resting article or the like, which equals to the BTO flag of "impossible" in terms of operation.

It should be noted that, in this Embodiment 2, a different part type name is set even to the same part with a different setting in the BTO flag. For example, in the part data 60 of FIG. 5, there are CPUs with the part name of "P IV (3 GHz)", which are the CPU with the BTO flag set to "possible" and the CPU with the BTO flag set to "impossible". It can be seen in the part data 60 of FIG. 5 that separate part type names, that is, "CPU-3456" and "CPU-3457" are set to the same CPU, respectively.

In this Embodiment 2, it is assumed that the design drawing 90 of FIG. 13 has been designed similarly to the above described Embodiment 1.

FIG. 18 is a diagram showing an example of the parts array of the design drawing. A parts array of the design drawing 69 shown in FIG. 18 is generated by the parts array generating unit 15, based on the design drawing 90 and the part data 60 in the part DB 12. It should be noted that, in the parts array of the design drawing 69 of FIG. 18, data of properties required for generating the work instruction document according to this Embodiment 2 or the like is mainly described, and data which is not required for generating the work instruction document according to this Embodiment 2 is omitted. The parts array of the design drawing 69 of this Embodiment 2 becomes data in which the BTO flag has been added to the parts array of the design drawing 64 of FIG. 14.

The connection relationship array of the design drawing in this Embodiment 2 is the same as that in the above described Embodiment 1. In other words, it becomes the same as the connection relationship array of the design drawing 65 shown in FIG. 15.

FIG. 19 is a diagram showing an example of the basic part list of the design drawing. A basic part list of the design drawing 70 shown in FIG. 19 is generated by the basic part list generating unit 17, based on the parts array of the design drawing 69 of FIG. 18 and the connection relationship array of the design drawing 65 of FIG. 15. It should be noted that, in the basic part list of the design drawing 70 of FIG. 19, the data of the properties required for generating the work instruction document according to this Embodiment 2 or the like is mainly described, and the data which is not required for generating the work instruction document according to this Embodiment 2 is omitted.

Here, the product with the anchor ID of "RX200S2A which has been registered in the product DB 13 is compared with the part group with the anchor ID of "RX200S2A" in the design drawing 90. Only one CPU with the part type name of "CPU-1234" is mounted to the product, while two CPUs with the part type name of "CPU-3456" are mounted in the design drawing 90. This indicates that the CPU with the part type name of "CPU-1234" has been replaced with the CPU with the part type name of "CPU-3456", and the CPU with the part type name of "CPU-3456" has been further added. Moreover, in the design drawing 90, the memory with the part type name of "MEM-2222" has been added. In the above described Embodiment 1, all work of replacing/adding these parts has been performed in the field of the system installation.

It can be seen in the part data 60 of FIG. 5 that the part with the part type name of "CPU-3456" has the BTO flag of "possible". In other words, it can be seen that the part with the part ID of "CPU-3456" is an optional article which can be replaced/added at the factory. In this Embodiment 2, the work of replacing/adding these parts is performed at the factory, but is not performed in the field of the system installation. It should be noted that since the part with the part type name of "MEM-2222" has the BTO flag of "impossible", the replacement/addition thereof cannot be performed at the factory.

FIG. 20 is a diagram showing an example of the work instruction document. FIG. 20 is a work instruction document 71 for the part group with the anchor ID of "RX200S2A" in the design drawing 90. With respect to other part groups, since there is no part with the BTO flag of "possible", descriptions thereof are omitted. The part with the BTO flag of "possible" is delivered in the state of having been mounted to the product at the factory. Thus, in the work instruction document 71, the part with the BTO flag of "possible" and the part type name of "CPU-3456" has been previously built in the configuration of the product.

In this Embodiment 2, the configuration of the product in the work instruction document 71 is "a configuration of a standard product+a BTO-enabled optional article", that is, a configuration at the time of having been delivered from the factory. Therefore, when the acceptance inspection of delivered goods is performed in the field of the system installation, it is only necessary to check a list on the product side in the work instruction document 71, which makes acceptance inspection work easy. Moreover, the work instruction in the work instruction document 71 is not the difference from the configuration of the standard product, but is the difference from the configuration of the delivered product, which means that only work required in the field of the system installation has been clearly indicated. In this way, the work instruction document for each information device can be generated by using the connection property and the anchor ID, and also by using the BTO flag, it is possible to automatically generate a work instruction document adapted to actual construction in the field of the acceptance inspection or the system installation.

It should be noted that, for the part with the BTO flag of "possible", information indicating that the part is the factory-attached article may be recorded in the work instruction document, instead of handling the part as a part built in the product.

Embodiment 3

In this Embodiment 3, an example in the case where there are the spatial connection property and the electrical connection property as the connection property in the above described Embodiment 1 will be described. The spatial connection property is a connection property indicating whether the connection is spatially the internal connection or the external connection. In other words, it indicates whether the connection is the connection within one information device or the connection between the information devices. Moreover, the electrical connection property is a property indicating whether the connection is electrically the internal connection or the external connection. In other words, it indicates whether the connection is the connection within one information device group in terms of system operation or the connection between information device groups in terms of the system operation.

In this Embodiment 3, similarly to the above described Embodiment 1, it is assumed that the part data 60 shown in FIG. 5 has already been stored in the part DB 12. Moreover, it is assumed that the parts array of the products 61 shown in FIG. 9, the connection relationship array of the products 62 shown in FIG. 10 and the basic part list of the products 63 shown in FIG. 11 have already been stored in the product DB 13.

Figure 21:
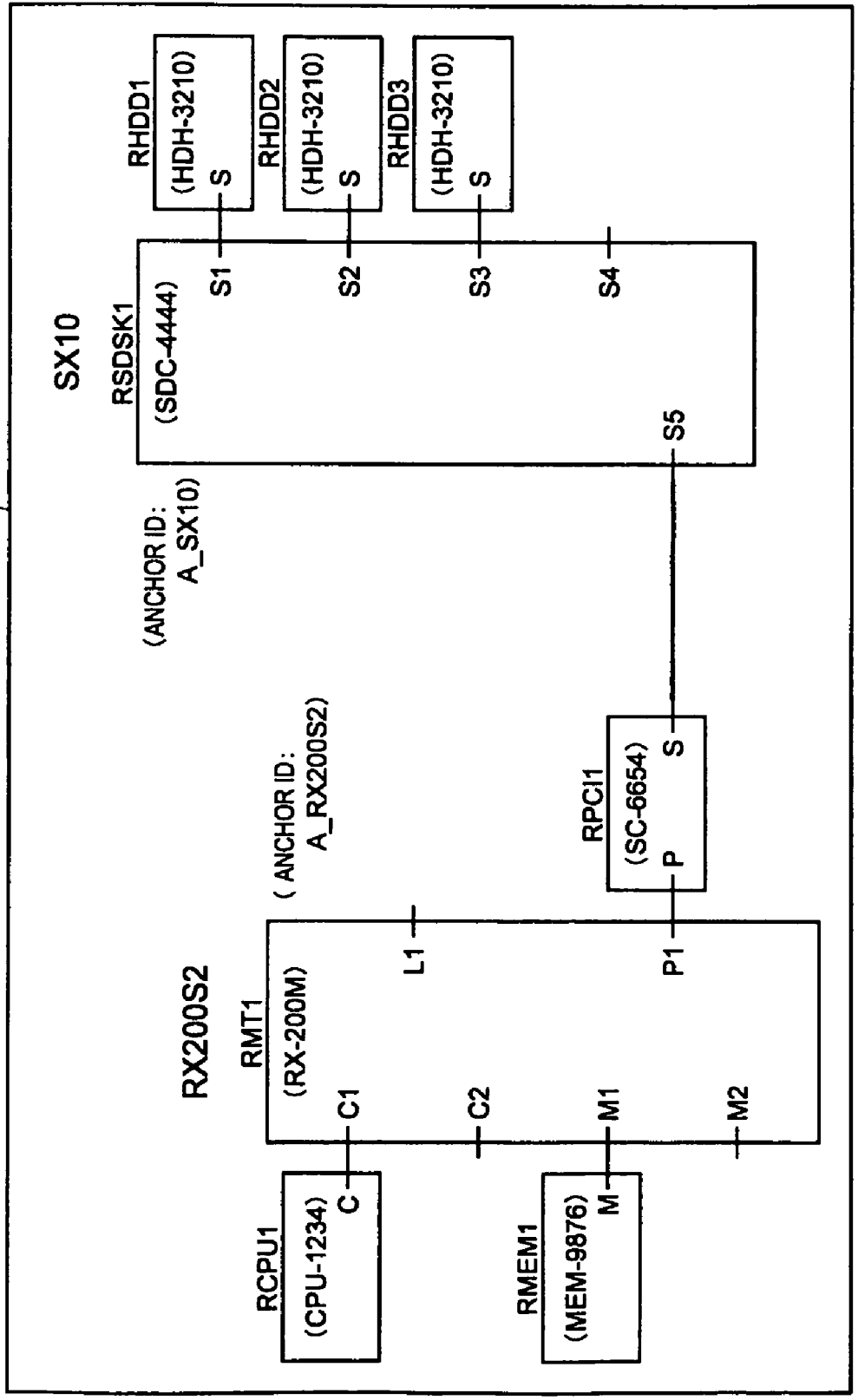
FIG. 21 is a diagram illustrating an example of the computer system design drawing.

FIG. 21 is a diagram showing an example of the computer system design drawing. A design drawing 91 is generated by adding the parts and wire-connecting the parts, based on the products with the product type names of "RX200S2" and "SX10". Thus, the parts with the part IDs of "RMT1" and "RSDSK1" are assigned with the anchor IDs of "A_RX200S2" and "A_SX10", respectively. It should be noted that a computer system in which an external SCSI disk device is connected to a server is assumed in the design drawing 91 of FIG. 21.

FIG. 22 is a diagram showing an example of the parts array of the design drawing. A parts array of the design drawing 72 shown in FIG. 22 is generated by the parts array generating unit 15, based on the design drawing 91 and the part data 60 in the part DB 12. It should be noted that, in the parts array of the design drawing 72 of FIG. 22, data of properties required for generating the work instruction document according to this Embodiment 3 or the like is mainly described, and data which is not required for generating the work instruction document according to this Embodiment 3 is omitted.

In the parts array of the design drawing 72, the anchor spatial property is a property indicating whether or not the anchor ID assigned to the part functions spatially. The anchor electrical property is a property indicating whether or not the anchor ID assigned to the part functions electrically. "TRUE" indicates that the anchor ID functions, and "FALSE" indicates that the anchor ID does not function. For example, it can be seen in the parts array of the design drawing 72 of FIG. 22 that the anchor ID of "A_SX10" assigned to the part ID of "RSDSK1" functions spatially but does not function electrically. In other words, the part with the part ID of "RSDSK1" becomes the basic part spatially, but does not become the basic part electrically, and belongs to the part group of another basic part.

FIG. 23 is a diagram showing an example of the connection relationship array of the design drawing. A connection relationship array of the design drawing 73 shown in FIG. 23 is generated by the connection relationship array generating unit 16, based on the design drawing 91. It should be noted that, in the connection relationship array of the design drawing 73 of FIG. 23, the data of the properties required for generating the work instruction document according to this Embodiment 3 or the like is mainly described, and the data which is not required for generating the work instruction document according to this Embodiment 3 is omitted.

If the system installation work instruction document is generated, the generation is performed with reference to the spatial connection property and the anchor spatial property. In the parts array of the design drawing 72, both anchor IDs of "A_RX200S2" and "A_SX10" have the anchor spatial property of "TRUE", and therefore function as the anchor IDs. Based on the parts array of the design drawing 72 and the connection relationship array of the design drawing 73, if the parts are collected by following only the connection relationship with the spatial connection property of "internal" from the parts assigned with the anchor ID, it can be seen that the design drawing 91 is composed of two part groups as follows.

(a) RMT1 (anchor ID: A_RX200S2), RCPU1, RMEM1 and RPCI1

(b) RSDSK1 (anchor ID: A_SX10), RHDD1, RHDD2 and RHDD3

FIG. 24 is a diagram showing an example of the basic part list of the design drawing. A basic part list of the design drawing 74 shown in FIG. 24 is generated by the basic part list generating unit 17, based on the parts array of the design drawing 72 and the connection relationship array of the design drawing 73. It should be noted that, in the basic part list of the design drawing 74 of FIG. 24, the data of the properties required for generating the work instruction document according to this Embodiment 3 or the like is mainly described, and the data which is not required for generating the work instruction document according to this Embodiment 3 is omitted.

FIG. 25 is a diagram showing an example of the work instruction document. A work instruction document 75 is the work instruction document for the part group with the basic part which is the part assigned with the anchor ID of "A_RX200S2" in the design drawing 91, and a work instruction document 76 is the work instruction document for the part group with the basic part which is the part assigned with the anchor ID of "A_SX10" in the design drawing 91.

In this way, in the case of the computer system as shown in the design drawing 91, since the server with the anchor ID of "A_RX200S2" and the SCSI disk device with the anchor ID of "A_SX10" are delivered as separate products, separate work instruction documents make the work easier for the system installation operator.

However, for the operation worker such as an SE (System Engineer), there are also some peripheral devices and the like which belong to the server and are used in terms of administration, and if those peripheral devices and the like are handled as those separated from the server, the work may be inconvenient. For example, in the system of the design drawing 91, the SCSI disk device with the anchor ID of "A_SX10" needs to be set so that the server can freely use the device in terms of the administration/operation, and a setting document therefor or the like is required for the operation worker.

In such a case, the parts may be integrated with reference to the electrical connection property. In the parts array of the design drawing 72, the anchor electrical property of the anchor ID of "A_RX200S2" is "TRUE", while the anchor electrical property of the anchor ID of "A_SX10" is "FALSE". Thus, the anchor ID of "A_RX200S2" functions as the anchor ID, while the anchor ID of "A_SX10" does not function as the anchor ID. In other words, the part with the part ID of "RSDSK1" is handled as the part which is not assigned with the anchor ID.

Based on the parts array of the design drawing 72 and the connection relationship array of the design drawing 73, when the parts are collected by following only the connection relationship with the electrical connection property of "internal" from the parts assigned with the anchor ID, it can be seen that the design drawing 91 is composed of one part group as follows.

(a) RMT1 (anchor ID: A_RX200S2), RCPU1, RMEM1, RPCI1, RSDSK1, RHDD1, RHDD2 and RHDD3

In generation of the setting document for the operation of the computer system, the generation may be performed based on the part group collected in this way.

FIG. 26 is a diagram showing an example of a disk partition design template. A disk partition design template 77 of FIG. 26 has been generated by searching for the part group collected by following only the connection relationship with the electrical connection property of "internal" in the design drawing 91, and collecting only those with the part kind of "SCSI HDD".

In this way, since the connection property is divided into the spatial connection property and the electrical connection property, it is possible to separately use the generation of the work instruction document for the computer system installation and the generation of the setting document for the computer system operation.

FIG. 27 is a diagram showing an example of the work instruction document. FIG. 27 is an example of the work instruction document in the case of having been generated by using the BTO flag in the design drawing 91. As seen in the part data 60 of FIG. 5, the BTO flag of the part with the part type name of "HDH-3210" is "possible". In other words, it can be seen that loading of an HDD into the SCSI disk enclosure is BTO-enabled. Hence the work instruction document for the part group with the basic part which is the part assigned with the anchor ID of "A_SX10" in the case of using the BTO flag in the design drawing 91 becomes a work instruction document 78 of FIG. 27. It should be noted that, from the part data 60 of FIG. 5, since the BTO flag of the part with the part type name of "SC-6654" is "impossible", the work instruction document for the part group with the basic part which is the part assigned with the anchor ID of "A_RX200S2" in the design drawing 91 becomes the same as the work instruction document 75 of FIG. 25.

The BTO flag has a spatial nature, which means that the BTO flag is combined only with the spatial connection property. Hence, also in this Embodiment 3, the work instruction document can also be used as an acceptance inspection document by using the BTO flag without problems.

[Flowcharts of Work Instruction Document Generating Process]

Figure 28:
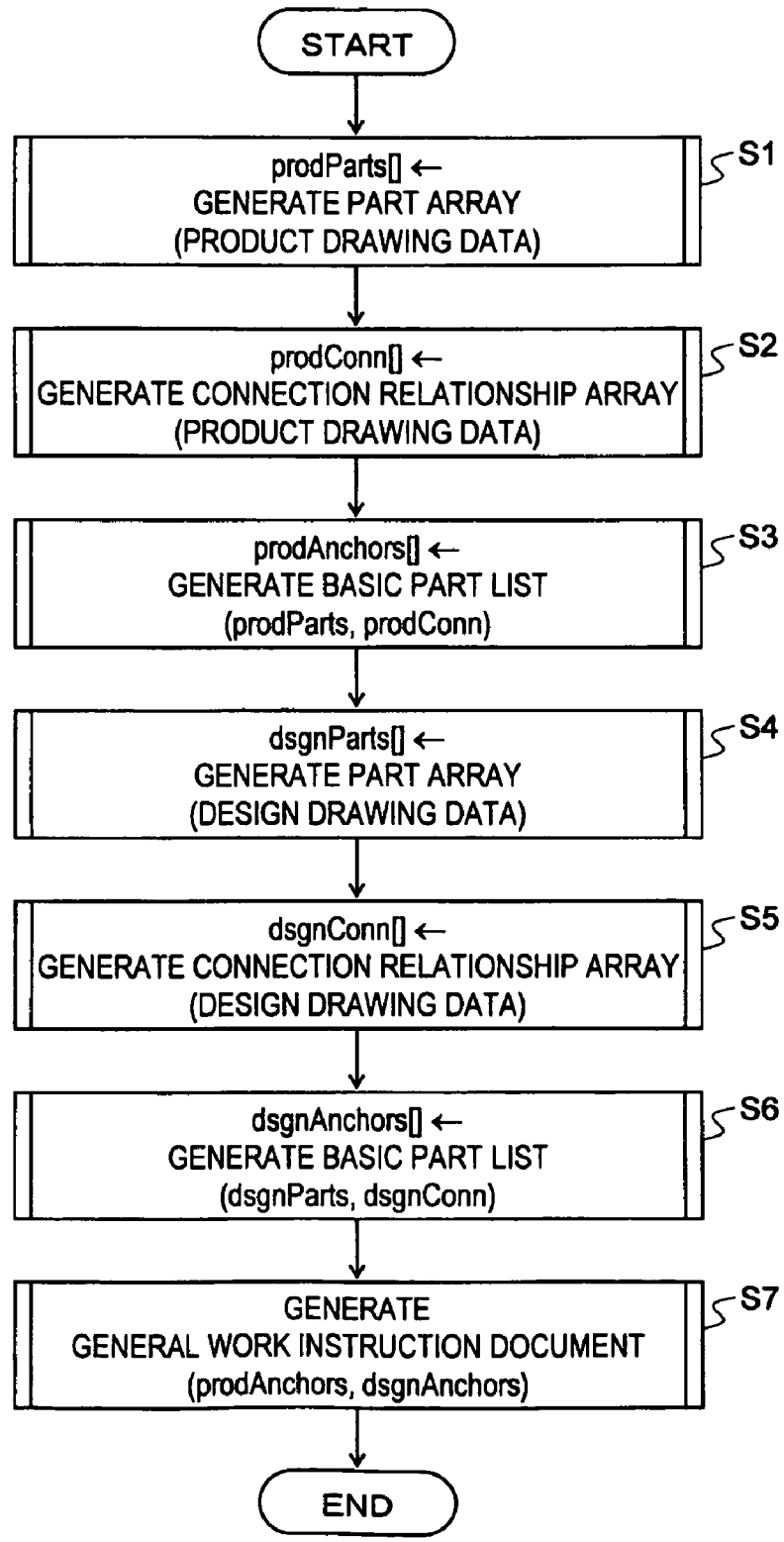
FIG. 28 is a flowchart of a work instruction document generating process.

FIG. 28 illustrates a flowchart of a work instruction document generating process. First, in FIG. 28, a general flow of the work instruction document generating process will be briefly described. In the work instruction document generating process of FIG. 28, the product drawing data and the design drawing data of the system are used as arguments.

First, the basic part list of the products is generated. Based on the product drawing data, a parts array generating process (see FIG. 29) to be described below is performed to generate a parts array of the products (prodParts []) (step S1). Based on the product drawing data, a connection relationship array generating process (see FIG. 30) to be described below is performed to generate a connection relationship array of the products (prodConn []) (step S2). Based on the parts array of the products (prodParts) and the connection relationship array of the products (prodConn), a basic part list generating process (see FIG. 31) to be described below is performed to generate a basic part list of the products (prodAnchors []) (step S3).

Next, the basic part list of the design drawing is generated. Based on the design drawing data, the parts array generating process (see FIG. 29) to be described below is performed to generate a parts array of the products (dsgnParts []) (step S4). Based on the design drawing data, the connection relationship array generating process (see FIG. 30) to be described below is performed to generate a connection relationship array of the design drawing (dsgnConn []) (step S5). Based on the parts array of the design drawing (dsgnParts) and the connection relationship array of the design drawing (dsgnConn), the basic part list generating process (see FIG. 31) to be described below is performed to generate a connection relationship list of the design drawing (dsgnAnchors []) (step S6).

Based on the basic part list of the products (prodAnchors) and the basic part list of the design drawing (dsgnAnchors), a general work instruction document generating process (see FIG. 36) to be described below is performed to generate the work instruction document (step S7).

Figure 29:
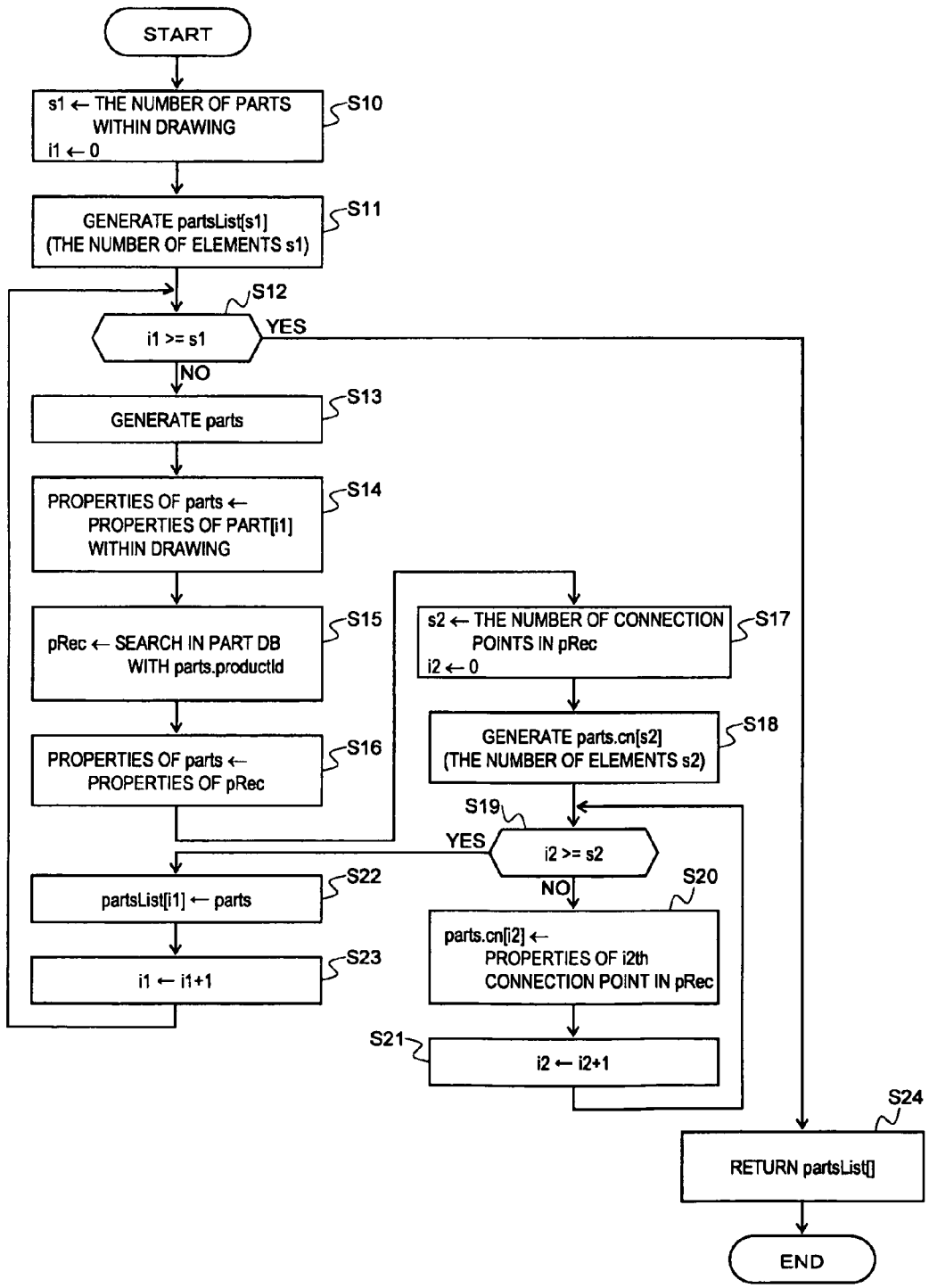
FIG. 29 is a flowchart of a parts array generating process.

FIG. 29 is a flowchart of the parts array generating process. The parts array generating process of FIG. 29 is an example of the process performed by the parts array generating unit 15. In the parts array generating process of FIG. 29, the drawing data (the product drawing data and the design drawing data) is used as arguments.

It should be noted that it is assumed that a part object (parts) has a configuration, for example, as follows.

```
parts {
    partsId:       the part ID
    productId:     the product type name
    name:          the part name
    anchorID:      the anchor ID
    anchSProp:     the anchor spatial property
    anchEProp:     the anchor electrical property
    bto:           the BTO flag
    other arrays of the part object
    cn[ ]:         an array of connection point objects
                   <working properties>
    visited: a visited flag (true/false)
    connParts[ ]:  an array of directly connected part objects
    connName[ ]:   an array of direct connection point names (the
connection point names to which respective elements of connParts
connect)
}
```

Moreover, it is assumed that the connection point object (conn) has a configuration, for example, as follows.

```
conn {
    id:       the connection point name
    sProp:    the spatial connection property
    eProp:    the electrical connection property
    other connection point properties
}
```

The number of the parts within the drawing is assigned to a variable s1, and 0 is assigned to a variable i1 (step S10). A parts array with s1 elements (partsList[s1]) is generated (step S11).

If i1≧s1 (step S12), the parts array (partsList []) is returned (step S24), and the process is completed.

If not i1≧s1 (step S12), a part object (parts) is generated (step S13). The properties (partsid, productid, anchorID, anchSProp, anchEProp and the like) of the part [i1] within the drawing are recorded in the properties of the part object (parts) (step S14). Search is performed in the part DB 12 with the part type name of the part object (parts.productId), and the properties of the appropriate part are copied to pRec (step S15). The properties (name, bto and the like) other than the properties of the connection point information, which have been copied to pRec, are recorded in the part object (parts) (step S16).

The number of connection points in pRec is assigned to a variable s2, and 0 is assigned to a variable i2 (step S17). In the part object (parts), an array of the connection point objects with s2 elements (parts.cn[s2]) is generated (step S18).

If not i2≧s2 (step S19), the properties of the i2th connection point information in pRec are stored in the i2th connection point object in the part object (parts.cn[i2]) (step S20). 1 is added to i2 (step S21), and the process is returned to step S19.

If i2≧s2 (step S19), the part object (parts) is stored in partsList[i1] (step S22). 1 is added to i1 (step S23), and the process is returned to step S12.

Figure 30:
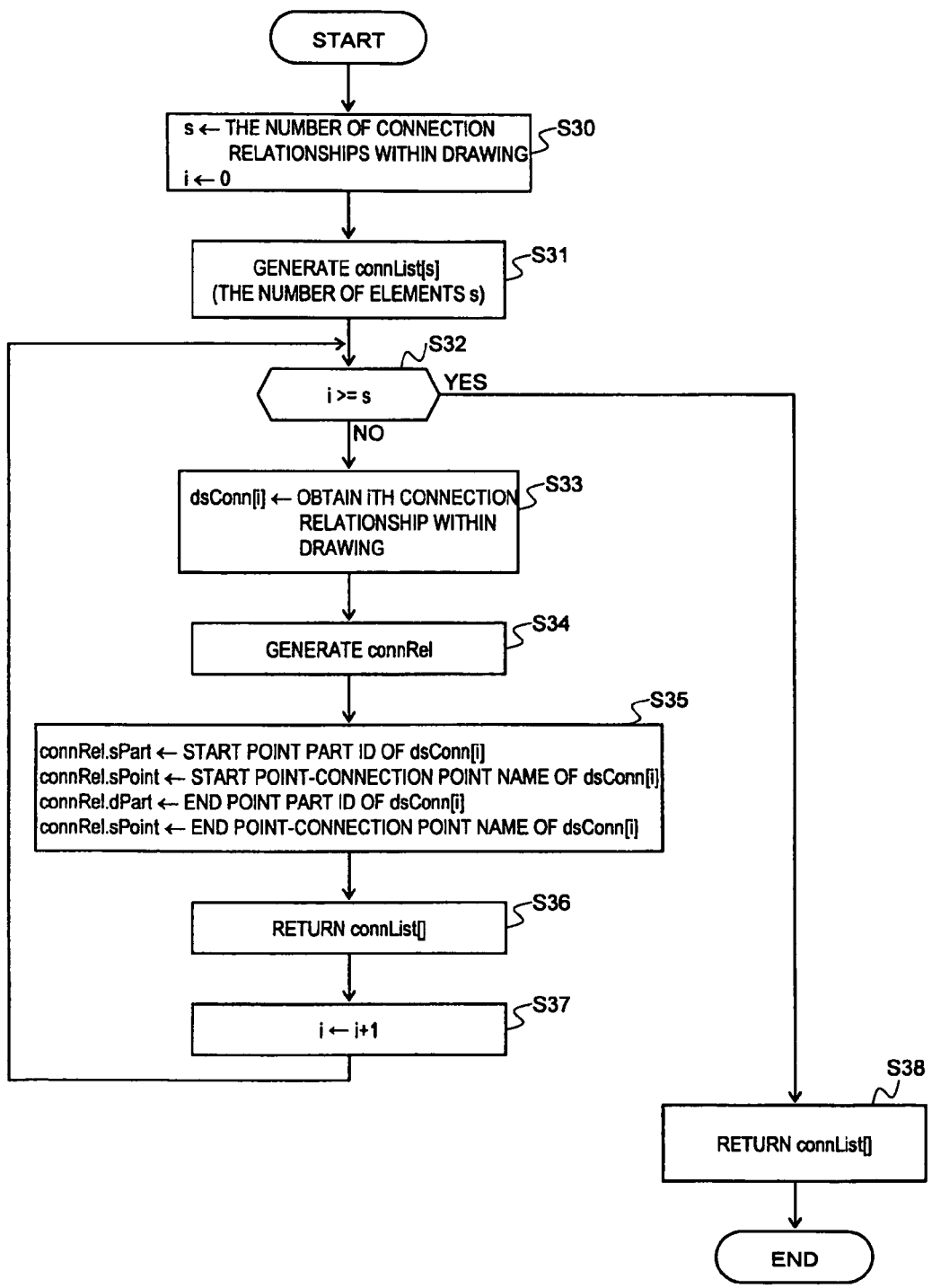
FIG. 30 is a flowchart of a connection relationship array generating process.

FIG. 30 illustrates a flowchart of the connection relationship array generating process. The connection relationship array generating process of FIG. 30 is an example of the process performed by the connection relationship array generating unit 16. In the connection relationship array generating process of FIG. 30, the drawing data (the product drawing data and the design drawing data) is used as arguments.

It should be noted that it is assumed that a connection relationship object (connRel) has a configuration, for example, as follows.

```
connRel {
    sPart:   the start point part ID
    sPoint:  the start point-connection point name
    dPart:   the end point part ID
    dPoint:  the end point-connection point name
    other properties
}
```

The other properties include, for example, the connection kind and the like.

The number of the connection relationships within the drawing is assigned to a variable s, and 0 is assigned to a variable i (step S30). A connection relationship array with s elements (connList[s]) is generated (step S31).

If i≧s (step S32), the connection relationship array (connList []) is returned (step S38), and the process is completed.

If not i≧s (step S32), data of the ith connection relationship within the drawing (the start point part ID (the part ID of the part which becomes the start point of the connection), the start point-connection point name (the connection point name of the connection point which becomes the start point of the connection), the end point part ID (the part ID of the part which becomes the end point of the connection), the end point-connection point name (the connection point name of the connection point which becomes the end point of the connection) and the like) is obtained, and the obtained data is recorded in dsConn[i] (step S33). A connection relationship object (connRel) is generated (step S34). The start point part ID of dsConn[i], the start point-connection point name of dsConn[i], the end point part ID of dsConn[i] and the end point-connection point name of dsConn[i] are stored in the start point part ID (connRel.sPart), the start point-connection point name (connRel.sPoint), the end point part ID (connRel.dPart) and the end point-connection point name (connRel.dPoint) of the connection relationship object, respectively (step S35). The connection relationship object (connRel) is stored in connList[i] (step S36). 1 is added to i (step S37), and the process is returned to step S32.

Hereinafter, an example of the basic part list generating process performed by the basic part list generating unit 17 will be described using FIGS. 31 to 35.

Figure 31:
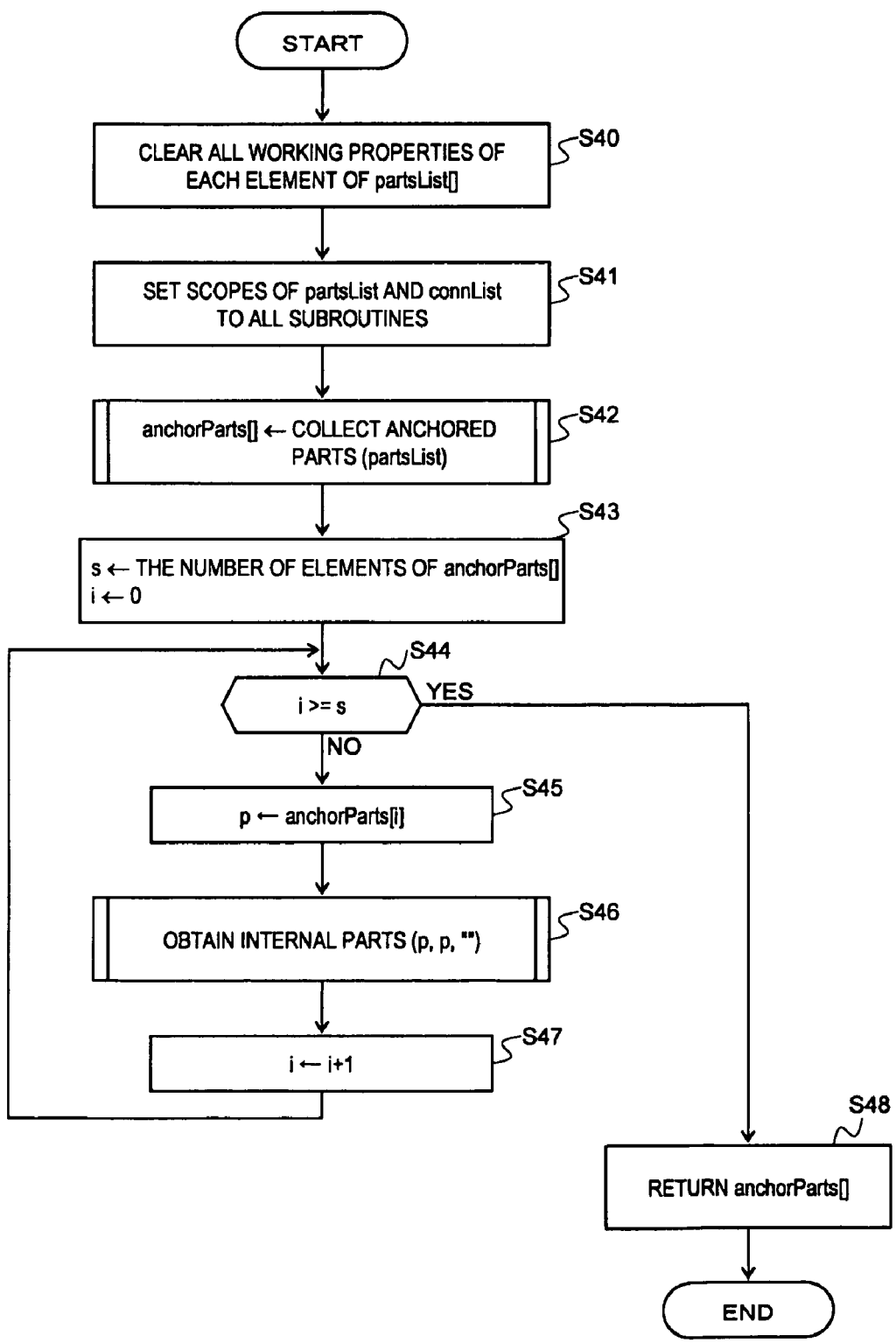
FIG. 31 is a flowchart of a basic part list generating process.

FIG. 31 illustrates a flowchart of the basic part list generating process. Here, it is assumed that the parts are spatially integrated. In the basic part list generating process of FIG. 31, the parts array (partsList) and the connection relationship array (connList) of the products or the design drawing are used as arguments.

The respective working properties (visited, connParts [] and connName []) of the parts array (partsList []) are all cleared (step S40). Scopes of the parts array (partsList) and the connection relationship array (connList) are set to all subroutines (step S41). With the parts array (partsList) as an argument, an anchored part collecting process (see FIG. 32) to be described below is performed, and a basic part list (anchorParts []) is obtained as a result (step S42). The number of elements of the basic part list (anchorParts []) is assigned to the variable s, and 0 is assigned to the variable i (step S43).

If i≧s (step S44), the basic part list (anchorParts []) is returned (step S48), and the process is completed.

If not i≧s (step S44), anchorparts[i] is stored in p (step S45). With a parent part (p), a child part (p) and a connection point name "i" as arguments, an internal part obtaining process (see FIG. 33) to be described below is performed (step S46). 1 is added to i (step S47), and the process is returned to step S44.

Figure 32:
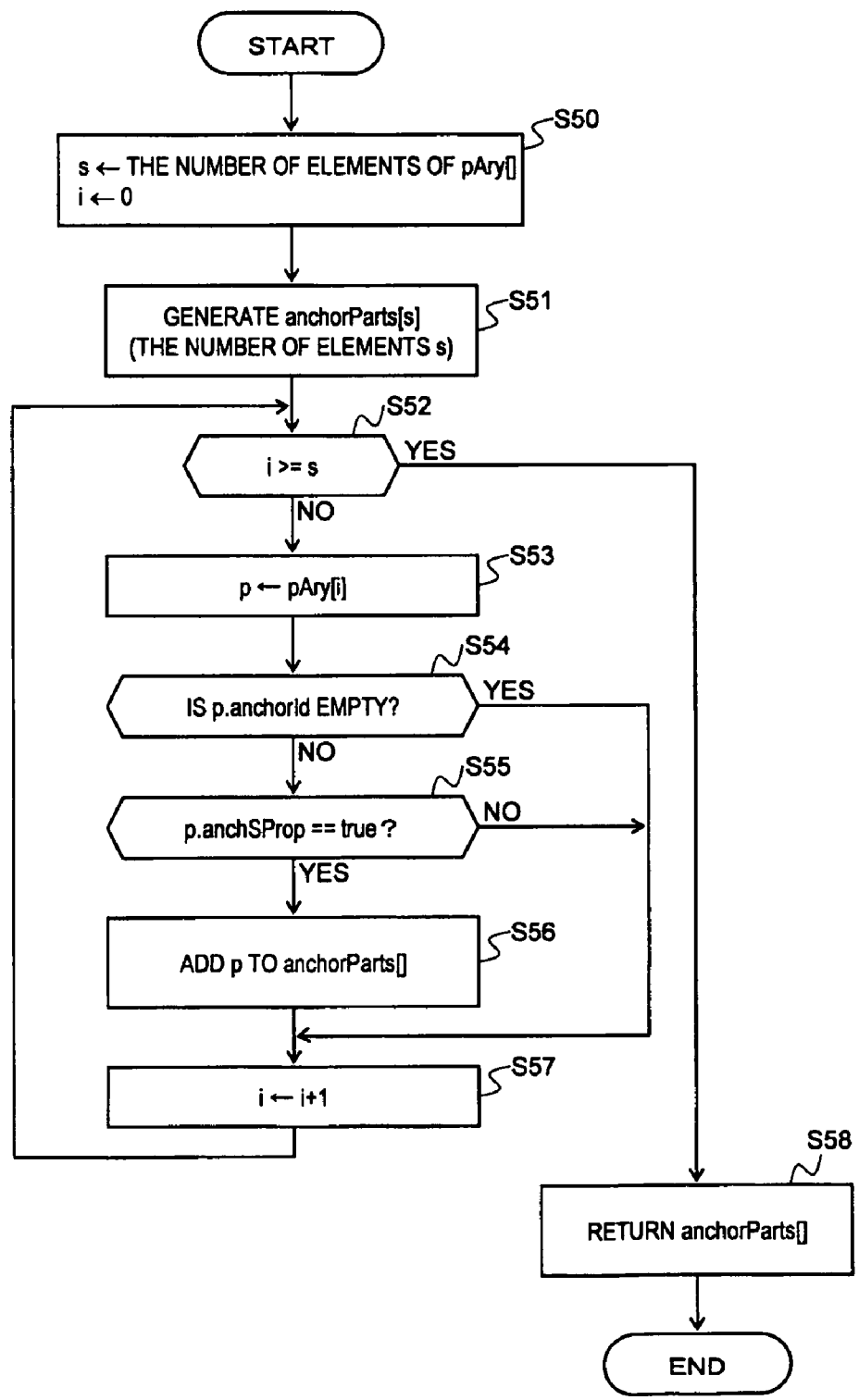
FIG. 32 is a flowchart of an anchored part collecting process.

FIG. 32 illustrates a flowchart of the anchored part collecting process. In the anchored part collecting process of FIG. 32, a parts array (pAry) is used as an argument.

The number of elements of the parts array (pAry []) is assigned to the variable s, and 0 is assigned to i (step S50). A basic part list with the number of elements of s (anchorParts[s]) is generated (step S51).

If i≧s (step S52), the basic part list (anchorParts []) is returned (step S58), and the process is completed.

If not i≧s (step S52), pAry[i] is stored in p (step S53). If the anchor ID of p (p.anchorId) is not empty (step S54) and the anchor spatial property (p.anchSProp) is "true" (step S55), p is added to the basic part list (anchorParts []) (step S56). 1 is added to i (step S57), and the process is returned to step S52.

Figure 33:
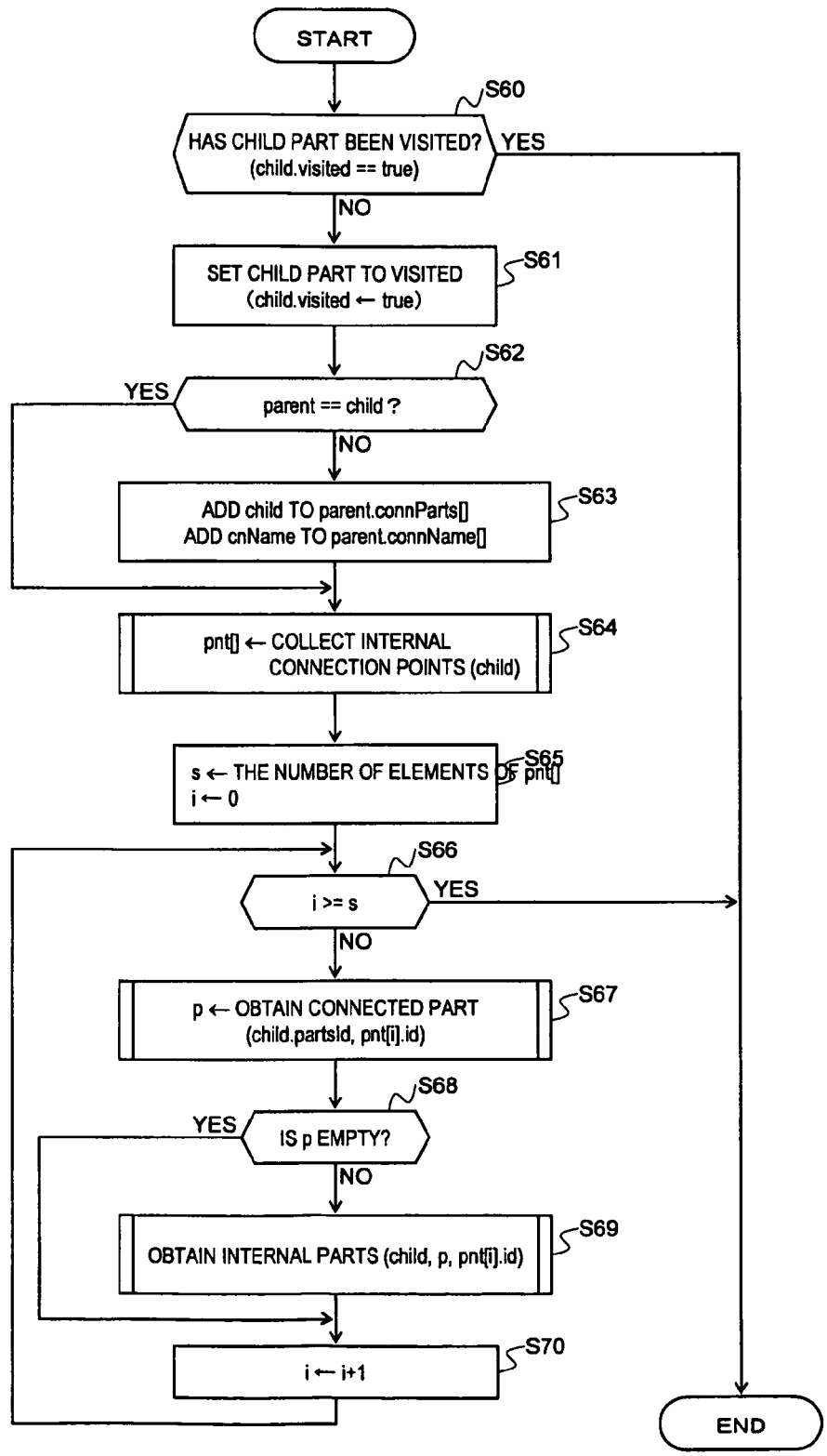
FIG. 33 is a flowchart of an internal part obtaining process.

FIG. 33 illustrates a flowchart of the internal part obtaining process. In the internal part obtaining process of FIG. 33, a parent part (parent), a child part (child) and a connection point name (cnName) are used as arguments.

If the child part (child) has been visited, that is, if the visited flag of the child part (child.visited) is "true" (step S60), the process is completed.

If the child part (child) has not been visited (step S60), the child part (child) is set to "visited", that is, the visited flag of the child part (child.visited) is set to "true" (step S61).

When the parent part (parent) and the child part (child) are not the same (step S62), the child part (child) is added to the array of the directly connected part objects of the parent part (parent.connParts []), and the connection point name (cnName) is added to the array of the direct connection point names of the parent part (parent.connName []) (step S63). With the part (child) as an argument, an internal connection point collecting process (see FIG. 34) to be described below is performed, and an internal connection point array (pnt []) is obtained as a result (step S64). The number of elements of the internal connection point array (pnt []) is assigned to the variable s, and 0 is assigned to i (step S65).

If i≧s (step S66), the process is completed.

If not i≧s (step S66), with the part ID (child.partsId) and a connection point name (pnt[i].id) as arguments, a connected part obtaining process (see FIG. 35) to be described below is performed, and a part (p) is obtained as a result (step S67). If the part (p) is not empty (step S68), with a parent part (child), the child part (p) and the connection point name (pnt[i].id) as arguments, the internal part obtaining process is recursively performed (step S69). 1 is added to i (step S70), and the process is returned to step S66.

Figure 34:
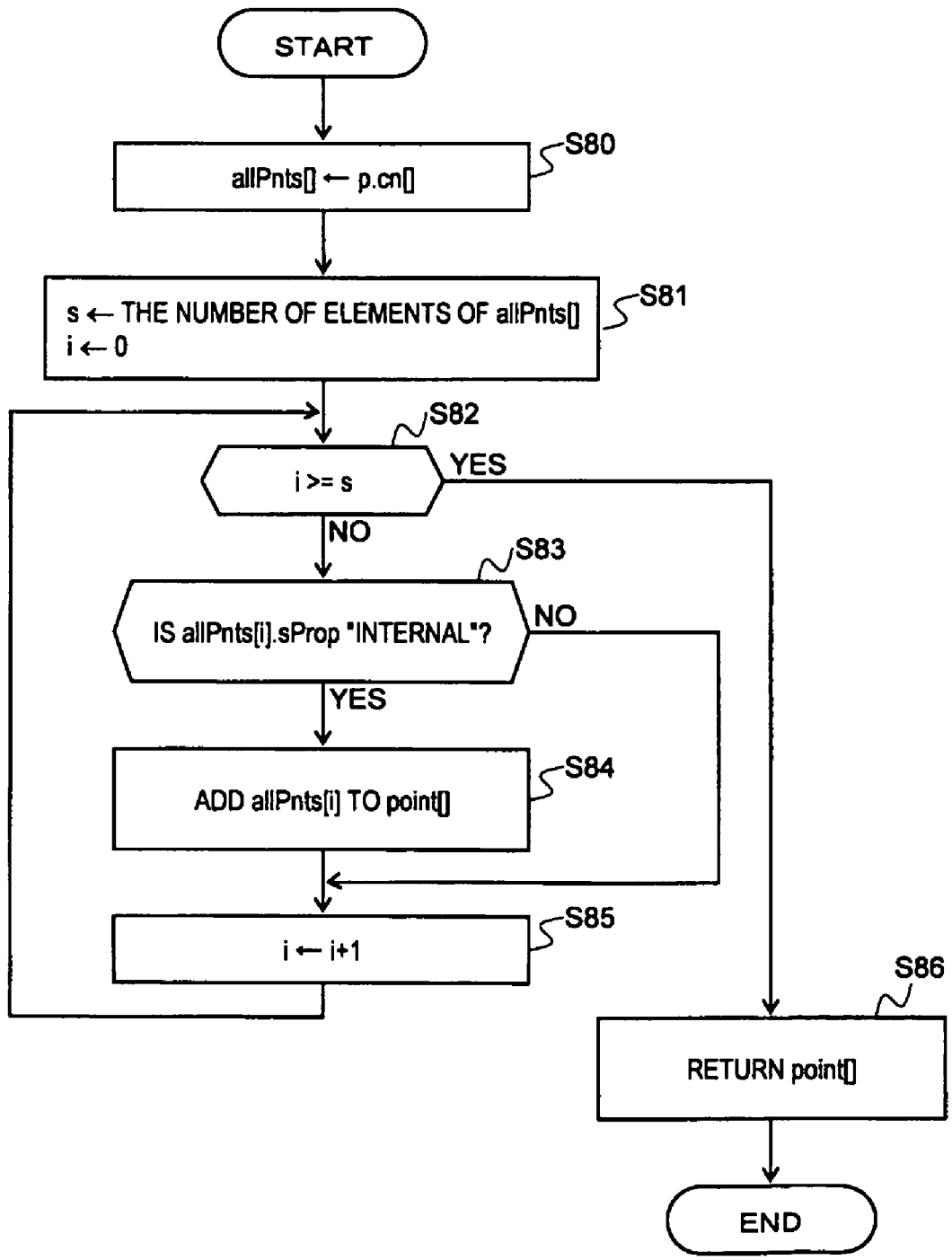
FIG. 34 is a flowchart of an internal connection point collecting process.

FIG. 34 illustrates a flowchart of the internal connection point collecting process. In the internal connection point collecting process of FIG. 34, the part (p) is used as an argument.

An array of the connection point objects of the part (p.cn []) is stored in allPnts [] (step S80). The number of elements of allPnts [] is stored in the variable s, and 0 is assigned to i (step S81).

If i≧s (step S82), an internal connection point array (point []) is returned (step S86), and the process is completed.

If not i≧s (step S82), and if the spatial connection property of allPnts[i] (allPnts[i].sProp) is "internal" (step S83), allPnts [i] is added to the internal connection point array (point []) (step S84). 1 is added to i (step S85), and the process is returned to step S82.

Figure 35:
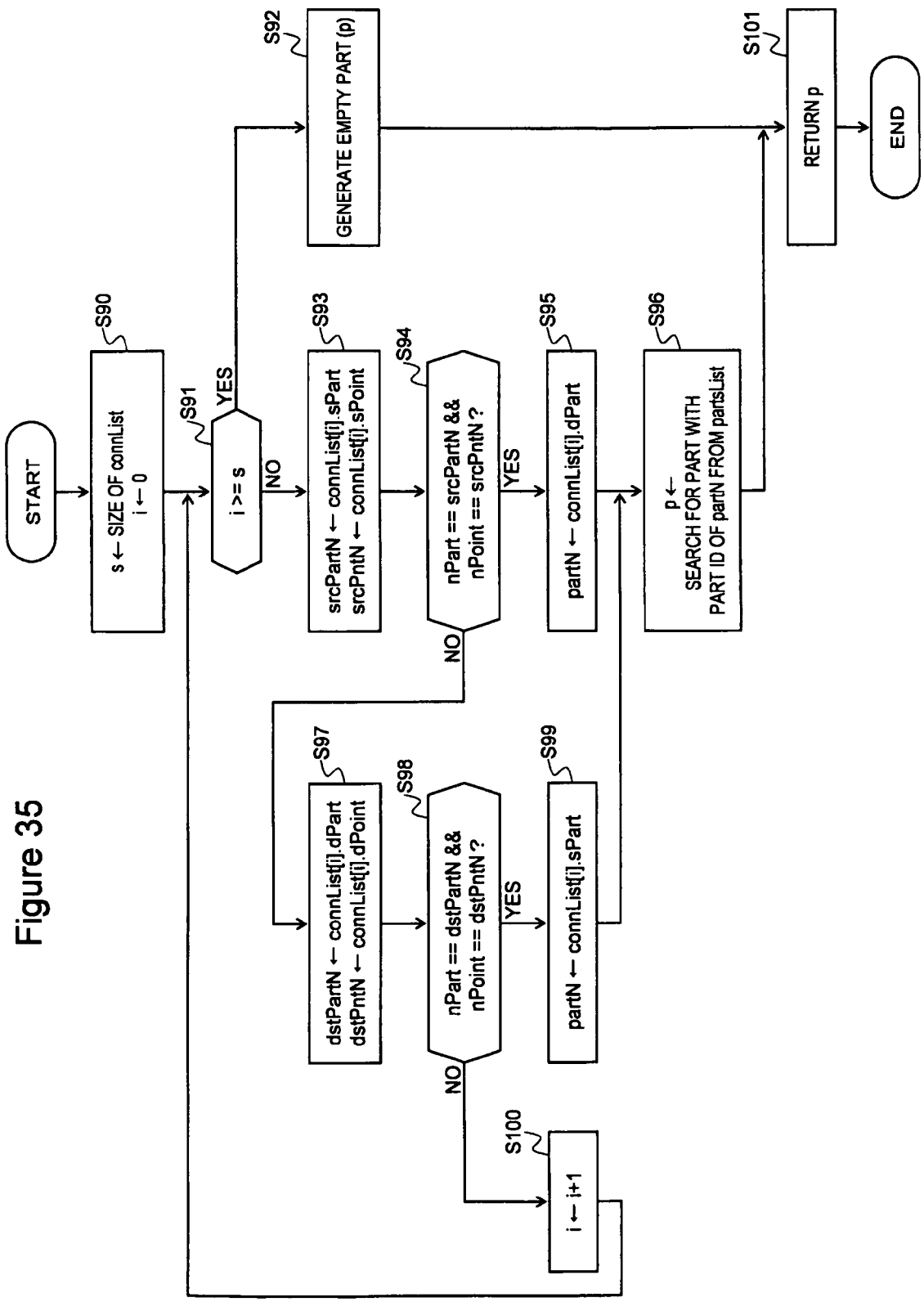
FIG. 35 is a flowchart of a connected part obtaining process.

FIG. 35 illustrates a flowchart of the connected part obtaining process. In the connected part obtaining process of FIG. 35, a part ID (nPart) and a connection point name (nPoint) are used as arguments.

A size of the connection relationship array (connList) is assigned to the variable s, and 0 is assigned to i (step S90).

If i≧s (step S91), an empty part (p) is generated (step S92), the part (p) is returned (step S101), and the process is completed.

If not i≧s (step S91), the start point part ID of connList[i] (connList[i].sPart) is recorded in srcPartN, and the start point-connection point name of connList[i] (connList[i].sPoint) is recorded in srcPntN (step S93).

If the part ID (npart) is srcPartN and the connection point name (nPoint) is srcPntN (step S94), the end point part ID of connList[i] (connList[i].dPart) is set to part N (step S95). The part obtained by searching for the part with the part ID of part N from the parts array (partsList) is set to the part (p) (step S96), the part (p) is returned (step S101), and the process is completed.

If the part ID (nPart) is not srcPartN or the connection point name (nPoint) is not srcPntN (step S94), the end point part ID of connList[i] (connList[i].dPart) is recorded in dstPartN, and the end point-connection point name of connList[i] (connList [i].dPoint) is recorded in dstPntN (step S97).

If the part ID (nPart) is dstPartN and the connection point name (nPoint) is dstPntN (step S98), the start point part ID of connList[i] (connList[i].sPart) is set to part N (step S99). The part obtained by searching for the part with the part ID of part N from the parts array (partsList) is set to the part (p) (step S96), the part (p) is returned (step S101), and the process is completed.

If the part ID (nPart) is not dstPartN or the connection point name (nPoint) is not dstPntN (step S98), 1 is added to i (step S100), and the process is returned to step S91.

Hereinabove, in the flowcharts of FIGS. 31 to 35, the parts are spatially integrated. However, the parts can also be electrically integrated. If the parts are electrically integrated, in the flowcharts of FIGS. 31 to 35, the spatial connection property (sProp) may be replaced with the electrical connection property (eProp), and the anchor spatial property (anchSProp) may be replaced with the anchor electrical property (anchEProp).

Each element of the basic part list (anchorParts []) returned by the basic part list generating process is the basic part with the anchor ID, and each element becomes the information device (the server, a router or the like) constituting the computer system. A part which is directly connected to each element of the basic part list (anchorParts []) is obtained as anchorParts[i].connParts [], and a part which is further directly connected to that part is obtained as connParts [] of anchorParts[i].connParts []. The same applies to parts which are subsequently connected.

Hereinafter, an example of the general work instruction document generating process performed by the work instruction document generating unit 18 will be described using FIGS. 36 to 43.

It should be noted that it is assumed that an instruction document object onedoc has a configuration, for example, as follows.

```
onedoc {
    title:    the anchor ID excluding "A_" (that is, the product
type name)
    lines[ ]:  an array of single line objects
}
```

Moreover, it is assumed that a single line object line has a configuration, for example, as follows.

```
line {
    title:    the connection point name
    pName: the part name of the product connected to an appropriate
connection point
    pProdId:        the part type name of the product connected
to the appropriate connection point
    dName: the part name of the design drawing (actual
configuration) connected to the appropriate connection point
    dProdId:        the part type name of the design drawing
(actual configuration) connected to the appropriate connection point
    order:   the work instruction
    bto:     the BTO flag
            (work (used for outputting a grandchild connection))
    pParts: the part object of the product used for the above
described data generation
    dparts: the part object of the design drawing used for the above
described data generation
}
```

Figure 36:
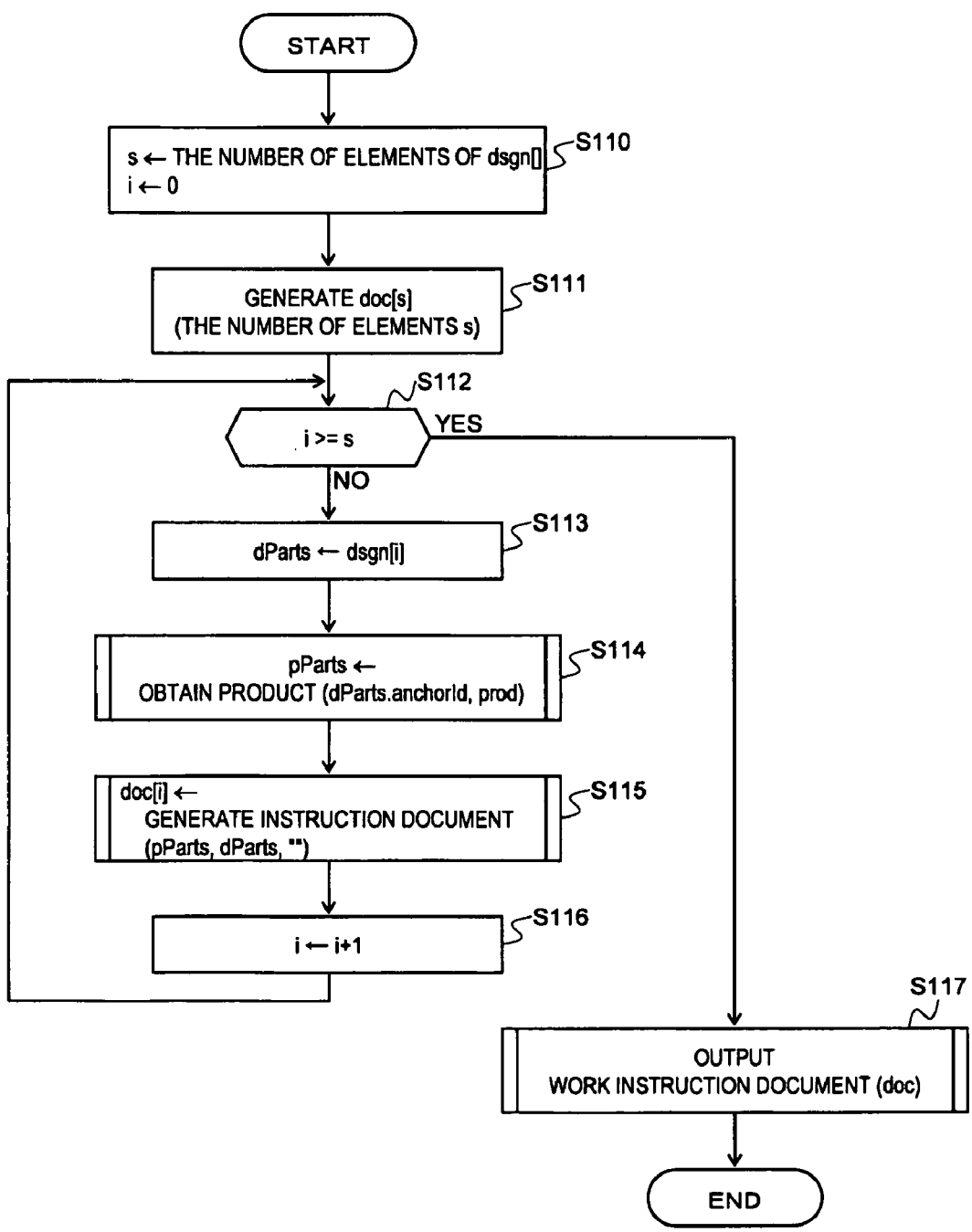
FIG. 36 is a flowchart of a general work instruction document generating process.

FIG. 36 illustrates a flowchart of the general work instruction document generating process. In the general work instruction document generating process of FIG. 36, a basic part list of the products (prod) and a basic part list of the design drawing (dsgn) are used as arguments.

The number of elements of the basic part list of the design drawing (dsgn []) is assigned to the variable s, and 0 is assigned to i (step S110). An instruction document array with the number of elements of s (doc[s]) is generated (step S111).

If i≧s (step S112), with the instruction document array (doc) as an argument, a work instruction document outputting process (see FIG. 42) to be described below is performed (step S117), and the process is completed.

If not i≧s (step S112), dsgn[i] is stored in dParts (step S113). With the anchor ID of dParts (dParts.anchorId) and the basic part list of the products (prod) as arguments, a product obtaining process (see FIG. 37) to be described below is performed (step S114). With the product part object (pParts), the design drawing part object (dParts) and an ancestral connection point name " " as arguments, an instruction document generating process (see FIGS. 38 and 39) to be described below is performed (step S115). 1 is added to i (step S116), and the process is returned to step S112.

Figure 37:
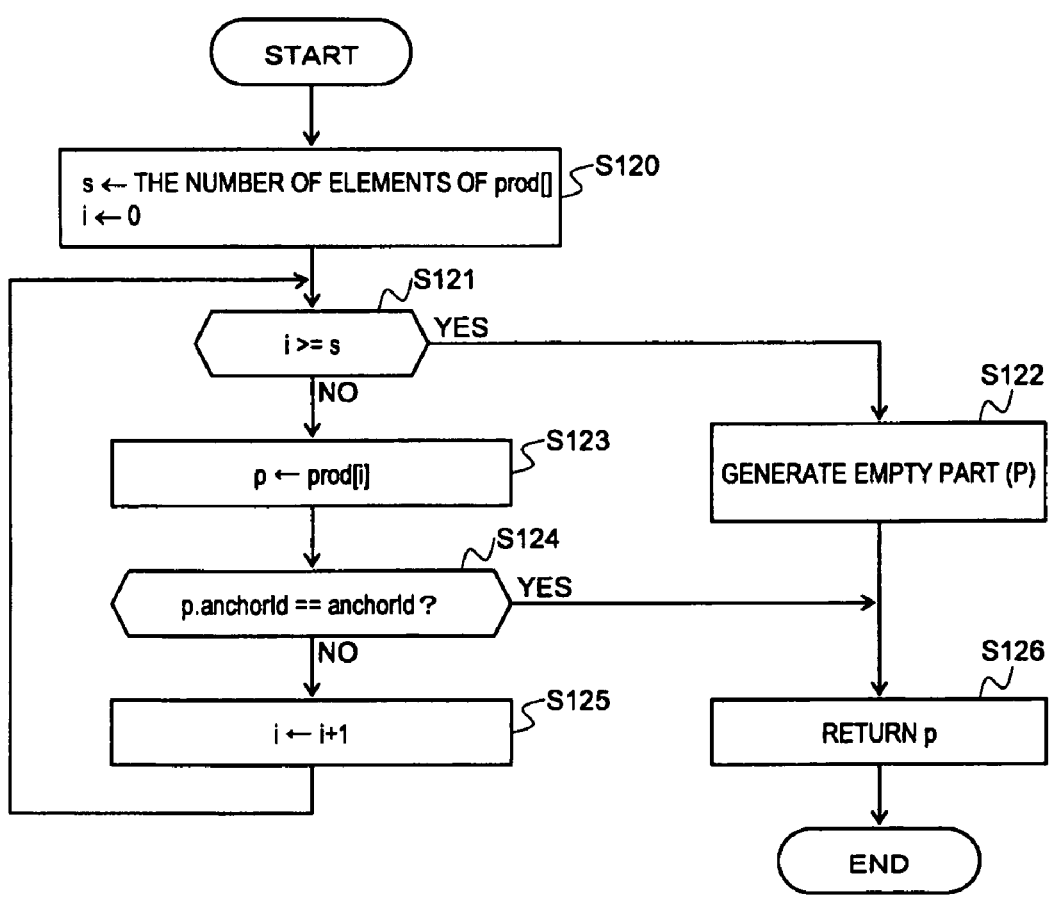
FIG. 37 is a flowchart of a product obtaining process.

FIG. 37 illustrates a flowchart of the product obtaining process. In the product obtaining process of FIG. 37, the anchor ID (anchorId) and the basic part list of the products (prod) are used as arguments.

The number of elements of the basic part list of the products (prod []) is stored in the variable s, and 0 is assigned to the variable i (step S120).

If i≧s (step S121), an empty part (p) is generated (step S122), the part (p) is returned (step S126), and the process is completed.

If not i≧s (step S121), prod[i] is set to the part (p) (step S123). If the anchor ID of the part (p) (p.anchorId) is the same as the anchor ID of the argument (anchorId) (step S124), the part (p) is returned (step S126), and the process is completed.

If the anchor ID of the part (p) (p.anchorId) is not the same as the anchor ID of the argument (anchorId) (step S124), 1 is added to i (step S125), and the process is returned to step S121.

Figure 38:
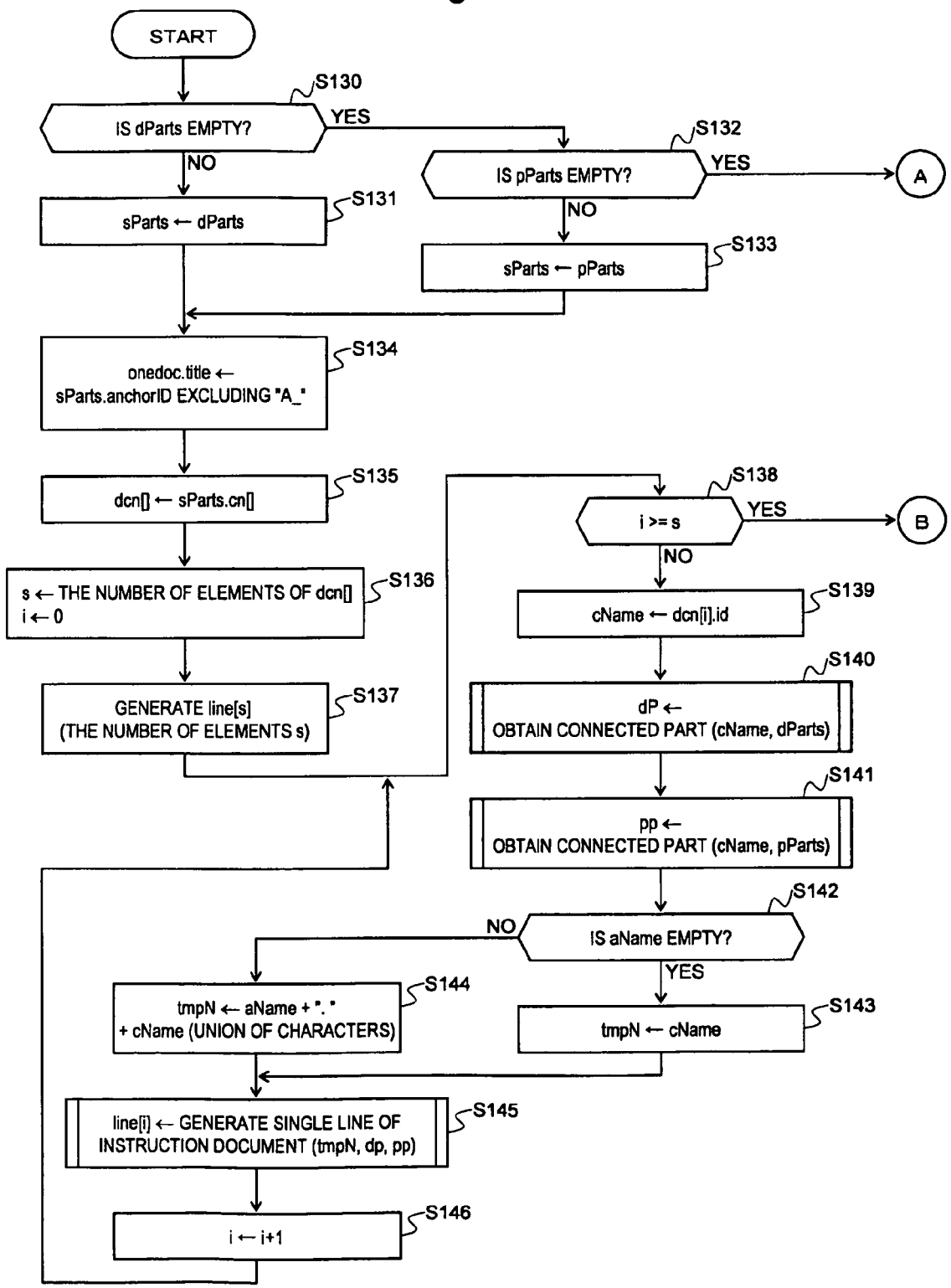
FIG. 38 is a flowchart of an instruction document generating process.
Figure 39:
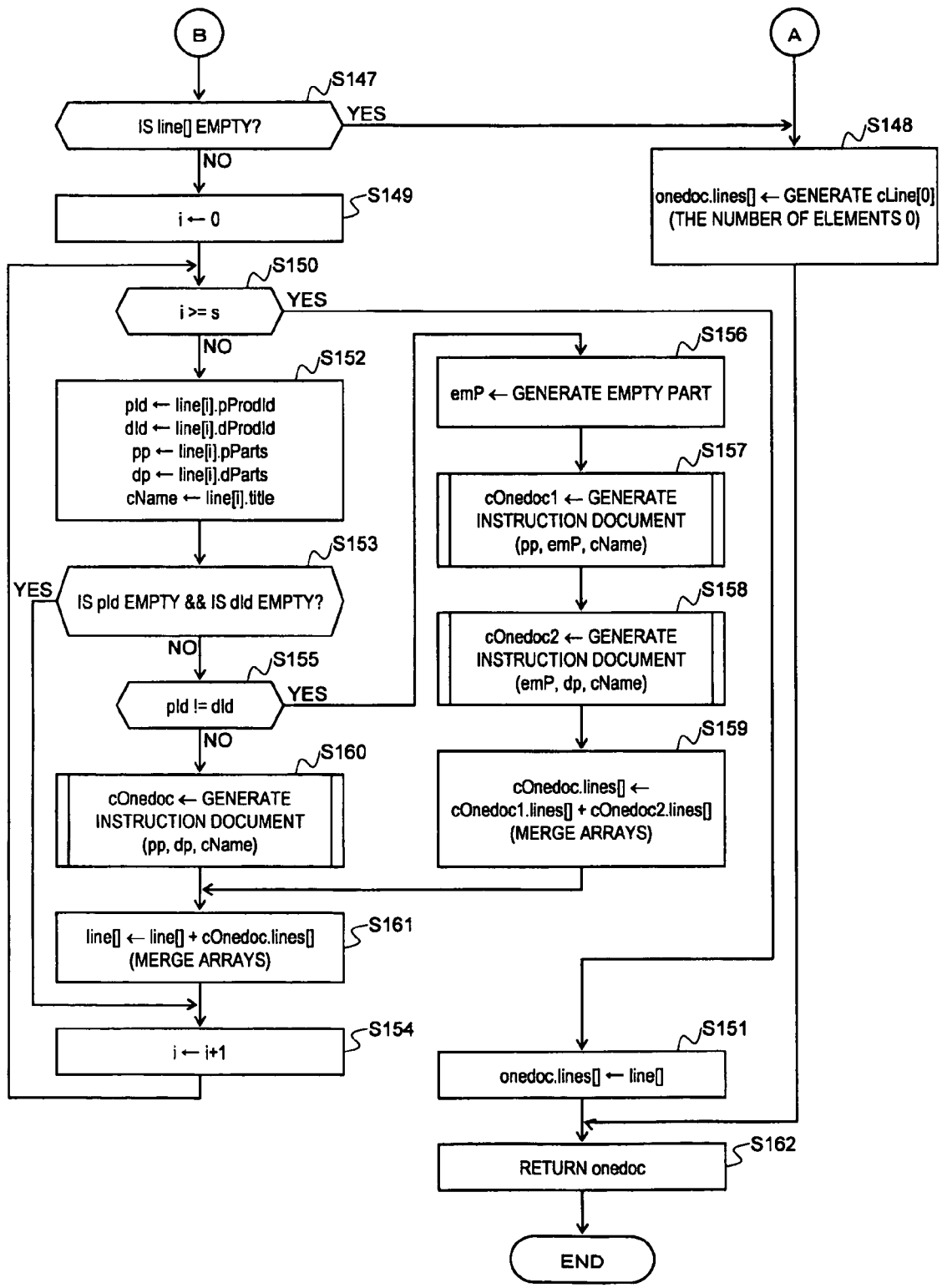
FIG. 39 is a flowchart of the instruction document generating process.

FIGS. 38 and 39 illustrate flowcharts of the instruction document generating process. In the instruction document generating process of FIGS. 38 and 39, the product part object (pParts), the design drawing part object (dParts) and an ancestral connection point name (aName) are used as arguments.

If the design drawing part object (dParts) is not empty (step S130), the design drawing part object (dParts) is stored in sParts (step S131).

If the design drawing part object (dParts) is empty (step S130) and the product part object (pParts) is not empty (step S132), the product part object (pParts) is stored in sParts (step S133).

If the design drawing part object (dParts) is empty (step S130) and the product part object (pParts) is empty (step S132), a single line object array with the number of elements of 0 (cLine[0]) is generated, and recorded in the array of the single line objects of the instruction document object (onedoc.lines []) (step S148), and the instruction document object (onedoc) is returned (step S162), and the process is completed.

The anchor ID of sParts (sParts.anchorId) excluding "A_" is stored in onedoc.title of the instruction document object (step S134). The array of the connection point objects of sParts (sParts.cn []) is stored in dcn [] (step S135). The number of elements of dcn [] is assigned to the variable s, and 0 is assigned to i (step S136). An array of the single line objects with the number of elements of s (line[s]) is generated (step S137).

If not i≧s (step S138), the connection point name of dcn[i] (dcn[i].id) is recorded in cName (step S139). With the connection point name (cName) and the part object (dParts) as arguments, a connected part obtaining process (see FIG. 40) to be described below is performed, and a part (dp) is obtained as a result (step S140). With the connection point name (cName) and the part object (pParts) as arguments, the connected part obtaining process (see FIG. 40) to be described below is performed, and a part (pp) is obtained as a result (step S141).

If the ancestral connection point name (aName) is empty (step S142), cName is recorded in tmpN (step S143).

If the ancestral connection point name (aName) is not empty (step S142), the ancestral connection point name (aName)+"."+cName (a union of characters) is stored in tmpN (step S144).

With the connection point name (tmpN), the design drawing part object (dp) and the product part object (pp) as arguments, an instruction document line generating process (see FIG. 41) to be described below is performed, and a single line object (line[i]) is obtained as a result (step S145). 1 is added to i (step S146), and the process is returned to step S138.

If i≧s (step S138), and if the array of the single line objects (line []) is empty (step S147), the array of the single line objects with the number of elements of 0 (cLine[0]) is generated, and recorded in the array of the single line objects of the instruction document object (onedoc.lines []) (step S148), and the instruction document object (onedoc) is returned (step S162), and the process is completed.

If the array of the single line objects (line []) is not empty (step S147), 0 is assigned to i (step S149).

If i≧s (step S150), the array of the single line objects (line []) is stored in the array of the single line objects of the instruction document object (onedoc.lines []) (step S151), the instruction document object (onedoc) is returned (step S162), and the process is completed.

If not i≧s (step S150), the part type name of the product (line[i].pProdId), the part type name of the design drawing (line[i].dProdId), the product part object (line[i].pParts), the design drawing part object (line[i].dParts) and the connection point name (line[i].title) of the single line object are stored in pId, dId, the part (pp), the part (dp) and cName, respectively (step S152).

If pId is empty and dId is empty (step S153), 1 is added to i (step S154), and the process is returned to step S150.

If pId is not empty or dId is not empty (step S153), and if pId is different from dId (step S155), an empty part (emP) is generated (step S156). With the product part object (pp), a design drawing part object (emP) and an ancestral connection point name (cName) as arguments, the instruction document generating process is recursively performed, and an instruction document object (cOnedoc1) is obtained as a result (step S157). With a product part object (emP), the design drawing part object (dp) and the ancestral connection point name (cName) as arguments, the instruction document generating process is recursively performed, and an instruction document object (cOnedoc2) is obtained as a result (step S158). The array of the single line objects of the instruction document object (cOnedoc1) (cOnedoc1.lines []) and the array of the single line objects of the instruction document object (cOnedoc2) (cOnedoc2.lines []) are merged, and a result thereof is set to an array of the single line objects of an instruction document object (cOnedoc) (cOnedoc.lines []) (step S159).

If pId is not different from dId (step S155), with the product part object (pp), the design drawing part object (dp) and the ancestral connection point name (cName) as arguments, the instruction document generating process is recursively performed, and the instruction document object (cOnedoc) is obtained as a result (step S160).

The array of the single line objects (line []) and the array of the single line objects of the instruction document object (cOnedoc) (cOnedoc.lines []) are merged, and a result thereof is set to the array of the single line objects (line []) (step S161), 1 is added to i (step S154), and the process is returned to step S150.

Figure 40:
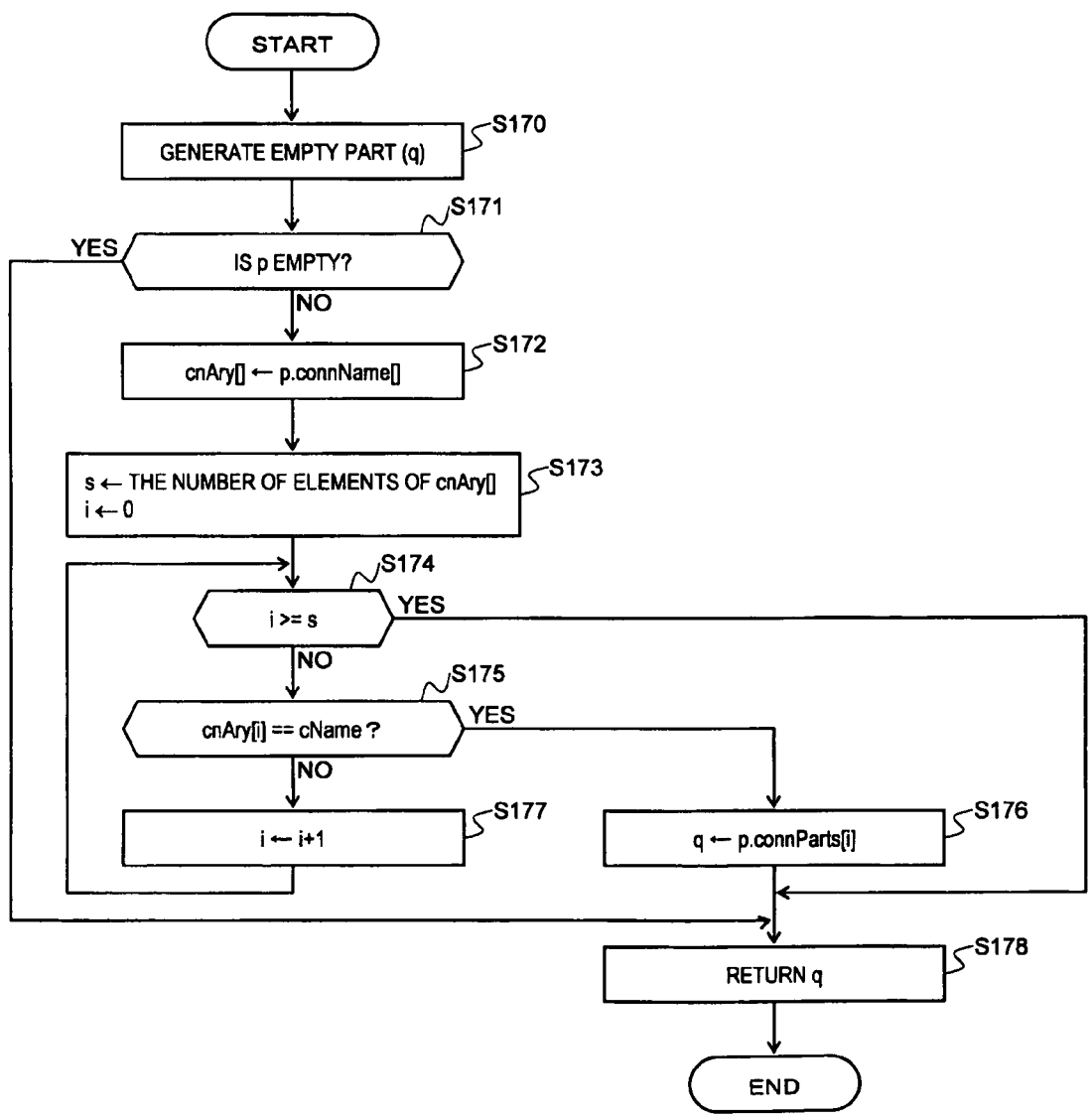
FIG. 40 is a flowchart of the connected part obtaining process.

FIG. 40 illustrates a flowchart of the connected part obtaining process. In the connected part obtaining process of FIG. 40, the connection point name (cName) and the part object (p) are used as arguments.

An empty part (q) is generated (step S170).

If the part object (p) is empty (step S171), the part (q) is returned (step S178), and the process is completed.

If the part object (p) is not empty (step S171), the array of the direct connection point names of the part object (p) (p.connName []) is stored in cnAry [] (step S172). The number of elements of cnAry [] is assigned to the variable s, and 0 is assigned to i (step S173).

If i≧s (step S174), the part (q) is returned (step S178), and the process is completed.

If not i≧s (step S174), and if cnAry[i] is the connection point name (cName) (step S175), the directly connected part object of the part object (p) (p.connParts[i]) is set to the part (q) (step S176), the part (q) is returned (step S178), and the process is completed.

If cnAry[i] is not the connection point name (cName) (step S175), 1 is added to i (step S177), and the process is returned to step S174.

Figure 41:
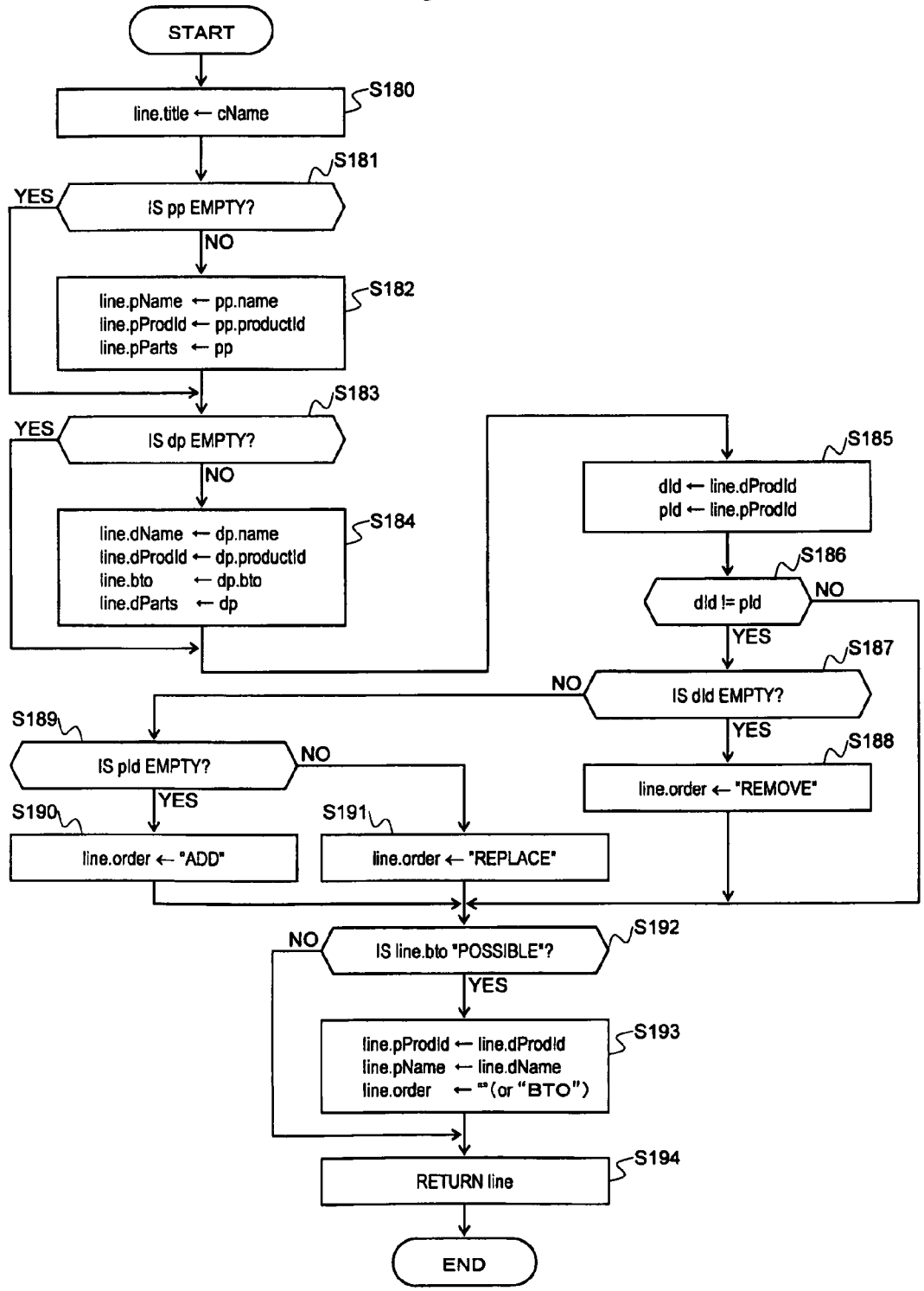
FIG. 41 is a flowchart of an instruction document line generating process.

FIG. 41 illustrates a flowchart of the instruction document line generating process. In the instruction document line generating process of FIG. 41, the connection point name (cName), the design drawing part object (dp) and the product part object (pp) are used as arguments.

The connection point name (cName) is stored in the connection point name of the single line object (line.title) (step S180).

If the product part object (pp) is not empty (step S181), the part name of the product part object (pp.name) is recorded in the part name of the product of the single line object (line.pName), the part type name of the product part object (pp.productId) is recorded in the part type name of the product of the single line object (line.pProdId), and the product part object (pp) is stored in the product part object of the single line object (line.pParts) (step S182).

If the design drawing part object (dp) is not empty (step S183), the part name of the design drawing part object (dp.name) is recorded in the part name of the design drawing of the single line object (line.dName), the part type name of the design part object (dp.productId) is recorded in the part type name of the design drawing of the single line object (line.dProdId), the BTO flag of the design drawing part object (dp.bto) is recorded in the BTO flag of the single line object (line.bto), and the design drawing part object (dp) is stored in the design drawing part object of the single line object (line.dParts) (step S184).

The part type name of the design drawing of the single line object (line.dProdId) is recorded in dId, and the part type name of the product of the single line object (line.pProdId) is stored in pId (step S185).

If dId is different from pId (step S186), and if dId is empty (step S187), "remove" is recorded in the work instruction of the single line object (line.order) (step S188). If dId is different from pId (step S186), and if pId is empty (step S189), "add" is recorded in the work instruction of the single line object (line.order) (step S190). If dId is different from pId (step S186), and if neither dId nor pId is empty (steps S187 and S189), "replace" is recorded in the work instruction of the single line object (line.order) (step S191).

If the BTO flag of the single line object (line.bto) is "possible" (step S192), the part type name of the design drawing of the single line object (line.dProdId) is copied to the part type name of the product of the single line object (line.pProdId), the part name of the design drawing of the single line object (line.dName) is copied to the part name of the product of the single line object (line.pName), and " " or "BTO" is recorded in the work instruction of the single line object (line.order) (step S193). The single line object (line) is returned (step S194), and the process is completed.

Figure 42:
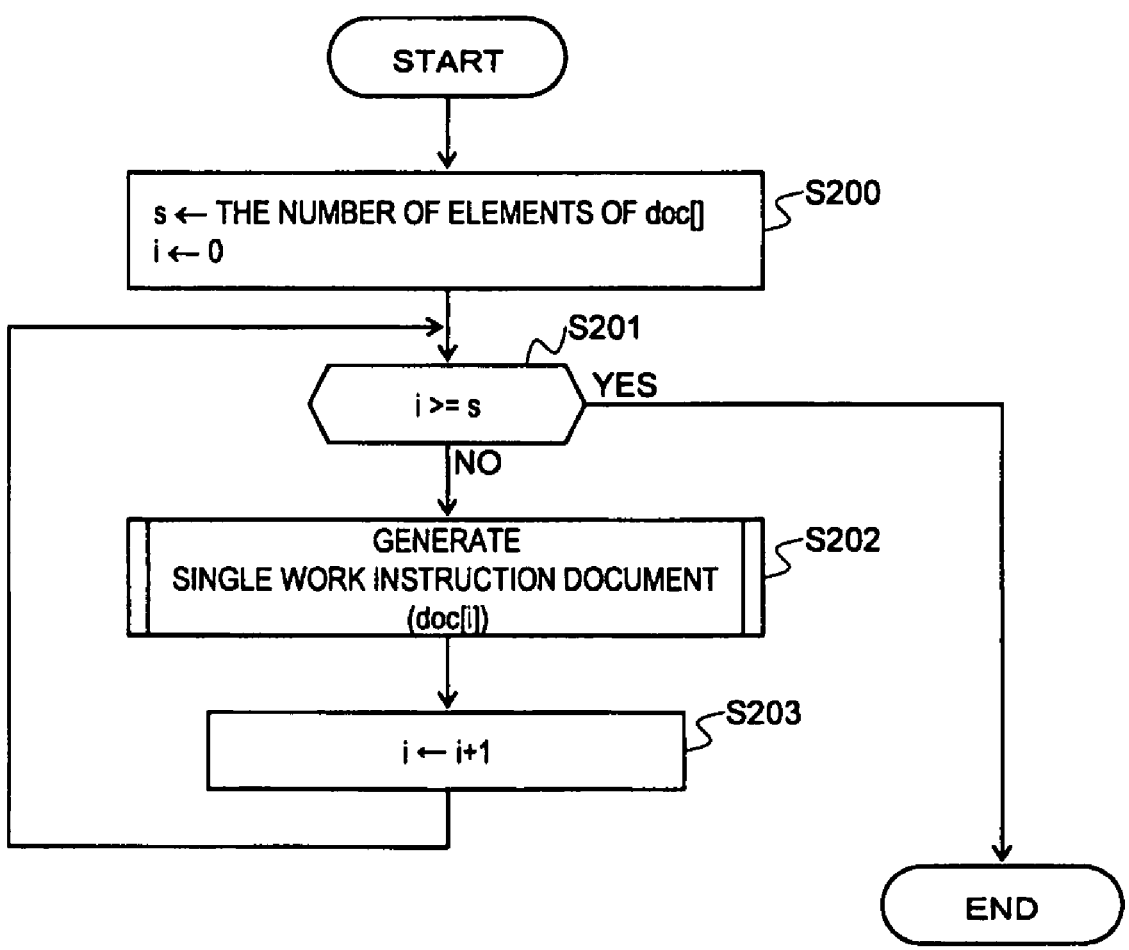
FIG. 42 is a flowchart of a work instruction document outputting process.

FIG. 42 illustrates a flowchart of the work instruction document outputting process. In the work instruction document outputting process of FIG. 42, the instruction document array (doc []) is used as an argument.

The number of elements of the instruction document array (doc []) is assigned to the variable s, and 0 is assigned to i (step S200).

If i≧s (step S201), the process is completed.

If not i≧s (step S201), with a single work instruction document (doc[i]) as an argument, a single work instruction document generating process (see FIG. 43) to be described below is performed (step S202). 1 is added to i (step S203), and the process is returned to step S201.

Figure 43:
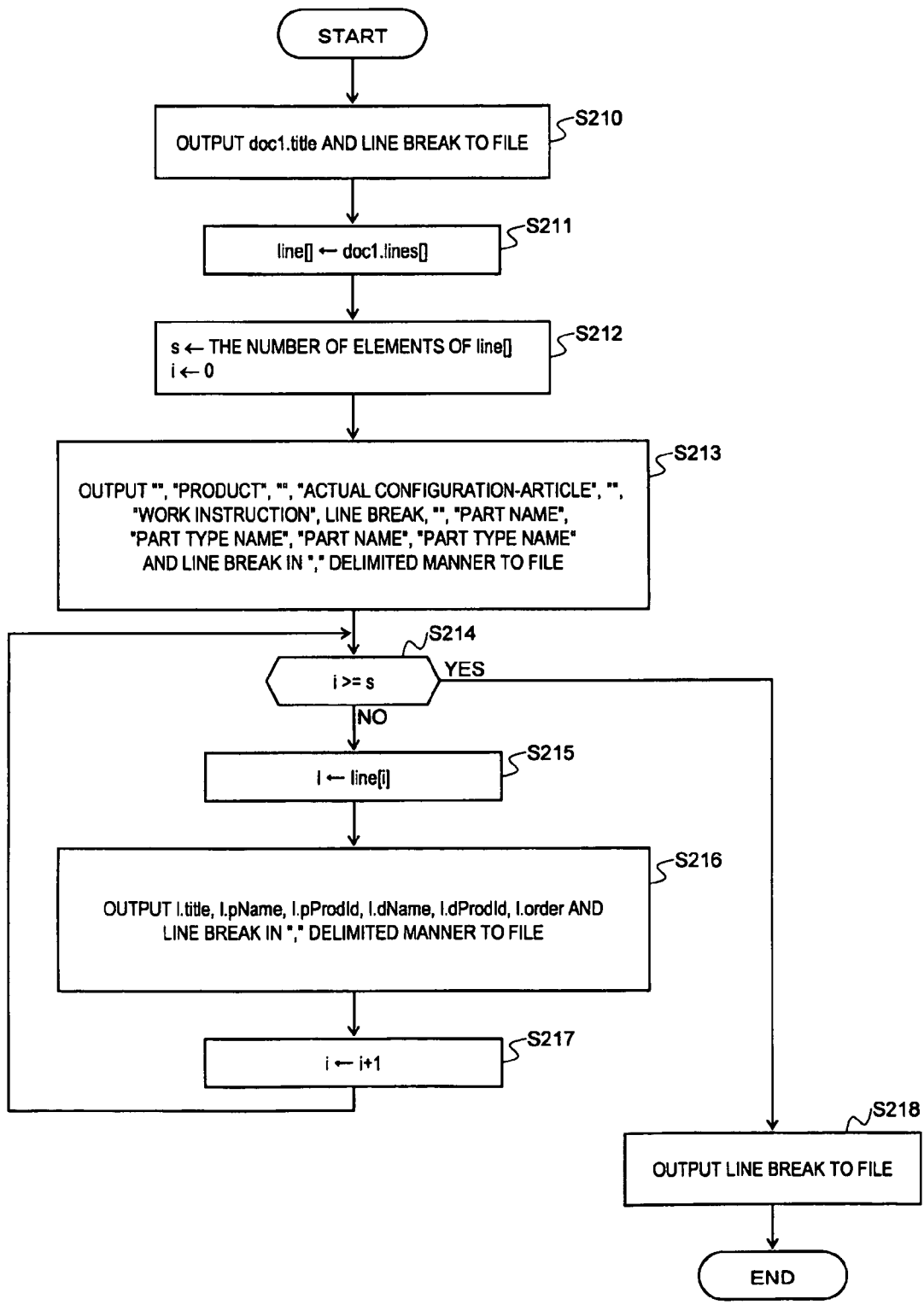
FIG. 43 is a flowchart of a single work instruction document generating process.

FIG. 43 illustrates a flowchart of the single work instruction document generating process. In the single work instruction document generating process of FIG. 43, a single work instruction document (doc[i]) is used as an argument.

The product type name of the single work instruction document (doc1.title) and a line break are outputted to a file (step S210). The array of the single line objects of the single work instruction document (doc1.lines []) is stored in line [] (step S211). The number of elements of line [] is assigned to the variable s, and 0 is assigned to i (step S212). " ", "product", " ", "actual configuration article", " ", "work instruction", the line break, " ", "part name", "part type name", "part name", "part type name" and the line break are outputted in this order, in a "," delimited manner, to the file (step S213).

If i≧s (step S214), the line break is outputted to the file (step S218), and the process is completed.

If not i≧s (step S214), line[i] is stored in l (step S215). The connection point name (l.title), the part name of the product (l.pName), the part type name of the product (l.pProdId), the part name of the design drawing (l.dName), the part type name of the design drawing (l.dProdId) and the work instruction (l.order) of l are outputted in a "," delimited manner to the file, and subsequently, the line break is outputted to the file (step S216). 1 is added to i (step S217), and the process is returned to step S214.

Embodiment 4

In the work instruction document outputted in the above described Embodiment 1, in the case of the part other than the basic part, "empty" (a state where the part such as the card is not mounted) is always outputted for the connection point on the basic part side. In order to prevent this, the connection property (the spatial connection property/electrical connection property) is extended in this Embodiment 4.

In this Embodiment 4, "internal" of the connection property is further divided into "internal/parent" and "internal/child", which are used separately. "Internal/parent" is the internal connection, and indicates that a part with the connection point is nearer to the basic part than a part of a connection destination. "Internal/child" is the internal connection, and indicates that the part with the connection point is farther from the basic part than the part of the connection destination.

FIG. 44 illustrates a diagram showing an example of the part data in the part DB. In part data 79 of FIG. 44, "internal" of the connection property of the part data 60 of FIG. 5 is further divided into "internal/parent" and "internal/child".

For example, a 10/100 LAN card with the part type name of "PL-22345" has the connection points "P" and "L", and the respective spatial connection properties thereof have been "P: internal" and "L: external" in the part data 60 of FIG. 5. In this Embodiment 4, according to the extension of the connection property, as shown in the part data 79 of FIG. 44, the spatial connection properties become "P: internal/child" and "L: external". Since the LAN card with the part type name of "PL-22345" is connected to the basic part through the connection point "P", the LAN card with the part type name of "PL-22345" becomes farther than the basic part. Moreover, a SCSI controller with the part type name of "SC-6654" has the electrical connection properties of "P: internal" and "S: internal" in the part data 60 of FIG. 5. In this Embodiment 4, as shown in the part data 79 of FIG. 44, the electrical connection properties become "P: internal/child" and "S: internal/parent". Moreover, in the case of a part which has one terminal and is not the basic part, such as the CPU, if the connection property is "internal" in the part data 60 of FIG. 5, all connection properties become "internal/child" in this Embodiment 4, as shown in the part data 79 of FIG. 44. Moreover, all of the connection properties of "internal" of the basic part become "internal/parent".

It should be noted that, when one part group is clipped from the drawing, whether the internal connection is "parent" or "child" may be ignored, and as shown in the above described Embodiment 1, it is only necessary to consider whether the connection property is "internal" or "external".

FIG. 45 illustrates a diagram showing an example of tree representation of part connections. The tree representation of the part connections as shown at the upper side of FIG. 45 becomes a tree as shown at the lower side of FIG. 45. As shown in this figure, the internal connection "parent" or "child" indicates where each part node is positioned in the tree, with respect to a tree-shaped structure with the basic part as a vertex node.

When a document of the work instruction document is generated, the basic part which is the vertex node has been represented as the frame, and the connection point and a card of the connection destination have been displayed within the frame. Such display has been inevitable because there has been no distinction regarding a connection point from a child node to a parent node, with only classifications of "internal" and "external". However, although the connection point is displayed, a corresponding part of the connection destination has not been able to be recognized, due to a function of the visited flag used as the working property in the clipping of the part group within the drawing, and therefore, other items have been displayed in a state of empty (no connection card).

According to the extension in this Embodiment 4, inconvenience as above is eliminated by ignoring the parent side and processing only the child side at the time of the generation of the basic part list. It should be noted that the visited flag is required in order not to be caught in a loop in such a connection of "internal/parent"-"internal/parent".

This Embodiment 4 can be easily practiced by changing step S83 of the flowchart of the internal connection point collecting process of FIG. 34 from "IS allPnts[i].sProp "INTERNAL"?" to "IS allPnts[i].sProp "INTERNAL/PARENT"?".

Embodiment 5

According to the above described Embodiment 4, it has become possible to output a non-wasteful and clean work instruction document. However, all outputted work instruction documents are distinguished by the product type name, that is, the anchor ID excluding "A_". Thus, if multiple work instruction documents for the same product type name are generated, these cannot be distinguished. In actual system construction, a model with the same product type name may be used in multiple different configurations, for example, with the different numbers of HDDs or the like. At this time, it is necessary to distinguish among the work instruction documents of the same model. For that purpose, the above described embodiment is changed as shown in the following a) and b). Thereby, it becomes possible to easily distinguish among the multiple work instruction documents of the same model and perform the construction.

a) When the computer system design drawing is generated, the part ID of the basic part is changed into a name corresponding to a host name. In other words, in the above described Embodiment 1 and the like, the part ID of the motherboard which is the basic part has been represented as "QMTn" (n is a number). However, in this Embodiment 5, the part ID is changed into a host name which is actually used or a name close to it, for example, such as "WWWn" or "DBn".

Since the part ID specified in the CAD works as an ID only for ensuring the uniqueness of each part within the drawing, there is no problem at all even when "MTn" is changed like "WWWn", only if the uniqueness is maintained. Since "n" is a number, the uniqueness is maintained like "WWW1" or "WWW2", even if the same name is given.

b) Step S134 of the flowchart of the work instruction document generating process of FIGS. 38 and 39 is changed from "onedoc.title←sParts.anchorID EXCLUDING "A_" " to "onedoc.title←sParts.partsId+"("+"sParts.anchorID EXCLUDING "A_" "+")"". Thereby, the title of the work instruction document is changed, for example, from "RX200S2" into "WWW1 (RX200S2)".

Embodiment 6

In this Embodiment 6, the part groups within the design drawing are compared with each other and a portion which may be erroneous in the configuration of the part group is detected. When the system construction is actually performed, multiple machines with the same specification may often be arranged for each function group, for the purpose of performing a redundant configuration or distributed processing. In this Embodiment 6, the work instruction document generating apparatus 10 is used to confirm whether or not these are identical with one another.

First, the anchor ID with the electrical connection property and the anchor electrical property of "true" is used to clip the part group from the design drawing. The electrical connection property is used because operating functions are performed in units of electrical part groups. In all the cases described below, this common process is performed so far.

Moreover, in the following description, a Web group (a group which accepts a processing request from a user), an application group (APP group: an engine portion which actually executes the processing request from the user) and a DB group (a portion which accumulates data for operation of the APP group) are assumed as the function groups. Moreover, it is assumed that all the units of the electrical part groups are the servers.

(1) In the Case Where the CAD can Describe the Function Groups

If a used CAD can describe the function groups in some way, first, the function groups are defined on the computer system design drawing. As an example of a definition method, there is a method of selecting all servers or basic parts belonging to the same function group by a method of surrounding them, selecting them one by one with Shift+left click or the like, and inputting a function group name for all selected servers or basic parts. It is assumed that the function group name is retained as internal data at least for each basic part. Although the function group name may also be assigned to the parts other than the basic parts, hereinafter, it is assumed that the function group name is not assigned to the parts other than the basic parts.

After the parts on the design drawing have been integrated in units of the servers centering on the basic parts according to the above described common process, these are reintegrated for each function group. This process is easy because the function group name has been assigned to each basic part. A process described below is performed for each function group. Here, the process for the Web group will be described by way of example.

As a result of the reintegration for each function group, multiple basic parts should have been registered in the basic part list of the Web group. A first one in the basic part list is retrieved and regarded as a product. Here, since all machines belonging to the Web group are assumed to have the same configuration, the optional article or an external device (the SCSI disk enclosure or the like) may also be regarded as being included in the product.

The rest in the basic part list is regarded as the actual configuration in the above described embodiment, and the respective work instruction documents therefor are generated. However, before that, the anchor IDs of the respective basic parts are compared with one another. If there is a difference at this point, it can already be seen that they do not have the same configuration, and therefore, a warning may be issued and the comparison with the next server may be performed. The warning may be a message, for example, such as "A (a server selected as that corresponding to the product) and B (a server being compared therewith) are different products".

In the case where the work instruction document has been generated, if all machines within the same function group have exactly the same configuration, the server retrieved as the product and the server being compared therewith should naturally have the same configuration. In this case, a field of the work instruction in the outputted work instruction document should be empty. Therefore, if there is a work instruction field which is not empty, it shows that the configurations are not the same, and thus, a warning may be issued and the comparison with the next server may be performed. The warning may be a message, for example, such as "A (the server selected as that corresponding to the product) and B (the server being compared therewith) have different configurations. See 'Work instruction document: xxxxxxxx' for details". It should be noted that "xxxxxxxx" is, for example, a file name or the like.

The above described operation is a basic operation. Although the difference can be detected by the basic operation, in the case of an erroneous design, a few erroneously designed servers are likely to be mixed among many correct servers. Therefore, if the erroneously designed server has been incidentally selected as the server corresponding to the product, all comparisons with many other normal servers are outputted as the warning, which easily confuses the user. In order to avoid this confusion, a server with the same configuration as that of as many servers as possible is found and regarded as the product, and the above described basic operation is performed.

For example, the server with the same configuration as that of as many servers as possible can be found as described below.

First, in all anchor IDs in the list, the most frequently used anchor ID is found out.

Next, one part group with the same anchor ID as the extracted anchor ID is selected from the list and regarded as the product, and the work instruction document as a result of the comparison with other servers is generated. At this time, the following process is performed.

1) If the anchor ID is different, nothing is performed and the comparison with the next server is performed.

2) If the anchor ID is the same, the work instruction document is outputted, and the number of the work instruction documents is counted. Here, cntTejun=cntTejun+1.

3) When each line of the work instruction document is generated, the part name is set to a null character.

When the process of 1) to 3) has been completed, cntTejun (hereinafter referred to as "N") work instruction documents (hereinafter referred to as "tejun1.csv to tejunN.csv") are generated.

Next, the following process is performed for these N work instruction documents. First, the N work instruction documents are concatenated and the respective lines are sorted. Subsequently, for each line, the number of the same configurations for each connection point is set to the beginning of the line, and subsequently, each line of the work instruction document is outputted. Furthermore, the respective lines are sorted in descending order of the beginning number. Moreover, a configuration which has existed in all machines is omitted, and a beginning title line ("host name (product name)") is also omitted. It should be noted that although all procedures are mixed because the sort by the beginning has been performed, since all the connection points at the beginning of the respective lines are different within the same server, the number of the lines is not added with exactly the same connection point within the same server. This result is outputted to a file of commonN.txt. For example, the result is as follows.

Example: 9 C1,,CPU-1234,,CPU-1234,

9 C2,,,,,

3 M1,,MEM-9876,,MEM-9876,

2 M2,,,,,

1 P1,,,,SC-6654,add

It should be noted that, on this occasion, if contents of commonN.txt is empty, it can be seen that all machines have had the same configuration, and thus, the process is completed here.

Next, all lines with the same number as that of the beginning line of commonN.txt are collected, and the beginning numbers are removed. A result thereof is outputted as a file of similarLines.txt. For each line of this similarLines.txt, search is performed in each work instruction document and the number of existing work instruction document names is counted. A document for which the largest number of matches have occurred here can be regarded as the server with the same configuration as that of as many servers as possible.

An appropriate instruction document file name is extracted from similarLines.txt, a portion of the host name of the beginning single line of the instruction document file is retrieved and regarded as the product, and the basic operation is performed.

(2) In the Case where the CAD cannot Describe the Function Groups

If the function groups cannot be defined, perfect check is difficult. It is because the product with the same model, that is, with the same anchor ID may be used even in different groups, and in that case, the machines in the different groups may have different part configurations. For example, it is assumed that the Web group and the DB group use the same model "RX200S2". At this time, the machine in the Web group hardly needs data storage, and therefore, is hardly attached with an external disk. However, the external disk is essential for the machine in the DB group for the data storage.

Even in such a case, there are several measures for solving it. First, if the part ID of the basic part has been changed into that corresponding to the host name, and the server in the same group has a name of the same pattern (www1, www2, . . . or the like), the host name excluding the number is regarded as the function group name, and thereby it is possible to quite precisely find the difference by using the method described in the above case of (1).

If it cannot be expected either, it is possible to find only one server with a configuration different from that of others, as follows.

a) A list corresponding to the function group is generated based on the anchor ID. This can generate a set of the same model.

b) The above (1) is performed exactly in the same manner, until generation of commonN.txt.

c) A line with the beginning number of "1" is retrieved from commonN.txt, the instruction document file with contents of this line is found out, and the host name of its beginning line is extracted. It should be noted that, in this case, the part ID may be "MTn" or a non-patterned host name in all machines.

The host name extracted by such an operation indicates a host with a configuration which is not identical with that of any other host. Although whether the model is different or the option is different is unclear, the warning indicating the difference can be issued.

It should be noted that, in the CAD, an accessory may be able to be defined as a property of the part within the design drawing. In such a case, software is registered as an accessory which is not shown on the drawing, positioned as the part which is directly connected to the basic part, and added to comparison targets on the work instruction document, similarly to the card and the like. Thereby, more detailed check of identity can also be performed.

Embodiment 7

If the design has been performed by using a model of one anchor ID, as a result of repeatedly mounting the option, the part configuration may be changed into that of a model of a different anchor ID or a part configuration in which the option has been further mounted to the model of the different anchor ID, for example, in such a case where, as a result of mounting the SCSI array card and the LAN card to the product type name of "RX200S2", the part configuration becomes the same as that of the product type name of "RX200S2A" mounted with the LAN card. In this Embodiment 7, finding such a design and presenting a change into a model with an optimal configuration to the designer are considered.

A basic policy is to, for one part group (hereinafter referred to as "oserver") on the design drawing, retrieve the basic part of the server, search for the product with the same basic part from the product DB 13, perform comparison with all matched servers, and generate the work instruction document. At this time, a product with the smallest number of items which are not empty in the work instruction, that is, a product with a minimum change is set as a base product. However, since a different product type name has been assigned even to the product with the same function depending on the value of the BTO flag, a mechanism in which this difference can be regarded as identical is required.

For that purpose, the following may be performed.

First, there is introduced a logic in which the parts which are exactly identical with each other except the BTO flag, the part type name and the part name in the part DB 12 can be recognized as twins (or triplets, hereinafter represented by "twins").

This logic may be performed each time when the basic part list is generated from the design drawing. However, since the part registered in the part DB 12 is basically unchanged, it is more efficient to perform determination at the time of the registration and store a determination result in the part DB 12. Moreover, it is also necessary to introduce a mechanism of defining any one of the twins as "representative part" and replacing an actual part with the representative part.

The logic in which the parts can be recognized as the twins will be described below.

Part registration logic

A field of a representative type name is newly provided in the part data of the part DB 12.

When one part is registered, the following is executed.

Parts with the same kind are identified from the parts in the existing part DB 12 (target parts are refined).

One part with exactly the same properties except the BTO flag as those of the part to be currently registered is found out (a target part is selected).

The representative type name is retrieved from the selected target part, and the above described part is registered as the representative type name of the part being currently registered.

If there is no selected target part, since the currently registered part is the first registered one in possible twins, its own part type name is registered as the representative type name.

The following changes are applied to the part object.

productId: changed to represent the representative type name realProdId: added to represent the part type name Thereby, the work instruction document in which the twins are regarded as identical can be generated with exactly the same subsequent logic. However, the process related to the BTO is not performed when the document is generated.

With respect to the change applied as above, the change in the logic will be described in more detail.

The process until the generation of the basic part list is performed for the product in the product DB 13 and the design drawing.

For each basic part within the basic part list generated from the design drawing, the following process is performed.

The type name of the basic part is retrieved. The basic part is not optional. Therefore, since there are no twins, it is always true that "type name"="representative type name".

The basic parts with the above described type name are identified from the basic part list of the product in the product DB 13. It corresponds to a task of generating a comparison target object list.

For each basic part list from the product DB 13, the work instruction document is generated with the basic part from the design drawing as the product, and with the basic part retrieved from the product DB 13 as the actual configuration. In other words, a method of comparison is inverted from that in the above described embodiment. Only the work instruction documents of the number of elements of the basic part list from the product DB 13 are completed. Moreover, the representative type name is described in a type name field.

For all work instruction documents, the following is performed.

The work instruction document with the work instruction field of "add" is ignored.

Since there is a part unused in the design drawing, on the product side, replacement becomes impossible. It should be noted that the order of the product and the actual configuration article has been inverted from that in an ordinary instruction document.

If a work instruction document in which all work instruction fields are empty is found, the list which has been stored so far is discarded, a list which has only this instruction document as an element is generated, and the logic proceeds to next *.

... (A)

Since no work instruction means that the product itself has been found, there is no need to further search for others.

Other work instruction documents are stored as a list.

... (B)

The number of work instruction documents in which the work instruction fields are not empty is counted from the work instruction document list stored by either the above (A) or (B), and when a work instruction document with the smallest number of work instructions (including 0) is found, the anchor ID is regenerated from the title of the work instruction document (that is, "A_" is added to the title of the instruction document). If the anchor ID is generated from (A), the number of the instruction documents becomes one and a result of the counting becomes 0.

If the anchor ID of the basic part retrieved from the design drawing and the regenerated anchor ID are identical, since an optimal product has been selected at the time of the designing, no warning is issued.

Conversely, if both anchor IDs are different, a warning indicating that there is a more appropriate product (that is, the regenerated anchor ID excluding "A_") than that which has been selected at the time of the designing is issued. At this time, if the result of the counting at a procedure before the last procedure is 0, * is repeated for the basic part retrieved from the next design drawing. The logic is completed here for the base product. Next, each attachment part is checked.

For one left work instruction document, the work instruction is searched for again, and the following is performed for each found instruction.

The connection point name is retrieved.

Based on the connection point name (also including the case of being connected by "."), the basic part retrieved from the design drawing is followed and an aimed part is found out. The aimed part may be recursively found by using connName and connParts. At this point, the representative type name on the product side of the work instruction document and the representative type name of the found part should be identical.

The parts with the same representative type name are searched for from the part DB 12 and sorted in the following order, and the type name of the beginning part is obtained.

The BTO flag is "possible"

The BTO flag is "impossible"

It should be noted that if the BTO flag is "not applicable", the part is not sorted.

The retrieved type name is compared with the type name of the aimed part, that is, the found part (realProdId), and if there is a difference, a warning indicating that the retrieved type name is more advantageous (that is, inexpensive/no field work or the like) is outputted.

The above # is repeated until no instruction is left.

The above * is repeated until no basic part is left within the basic part list generated from the design drawing.

When the above is performed, warnings further in accordance with actual conditions can be issued if the BTO flag has been extended as follows.

Extension of the BTO flag

"Possible" is divided into "replaceable" and "addable". In other words, the BTO flag is extended from "not applicable", "possible" and "impossible" to "not applicable", "replaceable", "addable" and "impossible".

Usage of the extended BTO flag

The above described detailed algorithm is replaced as follows.

Original:

For one left work instruction document, the work instruction is searched for again, and the following is performed for each found instruction.

The connection point name is retrieved.

Based on the connection point name (also including the case of being connected by "."), the basic part retrieved from the design drawing is followed and an aimed part is found out. The aimed part may be recursively found by using connName and connParts. At this point, the representative type name on the product side of the work instruction document and the representative type name of the found part should be identical.

The parts with the same representative type name are searched for from the part DB 12 and sorted in the following order, and the type name of the beginning part is obtained.

The BTO flag is "possible"

The BTO flag is "impossible"

It should be noted that if the BTO flag is "not applicable", the part is not sorted.

The retrieved type name is compared with the type name of the aimed part, that is, the found part (realProdId), and if there is a difference, a warning indicating that the retrieved type name is more advantageous (that is, inexpensive/no field work or the like) is outputted.

The above # is repeated until no instruction is left.

Changed:

For one left work instruction document, the work instruction is searched for again, and the following is performed for each found instruction.

The connection point name is retrieved.

Based on the connection point name (also including the case of being connected by "."), the basic part retrieved from the design drawing is followed and an aimed part is found out. The aimed part may be recursively found by using connName and connParts. At this point, the representative type name on the product side of the work instruction document and the representative type name of the found part should be identical.

The parts with the same representative type name are searched for from the part DB 12 and sorted in the following order, and the type name of the beginning part is obtained.

The BTO flag is "replaceable"

However, if the instruction is not "replace", the part is not sorted.

The BTO flag is "addable"

However, if the instruction is "replace", the part is not sorted.

The BTO flag is "impossible"

It should be noted that if the BTO flag is "not applicable", the part is not sorted.

The retrieved type name is compared with the type name of the aimed part, that is, the found part (realProdId), and if there is a difference, a warning indicating that the retrieved type name is more advantageous (that is, inexpensive/no field work or the like) is outputted.

The above # is repeated until no instruction is left.

INDUSTRIAL APPLICABILITY

The present invention can be used for each work from actual computer system design to the construction thereof.

Moreover, in a department such as a verification center, in which work of constructing/disassembling the device is repeated in response to verification requests, when the drawing of the product is generated by using the anchor ID, a typical frequently used configuration, that is, a configuration of the product added with a frequently used optional article is registered instead of the product itself, and the device with the configuration is retained in stock. The typical frequently used configuration is copied and a verification system drawing is generated in response to requests from customers, and thereby a difference from the configuration in stock is outputted as the work instruction document, which therefore can be used to construct a verification system.

Moreover, in the verification center, after verification, it is necessary to disassemble the used device into a state of the typical frequently used configuration and store it. In this case, the work instruction document can also be used as a disassembly instruction document, for example, by regarding the configuration of the work instruction document as shown in FIG. 17 as an initial state, and regarding the product as a final state.

This application is based upon and claims priority of PCT international application No. PCT/JP2006/302231 filed Feb. 9, 2006, the contents being incorporated herein by reference.

The invention claimed is:

1. A work instruction document generating apparatus for generating a work instruction document for constructing a system from a system design drawing, the apparatus comprising:

a standard configuration article data storage unit storing configuration information on a standard configuration article composed of multiple parts, and identification information for identifying a basic part among the parts belonging to the standard configuration article;

a part data storage unit storing part information on a part attached with a property including a connection relationship for indicating whether a connection point of the part is for one of two different connections, which are internal connection and external connection;

a part group extracting unit extracting all the parts constituting the system from the system design drawing by using the part information on the part stored in the part data storage unit, identifying a basic part from the extracted parts, and grouping the extracted parts into part groups by grouping the one basic part and other parts connected directly or indirectly to the one basic part through the internal connection, in accordance with the connection relationship; and a work instruction document generating unit, for each part group, detecting a standard configuration article having a same basic part as the basic part included in the part group from the standard configuration article data storage unit, extracting a difference in part configuration between the part group in the system design drawing and the detected standard configuration article, generating information indicating the extracted difference as the work instruction document for each part group, and outputting the work instruction document.

2. The work instruction document generating apparatus according to claim 1, wherein, as the property of the part stored in said part data storage unit, BTO information representing a distinction of whether or not the part is a factory-attached article is further set; and said work instruction document generating unit confirms the BTO information on the part in each part group in which the difference from said standard configuration article has been detected, and if the BTO information on the part indicates that the part is the factory-attached article, said work instruction document generating unit records information indicating that or records that there has been no difference between said part group and said standard configuration article for the part, in said work instruction document.

3. The work instruction document generating apparatus according to claim 1, wherein, as the connection relationship information of the property set to the part stored in said part data storage unit, there are first connection relationship information indicating a physical connection relationship with another part and second connection relationship information indicating a logical connection relationship with another part, and whether the connection relationship is the internal connection or the external connection is set independently for each connection relationship information; and said part group extracting unit comprises unit for extracting a part group for generating said work instruction document from the system design drawing, by using said first connection relationship information, and unit for extracting the part group for generating said work instruction document from the system design drawing, by using said second connection relationship information.

4. A work instruction document generating method for generating a work instruction document for constructing a system from a system design drawing, by a work instruction document generating apparatus comprising a standard configuration article data storage unit storing configuration information on a standard configuration article composed of multiple parts, and identification information for identifying a basic part among the parts belonging to the standard configuration article, and part data storage unit storing information on a part attached with a property including a connection relationship for indicating whether a connection point of the part is for one of two different connections, which are internal connection and an external connection, the method comprising:

extracting all the parts constituting the system from the system design drawing by using the part information on the part stored in the part data storage unit, identifying a basic part from the extracted parts, and grouping the extracted parts into part groups by grouping the one basic part and other parts connected directly or indirectly to the one basic part through the internal connection, in accordance with the connection relationship; and for each part group detecting a standard configuration article having a same basic part as the basic part included in the part group from the standard configuration article data storage unit, extracting a difference in part configuration between the part group in the system design drawing and the detected standard configuration article, generating information indicating the extracted difference as the work instruction document for each part group, and outputting the work instruction document.

5. A non-transitory computer readable medium recording a program for work instruction document generation to be executed by a computer in a work instruction document generating apparatus for generating a work instruction document for constructing a system from a system design drawing, the program being for causing said computer to execute: storing configuration information on a standard configuration article composed of predetermined multiple parts, and identification information for identifying a basic part among the parts belonging to the standard configuration article; storing information on a part attached with a property including a connection relationship for indicating whether a connection point of the part is for one of two different connections, which are internal connection and an external connection; extracting all the parts constituting the system from the system design drawing by using the part information on the part stored in the part data storage unit, identifying a basic part from the extracted parts, and grouping the extracted parts into part groups by grouping the one basic part and other parts connected directly or indirectly to the one basic part therein through the internal connection, in accordance with the connection relationship; and for each part group, detecting a standard configuration article having a same basic part as the basic part included in the part group from the standard configuration article data storage unit, extracting a difference in part configuration between the part group in the system design drawing and the detected standard configuration article, generating information indicating the extracted difference as the work instruction document for each part group, and outputting the work instruction document.

6. The work instruction document generating apparatus according to claim 2, wherein,
as the connection relationship information of the property set to the part stored in said part data storage unit, there are first connection relationship information indicating a physical connection relationship with another part and second connection relationship information indicating a logical connection relationship with another part, and whether the connection relationship is the internal connection or the external connection is set independently for each connection relationship information; and
said part group extracting unit comprises unit for extracting a part group for generating said work instruction document from the system design drawing, by using said first connection relationship information, and unit for extracting the part group for generating said work instruction document from the system design drawing, by using said second connection relationship information.

7. The method according to claim 4, wherein as the property of the part stored in said part data storage unit, BTO information representing a distinction of whether or not the part is a factory-attached article is further set, and the method further comprises:
confirming the BTO information on the part in each part group in which the difference from said standard configuration article has been detected, and if the BTO information on the part indicates that the part is the factory-attached article, recording information indicating that or records that there has been no difference between said part group and said standard configuration article for the part, in said work instruction document.

8. The method according to claim 4, wherein as the connection relationship information of the property set to the part stored in said part data storage unit, there are first connection relationship information indicating a physical connection relationship with another part and second connection relationship information indicating a logical connection relationship with another part, and whether the connection relationship is the internal connection or the external connection is set independently for each connection relationship information, the method further comprises:
extracting a part group for generating said work instruction document from the system design drawing, by using said first connection relationship information, and extracting the part group for generating said work instruction document from the system design drawing, by using said second connection relationship information.

9. The method according to claim 7, wherein as the connection relationship information of the property set to the part stored in said part data storage unit, there are first connection relationship information indicating a physical connection relationship with another part and second connection relationship information indicating a logical connection relationship with another part, and whether the connection relationship is the internal connection or the external connection is set independently for each connection relationship information, and the method further comprises:
extracting a part group for generating said work instruction document from the system design drawing, by using said first connection relationship information, and extracting the part group for generating said work instruction document from the system design drawing, by using said second connection relationship information.

10. The non-transitory computer readable recording medium according to claim 5, wherein as the property of the part stored in said part data storage unit, BTO information representing a distinction of whether or not the part is a factory-attached article is further set, and the computer further executes: confirming the BTO information on the part in each part group in which the difference from said standard configuration article has been detected, and if the BTO information on the part indicates that the part is the factory-attached article, recording information indicating that or records that there has been no difference between said part group and said standard configuration article for the part, in said work instruction document.

11. The non-transitory computer readable recording medium according to claim 5, wherein as the connection relationship information of the property set to the part stored in said part data storage unit, there are first connection relationship information indicating a physical connection relationship with another part and second connection relationship information indicating a logical connection relationship with another part, and whether the connection relationship is the internal connection or the external connection is set independently for each connection relationship information, the computer further executes: extracting a part group for generating said work instruction document from the system design drawing, by using said first connection relationship information, and extracting the part group for generating said work instruction document from the system design drawing, by using said second connection relationship information.

12. The non-transitory computer readable recording medium according to claim 10, wherein as the connection relationship information of the property set to the part stored in said part data storage unit, there are first connection relationship information indicating a physical connection relationship with another part and second connection relationship information indicating a logical connection relationship with another part, and whether the connection relationship is the internal connection or the external connection is set independently for each connection relationship information, and the computer further executes: extracting a part group for generating said work instruction document from the system design drawing, by using said first connection relationship information, and extracting the part group for generating said work instruction document from the system design drawing, by using said second connection relationship information.

* * * * *

UNITED STATES PATENT AND TRADEMARK OFFICE
CERTIFICATE OF CORRECTION

PATENT NO. : 8,135,484 B2
APPLICATION NO. : 12/222453
DATED : March 13, 2012
INVENTOR(S) : Toshiya Yamazaki et al.

Page 1 of 1

It is certified that error appears in the above-identified patent and that said Letters Patent is hereby corrected as shown below:

Column 43, Line 36 (Approx.), In Claim 5, after "part" delete "therein".

Signed and Sealed this
Fourth Day of September, 2012

David J. Kappos
*Director of the United States Patent and Trademark Office*